(12) United States Patent
Mueller et al.

(10) Patent No.: US 12,070,126 B2
(45) Date of Patent: Aug. 27, 2024

(54) BRACKETS, BINS, AND SHELVES

(71) Applicant: InterDesign, Inc., Solon, OH (US)

(72) Inventors: Paul A. Mueller, Wadsworth, OH (US);
Gregory Rotenberg, Highlands Heights, OH (US); Gary David Dempsey, Lakewood, OH (US); Radu Alexandru Ghiorghie, Copley, OH (US); Sara Czukal McBride, Wickliffe, OH (US); Frank Curtis Kraska, Concord Township, OH (US); Christian Raaby, Egå (DK)

(73) Assignee: InterDesign, Inc., Solon, OH (US)

( * ) Notice: Subject to any disclaimer, the term of this patent is extended or adjusted under 35 U.S.C. 154(b) by 0 days.

(21) Appl. No.: 17/970,085

(22) Filed: Oct. 20, 2022

(65) Prior Publication Data

US 2023/0276945 A1    Sep. 7, 2023

Related U.S. Application Data

(60) Provisional application No. 63/407,799, filed on Sep. 19, 2022, provisional application No. 63/315,781, filed on Mar. 2, 2022.

(51) Int. Cl.
*A47B 96/06* (2006.01)
*A47G 25/06* (2006.01)
*A47G 29/087* (2006.01)

(52) U.S. Cl.
CPC ........ *A47B 96/066* (2013.01); *A47G 25/0635* (2013.01); *A47G 29/087* (2013.01)

(58) Field of Classification Search
CPC .. A47J 47/20; A47J 47/16; A47J 45/02; F16B 1/00; F16B 47/00; F16B 2001/0035;
(Continued)

(56) References Cited

U.S. PATENT DOCUMENTS 1,794,700 A    3/1931  Mccaskey
3,110,467 A    11/1963 Dube
(Continued)

FOREIGN PATENT DOCUMENTS

CA    2593343 A1    12/2008
CA    2715231 A1    3/2012
(Continued)

OTHER PUBLICATIONS

30 Bins Wall Mounted Storage Bin Parts Rack, Storage Bin Parts Organizer with 2pcs Wall Mounting Peg Board and Install Screws for for your Nuts, Bolts, Screws, Nails, Beads, Buttons, Other Small Parts.

(Continued)

*Primary Examiner* — Ko H Chan
(74) *Attorney, Agent, or Firm* — Calfee, Halter & Griswold LLP

(57) ABSTRACT

Bin and shelf mounting systems including at least one mounting bracket and a bin or shelf and methods of installing said bins or shelves to a wall. The at least one mounting bracket configured with a truncated wedge shape and beveled side edges. The bin and shelf include at least one recess on a rear wall thereof. The at least one recess includes (i) a downward-facing cavity at a top portion of the recess, (ii) side edges that are beveled, and (iii) a truncated wedge shape complimentary to the at least one mounting bracket. The recess is configured to slidably engage the at least one mounting bracket. A multi-hook system including a mounting bracket and a plurality of face plates.

20 Claims, 33 Drawing Sheets

(58) Field of Classification Search
CPC ..... F16B 47/003; A47K 3/001; A47G 29/087; A47G 25/0635; A47G 1/1606; A47G 7/04; A47B 96/066; A47B 96/028; F16M 11/041; F16M 11/22; F16M 13/02
See application file for complete search history.

(56) References Cited

U.S. PATENT DOCUMENTS

| | | | |
|---|---|---|---|
| 3,131,251 A * | 4/1964 | Ryan | B60R 1/04 |
| | | | 248/467 |
| 3,553,888 A | 1/1971 | Daly et al. | |
| 3,813,813 A | 6/1974 | Powell | |
| 3,983,976 A | 10/1976 | Taylor | |
| 4,151,917 A | 5/1979 | Pugh | |
| 4,155,459 A | 5/1979 | Marschak | |
| 4,160,570 A | 7/1979 | Bridges | |
| 4,322,006 A * | 3/1982 | Marschak | A47F 5/0823 |
| | | | 248/222.51 |
| 4,408,812 A | 10/1983 | Krautwurst | |
| 4,457,436 A | 7/1984 | Kelley | |
| 4,530,479 A | 7/1985 | Chen | |
| 4,776,482 A * | 10/1988 | Wolters | G11B 33/0438 |
| | | | 220/531 |
| 4,930,742 A * | 6/1990 | Schofield | B60R 1/12 |
| | | | 248/225.11 |
| 5,035,389 A | 7/1991 | Wang | |
| 5,288,046 A | 2/1994 | Eklof et al. | |
| 5,356,105 A * | 10/1994 | Andrews | B63B 35/14 |
| | | | 248/221.11 |
| 5,472,167 A | 12/1995 | Shillington et al. | |
| 5,492,238 A | 2/1996 | Scholl et al. | |
| 5,870,969 A | 2/1999 | Boyce | |
| 5,947,322 A | 9/1999 | Ho | |
| 6,209,260 B1 | 4/2001 | Surette | |
| 6,220,461 B1 | 4/2001 | Dickinson | |
| 6,431,510 B1 | 8/2002 | Lydecker | |
| 6,520,367 B1 | 2/2003 | Piroch | |
| 6,588,721 B1 | 7/2003 | Rischmueller | |
| 6,616,109 B1 | 9/2003 | Jarrett et al. | |
| 6,641,100 B2 | 11/2003 | Furukawa | |
| 6,808,090 B2 | 10/2004 | Pedersen | |
| 6,877,641 B2 | 4/2005 | Howland | |
| 7,044,344 B2 | 5/2006 | Winkler | |
| 7,261,264 B2 | 8/2007 | Moran | |
| 7,416,160 B2 | 8/2008 | Cies | |
| 7,428,972 B2 | 9/2008 | Warner et al. | |
| 7,708,252 B2 | 5/2010 | Vander Berg et al. | |
| 7,802,766 B2 | 9/2010 | Thompson | |
| 8,042,700 B1 * | 10/2011 | Smalley | A47F 5/0807 |
| | | | 211/90.01 |
| 8,128,048 B2 | 3/2012 | Odishoo | |
| 8,398,041 B2 | 3/2013 | Brinkdopke et al. | |
| 8,684,195 B1 * | 4/2014 | Caruso | A47B 95/008 |
| | | | 211/94.01 |
| 8,833,596 B2 | 9/2014 | Sanguinet et al. | |
| 9,386,866 B2 * | 7/2016 | Presenty | A47F 5/0846 |
| 9,970,475 B2 | 5/2018 | Chang et al. | |
| 9,980,582 B1 | 5/2018 | Levy et al. | |
| 10,117,415 B2 | 11/2018 | Crews | |
| 10,480,710 B2 | 11/2019 | Thompson | |
| 10,737,839 B2 | 8/2020 | Mooney | |
| 10,966,891 B2 | 4/2021 | Kitt | |
| 11,067,218 B2 | 7/2021 | Sisto | |
| 11,147,396 B2 | 10/2021 | Mcmillan et al. | |
| 11,622,628 B2 * | 4/2023 | Kressin | A47B 96/066 |
| | | | 312/245 |
| 2003/0025057 A1 | 2/2003 | Furukawa | |
| 2003/0178443 A1 | 9/2003 | Pedersen | |
| 2004/0079857 A1 | 4/2004 | Howland | |
| 2004/0112774 A1 | 6/2004 | Winkler | |
| 2005/0109910 A1 | 5/2005 | Vander Berg et al. | |
| 2005/0247841 A1 | 11/2005 | Brooks | |
| 2006/0138291 A1 | 6/2006 | Cies | |
| 2006/0219853 A1 | 10/2006 | Molina et al. | |
| 2007/0045492 A1 | 3/2007 | Moran | |
| 2007/0205170 A1 | 9/2007 | Gainer et al. | |
| 2008/0078121 A1 | 4/2008 | Stanio | |
| 2008/0296245 A1 | 12/2008 | Punzel et al. | |
| 2009/0038983 A1 | 2/2009 | Kieffer | |
| 2009/0134296 A1 | 5/2009 | Odishoo | |
| 2009/0266836 A1 | 10/2009 | Mobley | |
| 2010/0108835 A1 | 5/2010 | Thompson | |
| 2010/0117495 A1 | 5/2010 | Cornell | |
| 2010/0133399 A1 | 6/2010 | Zaccolo | |
| 2011/0024585 A1 | 2/2011 | Brinkdopke et al. | |
| 2011/0127396 A1 | 6/2011 | Parker et al. | |
| 2012/0261537 A1 | 10/2012 | Farrell et al. | |
| 2013/0248471 A1 | 9/2013 | Evans | |
| 2014/0069939 A1 | 3/2014 | Sanguinet et al. | |
| 2016/0145018 A1 | 5/2016 | Lu | |
| 2017/0314608 A1 | 11/2017 | Chang et al. | |
| 2018/0049404 A1 | 2/2018 | Crews | |
| 2018/0156382 A1 | 6/2018 | Thompson | |
| 2018/0273247 A1 | 9/2018 | Mooney | |
| 2019/0186686 A1 | 6/2019 | Sisto | |
| 2020/0046143 A1 | 2/2020 | Mcmillan et al. | |
| 2020/0383856 A1 | 12/2020 | Kitt | |
| 2021/0112998 A1 | 4/2021 | Gargano | |

FOREIGN PATENT DOCUMENTS

| | | |
|---|---|---|
| CA | 2764111 A1 | 7/2012 |
| CA | 2780730 A1 | 12/2012 |
| CA | 2921283 A1 | 8/2017 |
| CN | 104853650 B | 11/2017 |
| EP | 1602838 A2 | 12/2005 |
| FR | 1317285 A | 2/1963 |
| KR | 200474990 Y1 | 10/2014 |
| WO | 2015161875 A1 | 10/2015 |

OTHER PUBLICATIONS

5s And Wall-Mounted Storage.
European Search Report from European Patent Application No. 22202838.3 dated Jul. 3, 2023 (8 pages).

* cited by examiner

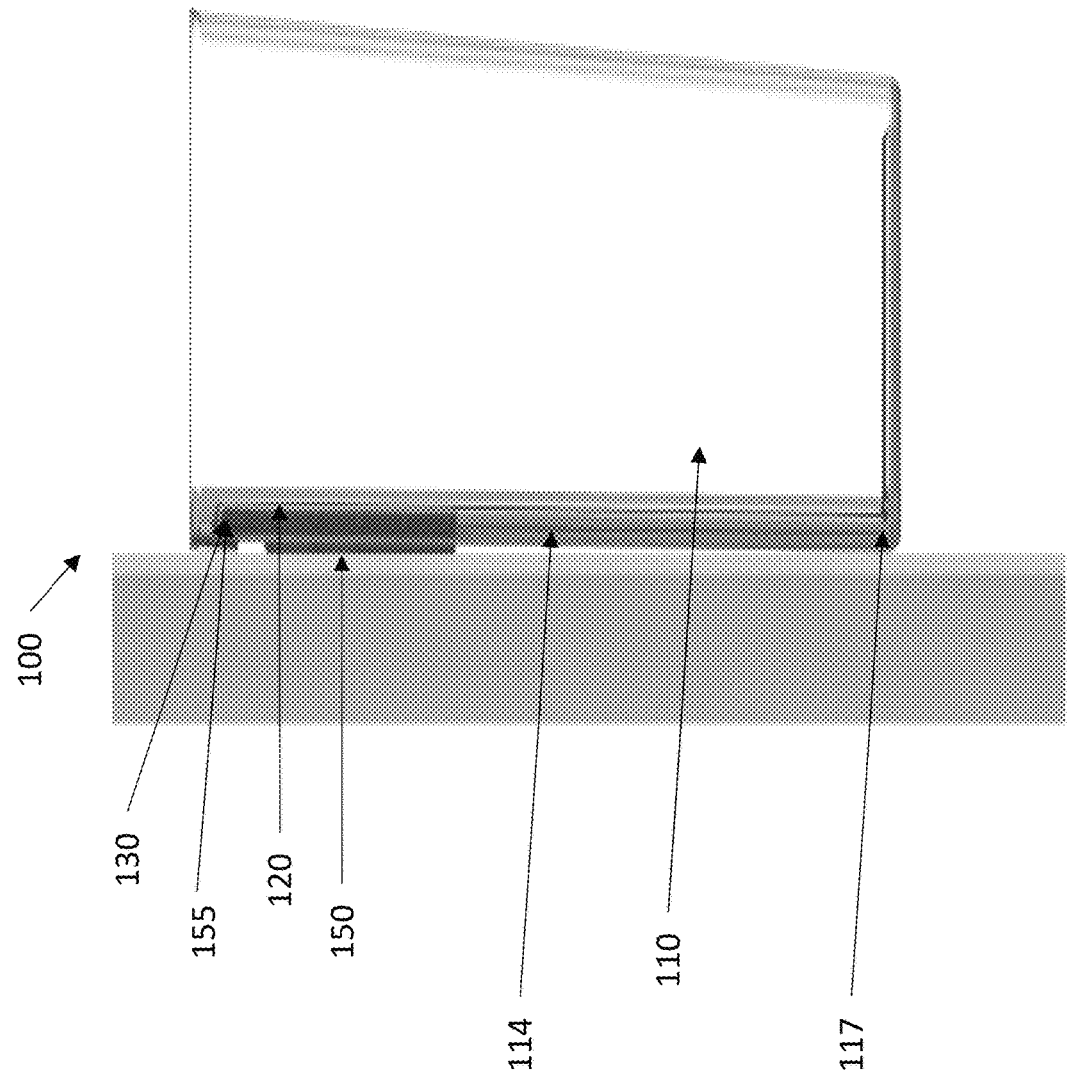

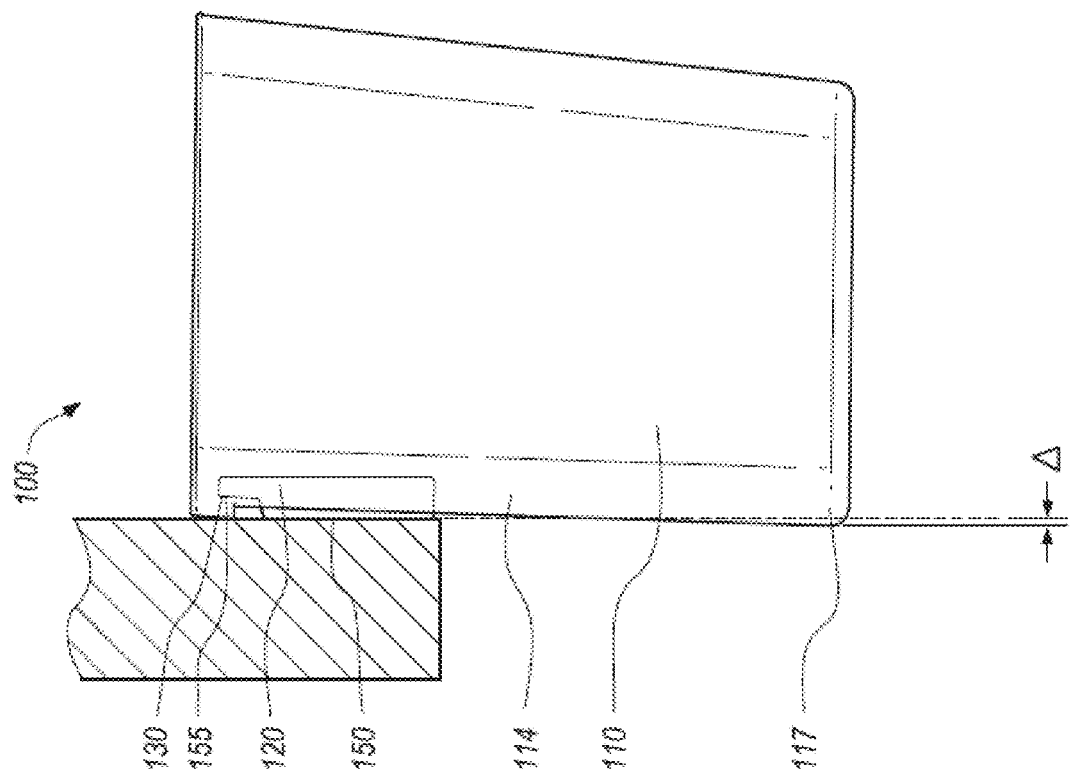

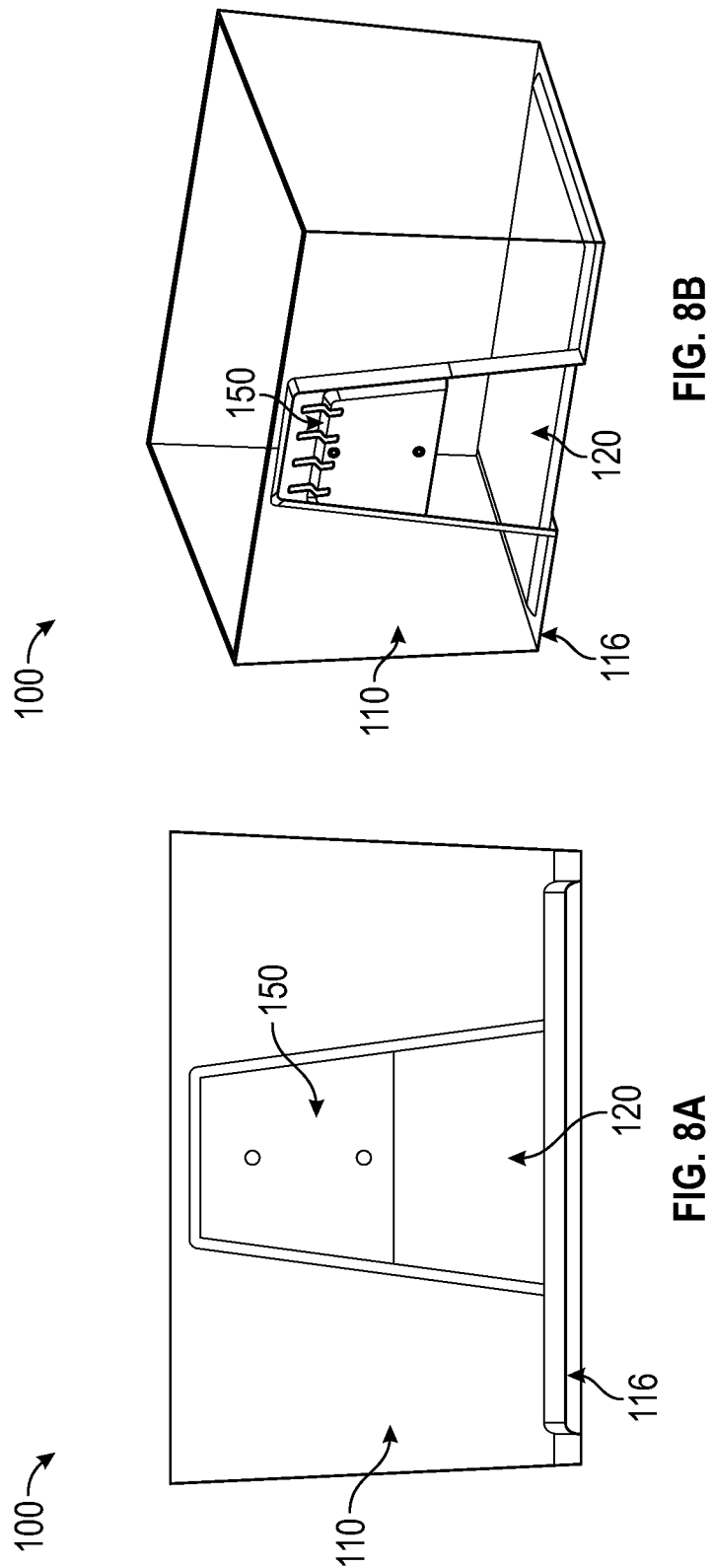

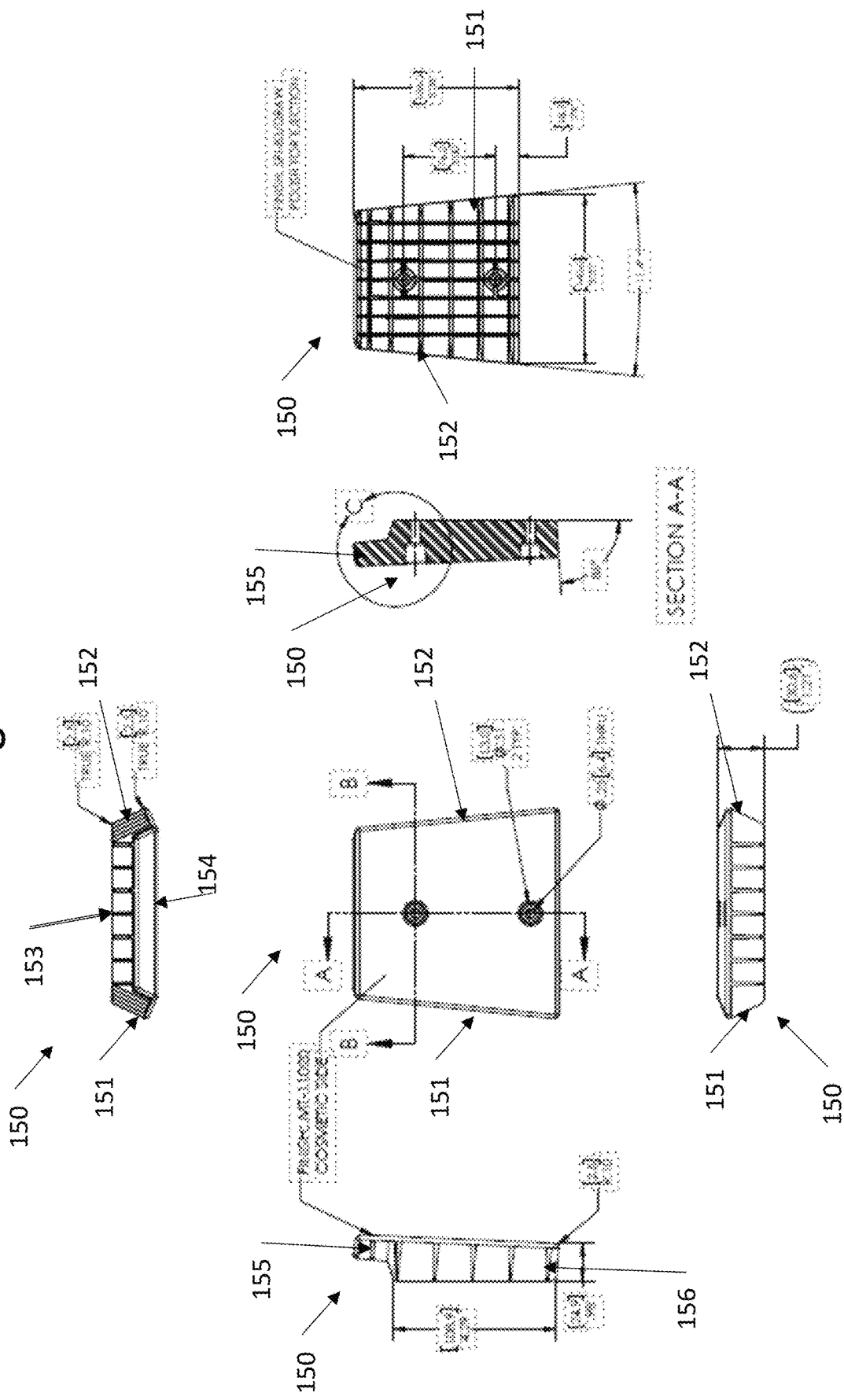

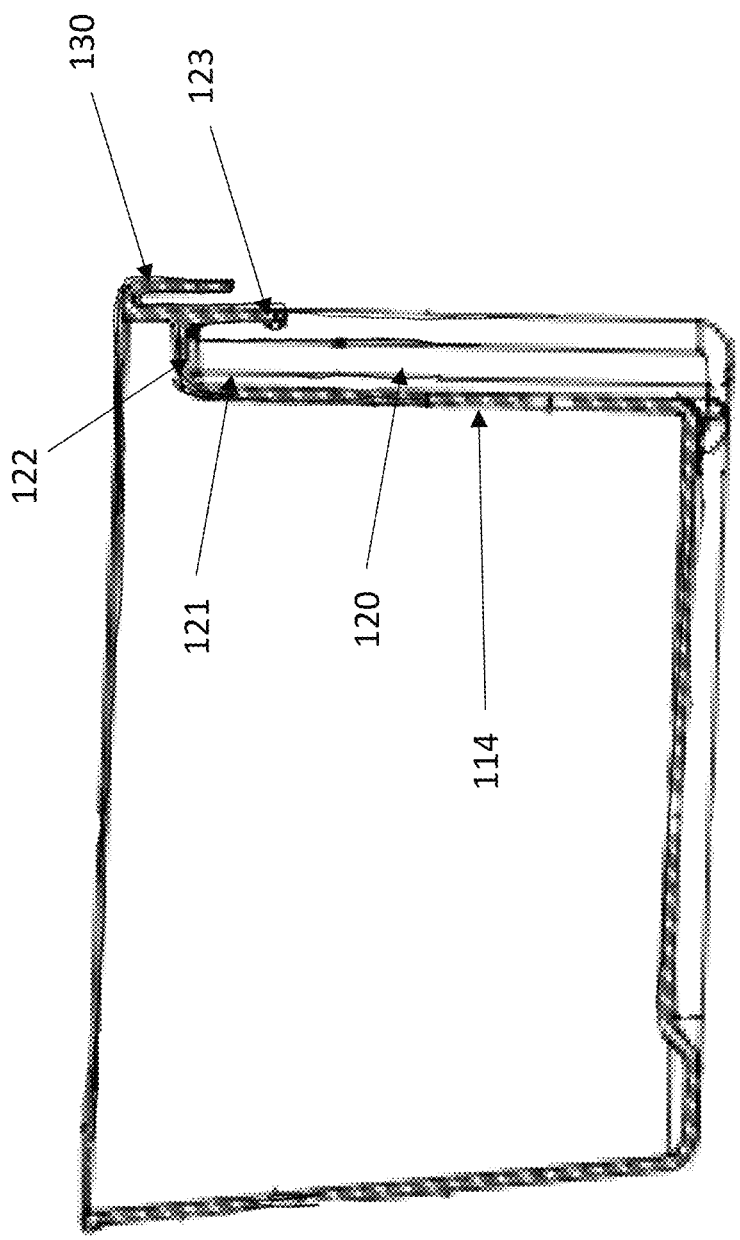

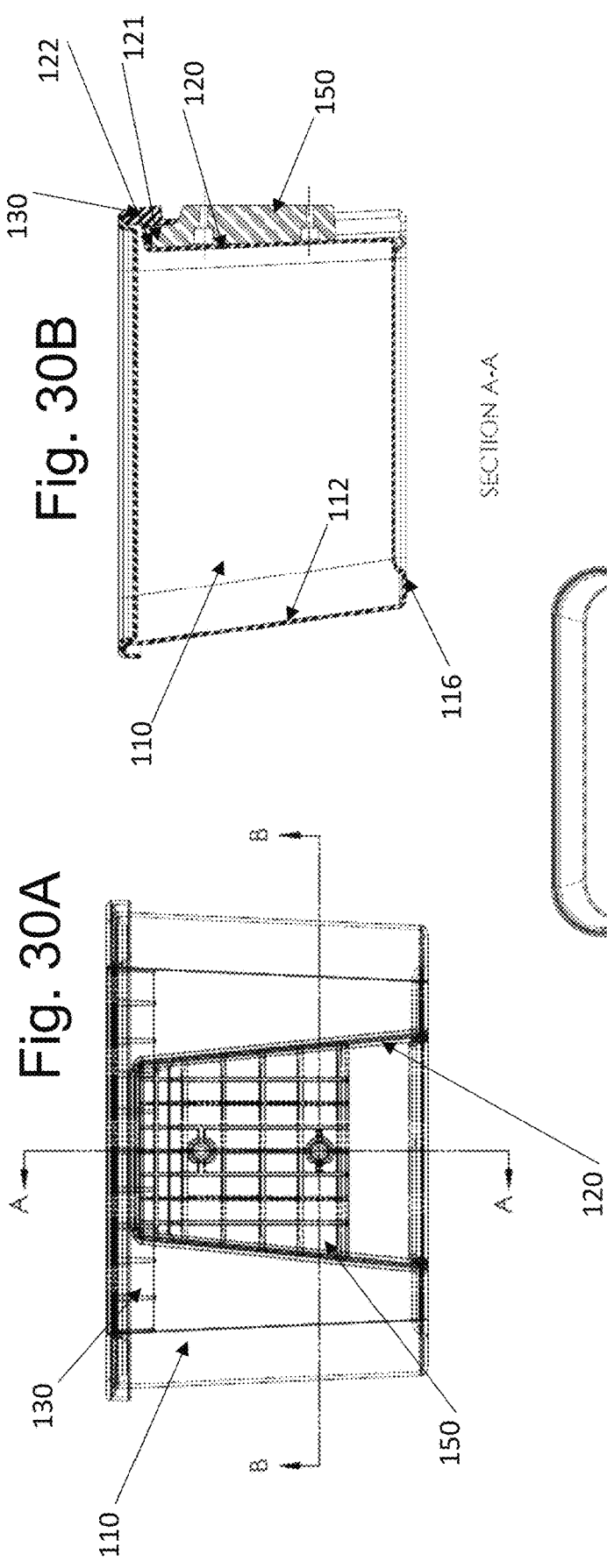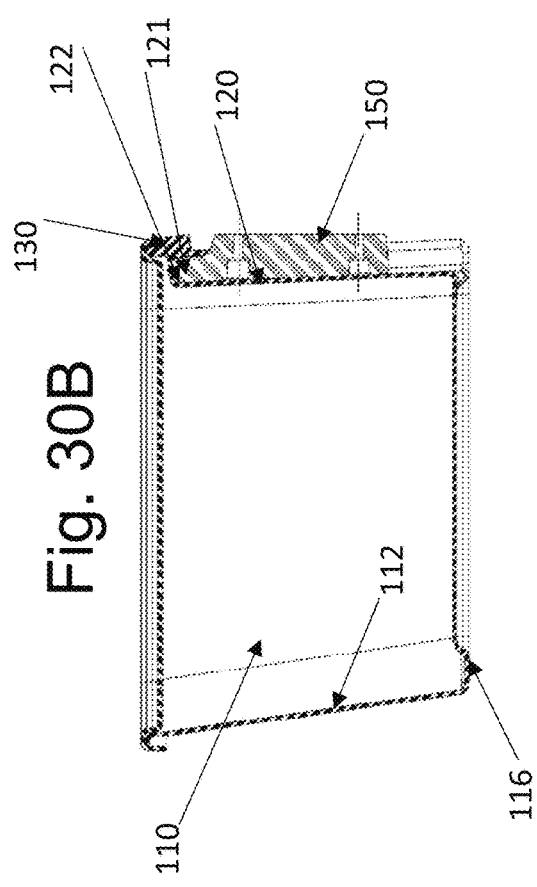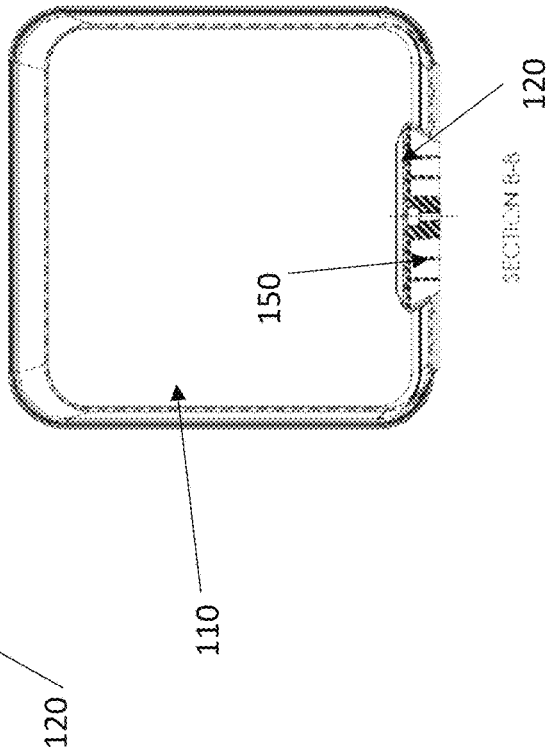

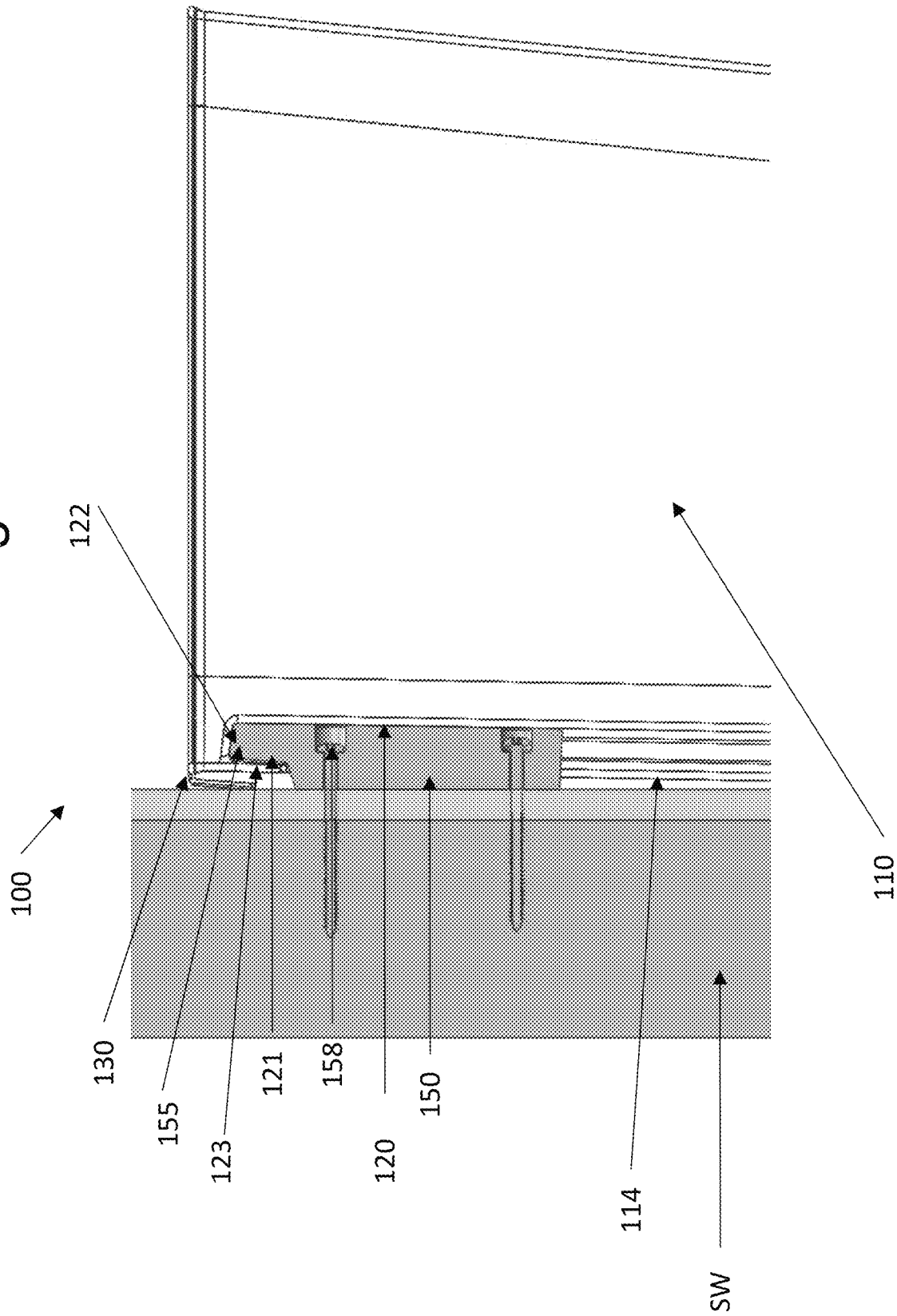

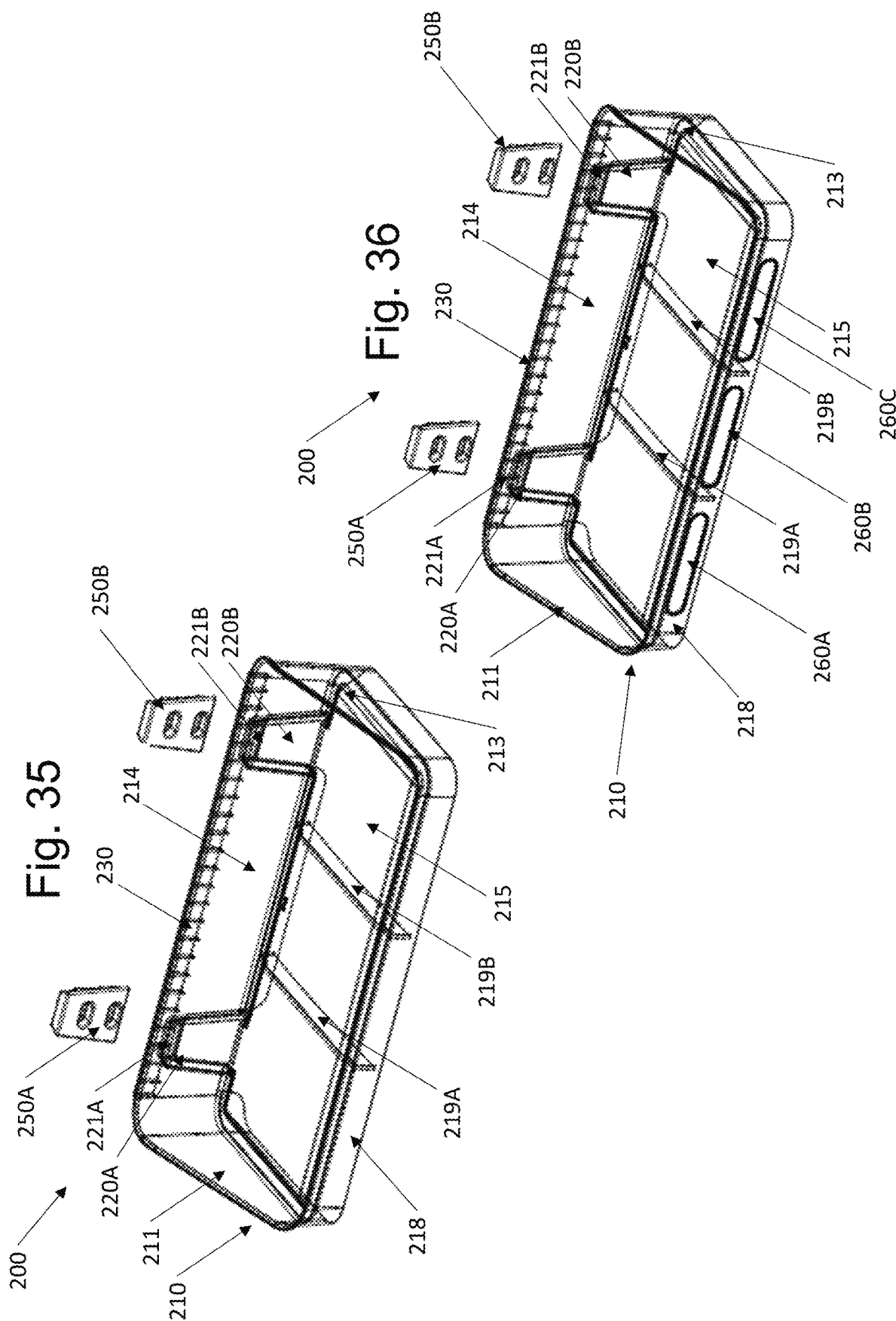

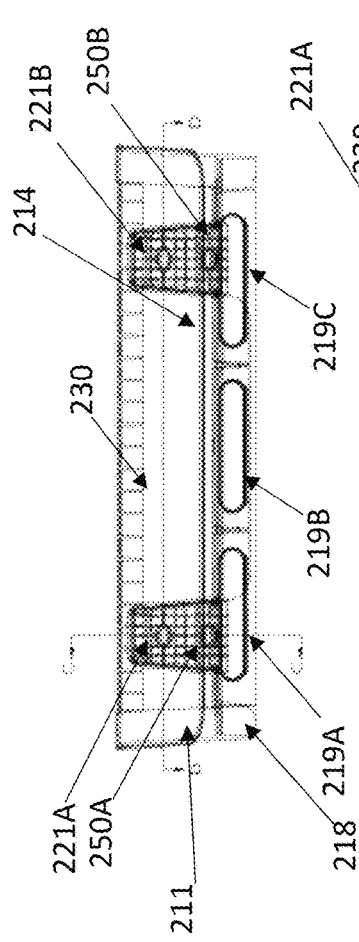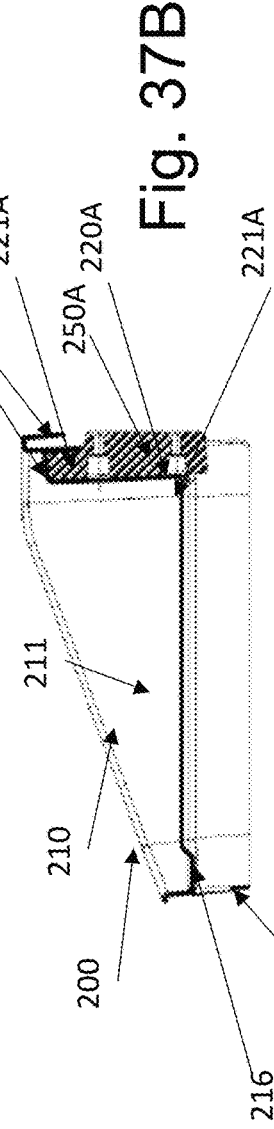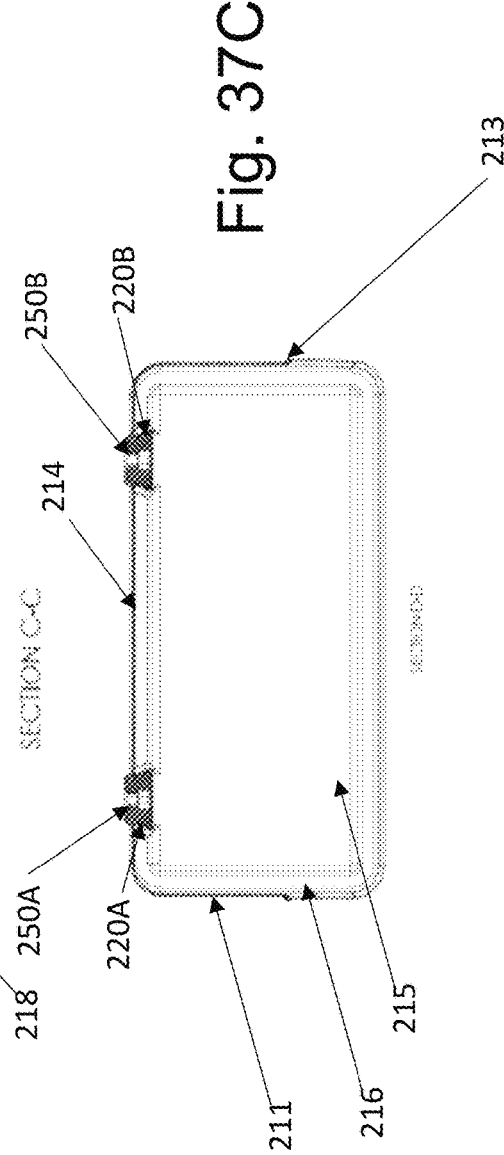

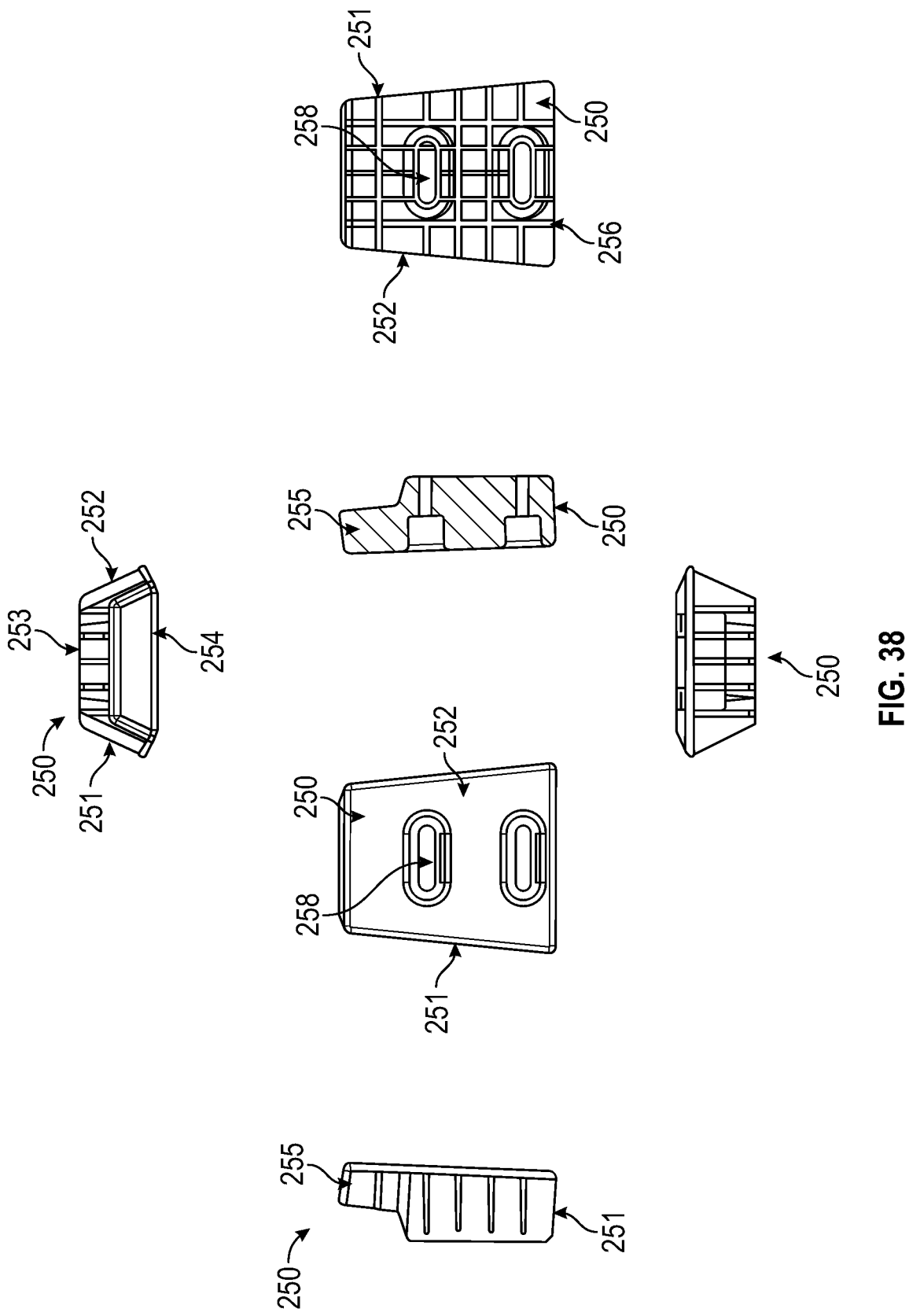

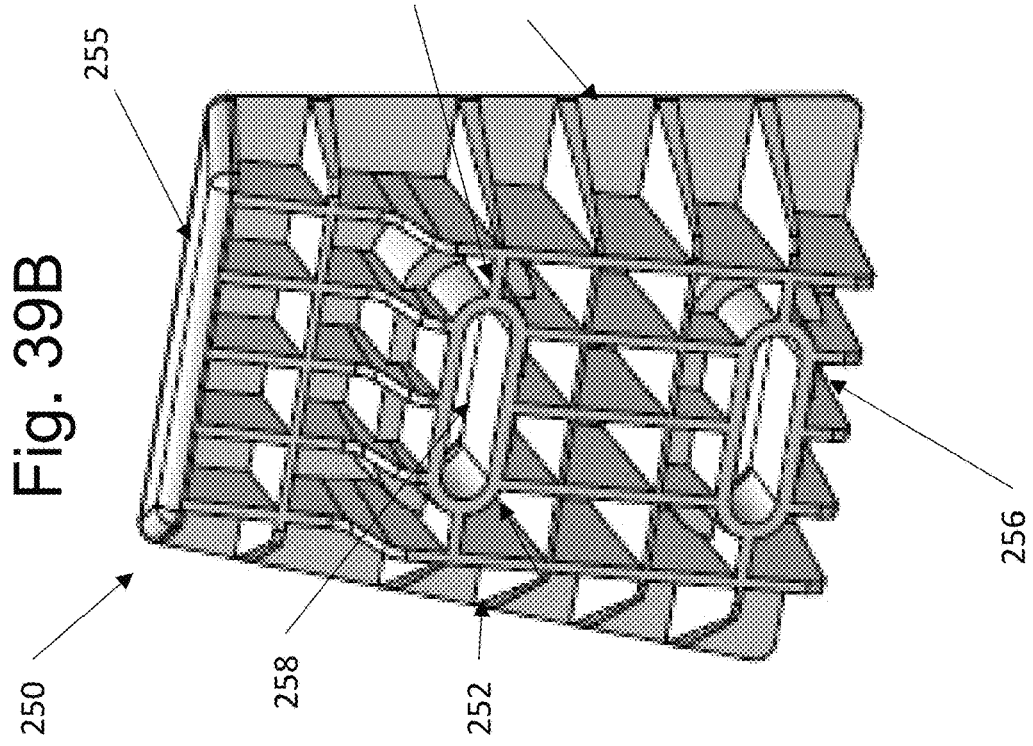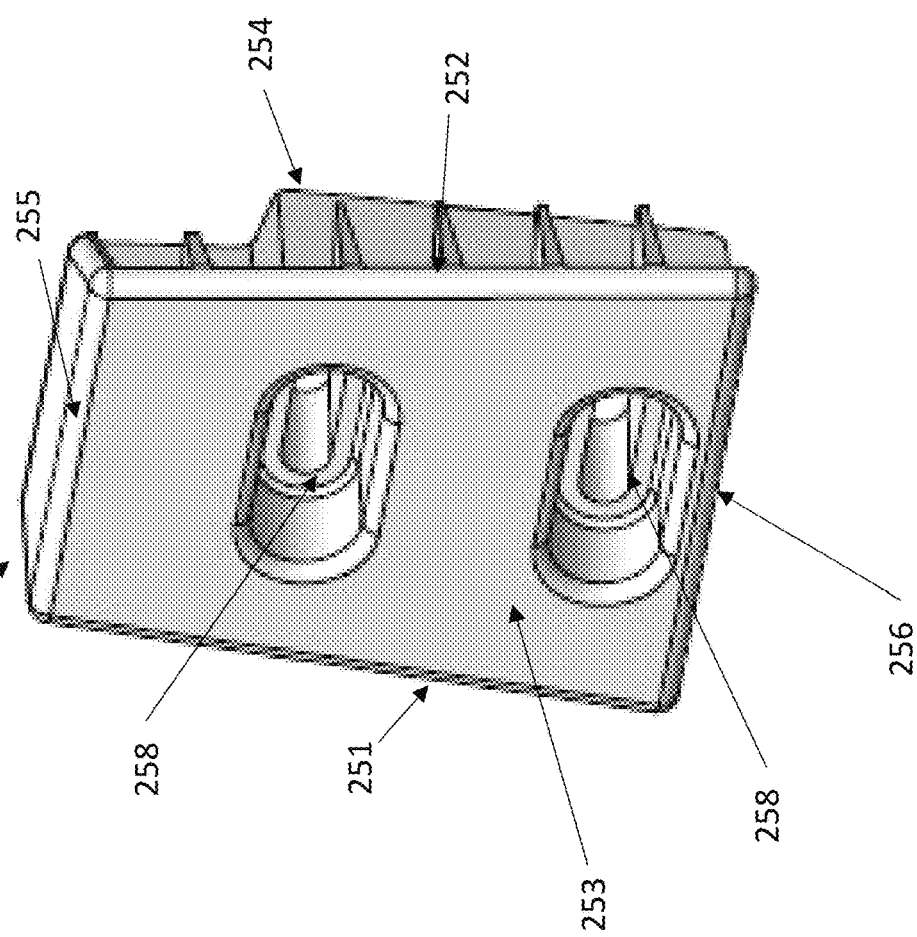

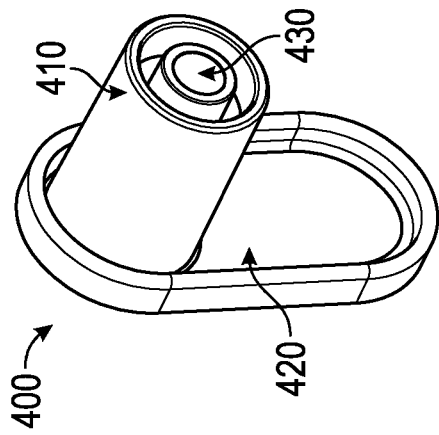
FIG. 43
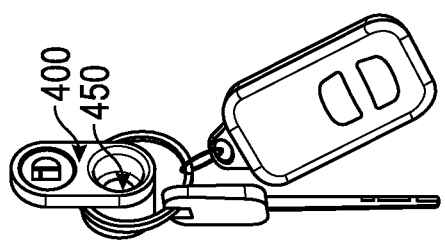
FIG. 45
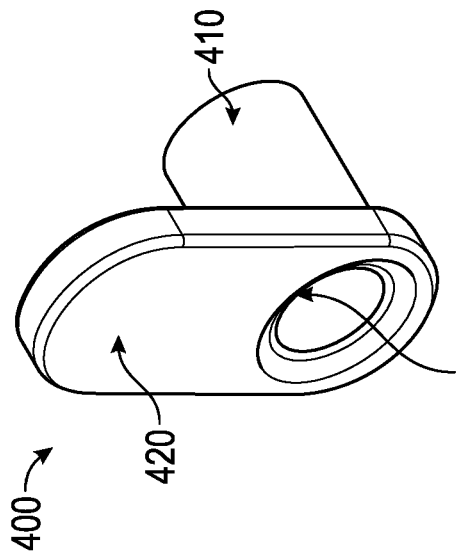
FIG. 42
FIG. 44

BRACKETS, BINS, AND SHELVES

CROSS-REFERENCE TO RELATED CASES

This case claims priority to, and the benefit of, U.S. Provisional Application Ser. No. 63/407,799, filed on Sep. 19, 2022, and U.S. Provisional Application Ser. No. 63/315,781, filed Mar. 2, 2022, the entire disclosures of which are incorporated herein by reference in their entireties as though fully recited herein.

FIELD

The inventive concepts disclosed herein relate generally to systems and methods for removably mounting storage containers, such as shelves and bins, to a support surface, such as a structure wall.

BACKGROUND

Wall-mounted storage systems are known in the art and generally used to organize and store items at an elevated position. Traditional mounted systems may require permanent affixion to a support surface, such as a wall. In the case of removable wall-mounted storage systems, the storage bin or shelf can be difficult to remove and re-insert on the wall or mounting fixture or may require a locking mechanism to retain the storage bin on a mounting device. There is a need for improved removable wall-mounted bins and shelves and associated mounting hardware.

SUMMARY

Exemplary bins, shelves, and other holders secure to a wall or other surface with a mounting bracket having a truncated wedge shape and beveled side edges, with the bins and shelves having a correspondingly sized and shaped back recess. In exemplary embodiments, the truncated wedge shape and beveled edges of each of the bin or shelf and mounting bracket guide the bin or shelf onto the mounting bracket, facilitating easy insertion and removal of the bin or shelf on the mounting bracket. Exemplary bin and shelf embodiments have a recess with a downward-facing cavity, which further facilitates retention of the bin or shelf on the mounting bracket. This simplistic design retains the bin or shelf on the mounting bracket without the use of a locking mechanism, increasing the ease with which a user can remove and re-insert the bin or shelf onto the mounting bracket.

The above and other aspects and advantages of the general inventive concepts will become more readily apparent from the following description and figures, illustrating by way of example, the principles of the general inventive concepts.

The present application discloses an exemplary bin mounting system that comprises a mounting bracket and a bin. The mounting bracket is configured with a truncated wedge shape and beveled side edges. The bin has a front wall, a rear wall, a left side wall, a right side wall, a bottom wall, a recess on an outside of the rear wall, and a reinforcement edge along a top edge of the rear wall. The recess comprises (i) a downward-facing cavity at a top portion of the recess, (ii) side edges that are beveled and (iii) a truncated wedge shape complimentary to the mounting bracket. The recess is configured to slidably engage the mounting bracket. A top portion of the mounting bracket extends into the recess and optionally contacts a distal end of the recess. The top portion of the mounting bracket is covered by the portion of the bin (e.g., a portion 123 of the back wall extending over the recess) forming the cavity, such that when the mounting bracket is engaged with the recess the bin is secured to the mounting bracket and prevented from being pulled forward from said mounting bracket. The present application further discloses a bin mounting system comprising a mounting bracket and a bin. The bin comprises a front wall, a rear wall, a left side wall, a right side wall, a bottom wall, and a recess on an outside of the rear wall. The recess is configured to slidably engage the mounting bracket and a top portion of the mounting bracket extends into the recess and optionally contacts a distal end of the recess, such that when the mounting bracket is engaged with the recess the bin is secured to the mounting bracket and prevented from being pulled forward from said mounting bracket.

The present application further discloses an exemplary method for removably attaching a bin to a wall that comprises providing a mounting bracket, securing the mounting bracket to a wall, providing a bin, positioning the bin proximate the structure wall over the secured mounting bracket, and slidably lowering the bin down onto the secured mounting bracket. The mounting bracket has a truncated wedge shape and beveled side edges. The bin has a front wall, a rear wall, a left side wall, a right side wall, a bottom wall, a recess on an outside of the rear wall, and a reinforcement edge along a top edge of the rear wall. The recess comprises (i) a downward-facing cavity at a top portion of the recess, (ii) side edges that are beveled and (iii) a truncated wedge shape complimentary to the mounting bracket. The recess is configured to slidably engage the mounting bracket. A top portion of the mounting bracket extends into the recess and optionally contacts a distal end of the recess. The top portion of the mounting bracket is covered by the bin. The portion of the back wall forming the cavity is aligned over the secured mounting bracket when the bin is positioned proximate to the structure wall.

In an exemplary embodiment thereof, the method for removably attaching a bin to a wall includes providing at least one fastener; inserting said fastener or fasteners through the mounting bracket; and securing the mounting bracket to a wall using the fastener or fasteners.

In exemplary embodiments of any of the foregoing, the recess and the mounting bracket form a dove tail connection.

In exemplary embodiments of any of the foregoing, the rear wall is sized and angled such that a portion of the bin distal from the recess touches a structure wall when the mounting bracket is secured to a structure wall and the bin is secured to the mounting bracket. In some exemplary embodiments, a portion of the bin proximate the bottom of the bin touches the structure wall. In still further exemplary embodiments, a rear bottom edge of the bin touches the structure wall.

In exemplary embodiments of any of the foregoing, the beveled edges of the mounting bracket contact the beveled side edges of the recess over at least half the length, and in some embodiments, all of the length, of the side walls of the mounting bracket.

In exemplary embodiments of any of the foregoing, the bin further comprises a removable lid.

In exemplary embodiments of any of the foregoing, the left and right side walls have a draft angle of about 0.5-6 degrees, and in some embodiments, about 3 degrees.

In exemplary embodiments of any of the foregoing, a lower, bottom rear edge of the bin is sized, positioned, and configured to extend 0.01-2 inches past a structure wall. The bin is capable of flexing and the lower, bottom rear edge of the bin touches and slides down the structure wall as the bin is lowered onto the mounting bracket. In some exemplary embodiments, the rear wall is sized and angled such that a rear bottom edge of the bin touches the structure wall when the mounting bracket is secured to the structure wall, the bin is secured to the mounting bracket, and the bin is empty. In some exemplary embodiments, the rear wall is sized and angled such that a rear bottom edge of the bin touches the structure wall when the mounting bracket is secured to the structure wall, the bin is secured to the mounting bracket, and the bin is empty, and the bin is sized, positioned, and configured to extend 0.01-1 inches past the structure wall when there are contents in the bin. In some exemplary embodiments, the rear wall is sized and angled such that a rear bottom edge of the bin touches the structure wall when the mounting bracket is secured to the structure wall, the bin is secured to the mounting bracket, and the bin is empty, and the bin is sized, positioned, and configured to extend 0.01-1 inches past the structure wall when there are contents in the bin to apply tension to the bin structure to keep the bin in place. In some exemplary embodiments, the rear wall is sized, positioned, and configured such that a rear bottom edge of the bin extends 0.01-1 inches past the structure wall when the bin is empty, and the bin is sized, positioned, and configured to extend 0.05-2 inches past the structure wall when there are contents in the bin. In some exemplary embodiments, the rear wall is sized, positioned, and configured such that a rear bottom edge of the bin extends 0.01-1 inches past the structure wall when the bin is empty, and the bin is sized, positioned, and configured to extend 0.05-2 inches past the structure wall when there are contents in the bin to apply tension to the bin structure to keep the bin in place. In exemplary embodiments of any of the foregoing, the reinforcement edge is sized, positioned, and configured to extend 0.01-2 inches past a structure wall so the reinforcement edge, and optionally the bin, flexes and the reinforcement edge touches and slides down the structure wall as the bin is lowered onto the mounting bracket. In exemplary embodiments of any of the foregoing, a lower, bottom rear edge of the bin touches a structure wall about 0.01-2 inches above a final resting location of the lower, bottom rear edge as the bin is lowered onto the mounting bracket.

The present application further discloses exemplary systems and methods for mounting a shelf to a wall.

An exemplary method for removably attaching a shelf to a wall is disclosed herein. The method comprises providing a first mounting bracket, providing the shelf, positioning the shelf proximate the structure wall over the first secured mounting bracket with the first recess aligned over the first secured mounting bracket, and slidably lowering the shelf down onto the first secured mounting bracket. The first mounting bracket has a truncated wedge shape and beveled side edges. The shelf is comprised of a front wall, a rear wall, a left side wall, a right side wall, a bottom wall, a first recess on an outside of the rear wall, and a reinforcement edge along a top edge of the rear wall. The first recess has (i) a first downward-facing cavity at a top portion of the first recess, (ii) side edges that are beveled and (iii) a truncated wedge shape complimentary to the first mounting bracket. At least a portion of the first secured mounting bracket is within the first recess, and wherein a top portion of the first mounting bracket extends into the first recess and optionally contacts a distal end of the first recess.

In an exemplary embodiment thereof, the method of removably attaching a shelf to a wall further comprises providing a second mounting bracket, wherein the shelf further includes a second recess. The second mounting bracket is secured to a wall at a distance from the first secured mounting bracket equidistant to the distance between the first and second recesses on the shelf. The shelf is positioned proximate the structure wall over the first and second secured mounting brackets with the first and second recesses aligned over the first and second secured mounting brackets, respectively. The shelf is lowered down onto the first and second secured mounting brackets where at least a portion of the first and second secured mounting brackets is within the first and second recesses, respectively.

In an exemplary embodiment thereof, the method for removably attaching a shelf to a wall includes providing at least one fastener; inserting said fastener or fasteners through the mounting bracket; and securing the mounting bracket to a wall using the fastener or fasteners. In still further exemplary embodiments, the method for removably attaching a shelf to a wall includes providing at least a second fastener, inserting said second fastener or fasteners through the second mounting bracket, and securing the second mounting bracket to a wall using the fastener or fasteners.

The present application further discloses an exemplary shelf mounting system that comprises a first mounting bracket, a second mounting bracket, and a shelf. The first mounting bracket has a truncated wedge shape and beveled side edges. The shelf has a front wall, a rear wall, a left side wall, a right side wall, a bottom wall, a first recess on an outside of the rear wall, a second recess on an outside of the rear wall, and a reinforcement edge along a top edge of the rear wall. The first recess and second recesses each have (i) a first downward-facing cavity at a top portion of the first recess, (ii) side edges that are beveled and (iii) a truncated wedge shape complimentary to the first and second mounting brackets, respectively. The first and second recesses are configured to slidably engage the first and second mounting brackets, respectively. A top portion of each of the first and second mounting brackets extends into the first and second downward-facing cavities and optionally contacts a distal end of each of the first and second downward-facing cavities, respectively. The top portions of the first and second mounting brackets are covered by the portions of the bin (e.g., a portion of the back wall covering part of the recesses) forming the first and second downward-facing cavities, respectively, such that when the first and second mounting brackets are engaged with the first and second recesses the shelf is secured to the first and second mounting brackets and prevented from being pulled forward from said first and second mounting brackets. The present application further discloses a shelf mounting system comprising a mounting bracket and a shelf. The shelf comprises a front wall, a rear wall, a left side wall, a right side wall, a bottom wall, and a recess on an outside of the rear wall. The recess is configured to slidably engage the mounting bracket and a top portion of the mounting bracket extends into the recess and optionally contacts a distal end of the recess, such that when the mounting bracket is engaged with the recess the shelf is secured to the mounting bracket and prevented from being pulled forward from said mounting bracket.

In an exemplary embodiment of any of the foregoing, the reinforcement edge is a reinforcement edge extending longitudinally. In exemplary embodiments of any of the foregoing, the left and right side walls have a draft angle of about 0.5-6 degrees, and in some embodiments, about 3 degrees.

In an exemplary embodiment of any of the foregoing, the beveled edges of at least one of the mounting brackets contact the beveled side edges of at least one of the recesses over at least half the length of the side walls, and in some embodiments, the entire length, of the at least one mounting bracket.

In an exemplary embodiment of any of the foregoing, the reinforcement edge extends at least half the length of the rear wall of the shelf, and in some embodiments, the entire length of the rear wall of the shelf.

In an exemplary embodiment of any of the foregoing, the shelf further comprises a vertical reinforcement edge extending downwards from the front wall. In an exemplary embodiment, the vertical reinforcement edge comprises at least one hanging slot.

In exemplary embodiments of any of the foregoing, the rear wall is sized and angled such that a portion of the bin distal from the recess touches a structure wall when the mounting bracket is secured to a structure wall and the shelf is secured to the mounting bracket. In some exemplary embodiments, a portion of the bin proximate the bottom of the shelf touches the structure wall. In still further exemplary embodiments, a rear bottom edge of the shelf touches the structure wall.

In exemplary embodiments of any of the foregoing, the beveled edges of the mounting bracket contact the beveled side edges of the recess over at least half the length, and in some embodiments, all of the length, of the side walls of the mounting bracket.

In exemplary embodiments of any of the foregoing, a lower, bottom rear edge of the shelf is sized, positioned, and configured to extend 0.01-2 inches past a structure wall. The shelf is capable of flexing and the lower, bottom rear edge of the shelf touches and slides down the structure wall as the shelf is lowered onto the mounting brackets. In some exemplary embodiments, the rear wall is sized and angled such that a rear bottom edge of the shelf touches the structure wall when the mounting brackets are secured to the structure wall, the shelf is secured to the mounting brackets, and the shelf is empty. In some exemplary embodiments, the rear wall is sized and angled such that a rear bottom edge of the shelf touches the structure wall when the mounting brackets are secured to the structure wall, the shelf is secured to the mounting brackets, and the shelf is empty, and the shelf is sized, positioned, and configured to extend 0.01-1 inches past the structure wall when there are contents on the shelf. In some exemplary embodiments, the rear wall is sized and angled such that a rear bottom edge of the shelf touches the structure wall when the mounting brackets are secured to the structure wall, the shelf is secured to the mounting brackets, and the shelf is empty, and the shelf is sized, positioned, and configured to extend 0.01-1 inches past the structure wall when there are contents on the shelf to apply tension to the shelf structure to keep the shelf in place. In some exemplary embodiments, the rear wall is sized, positioned, and configured such that a rear bottom edge of the shelf extends 0.01-1 inches past the structure wall when the shelf is empty, and the shelf is sized, positioned, and configured to extend 0.05-2 inches past the structure wall when there are contents on the shelf. In some exemplary embodiments, the rear wall is sized, positioned, and configured such that a rear bottom edge of the shelf extends 0.01-1 inches past the structure wall when the shelf is empty, and the shelf is sized, positioned, and configured to extend 0.05-2 inches past the structure wall when there are contents on the shelf to apply tension to the shelf structure to keep the shelf in place. In exemplary embodiments of any of the foregoing, the reinforcement edge is sized, positioned, and configured to extend 0.01-2 inches past a structure wall so the reinforcement edge, and optionally the shelf, flexes and the reinforcement edge touches and slides down the structure wall as the shelf is lowered onto the mounting brackets. In exemplary embodiments of any of the foregoing, a lower, bottom rear edge of the shelf touches a structure wall about 0.01-2 inches above a final resting location of the lower, bottom rear edge as the shelf is lowered onto the mounting brackets.

The present application further discloses an exemplary multi-hook system that comprises a mounting bracket and a plurality of face plates. The mounting bracket comprises a linear support surface, a plurality of reinforcement edges extending forward from the linear support surface, and a plurality of grooves. The reinforcement edges and grooves alternate along the linear support surface. The reinforcement edges each comprise a front face having at least of one slot or a rail, and each of the reinforcement edges has a height (PH) and width (PW). The plurality of face plates each comprise a front side and a rear side. The rear sides each comprise at least one of a rail or a slot. The plurality of face plates each have a height (FH) and a width (FW). Each of the face plates can be slidably attached to one of the plurality of reinforcement edges by inserting the at least one rail into the at least one slot and sliding the face plate onto the reinforcement edge. FW is the same as PW, but the ratio of FH:PH is 1.25:1-2.5:1.

In an exemplary embodiment, the system comprises 2-15 reinforcement edges, 5-10 reinforcement edges, or 7 reinforcement edges. In an exemplary embodiment, the system comprises 1-14 grooves, 4-9 grooves, or 6 grooves.

In an exemplary embodiment, the face plate is stadium-shaped.

In an exemplary embodiment, the face plate has two rails and the front face of the reinforcement edge comprises two slots.

In an exemplary embodiment, the grooves are substantially parabolic or sinusoidal-shaped. In an exemplary embodiment, the plurality of grooves and reinforcement edges alternative every other one of each along the linear support surface.

BRIEF DESCRIPTION OF FIGURES

These and other features of the general inventive concept will become better understood with regard to the following description and accompanying drawings in which:

FIG. 4A shows a left side elevational view of the mounting bracket of FIG. 2 and a bin like the bin of FIG. 2, only taller, affixed to a structure wall;

FIG. 4B shows a left side elevational view of the mounting bracket of FIG. 4A and a bin like the bin of FIG. 4A, affixed to a shortened structure wall, wherein the rear bottom edge of the bin is displaced rearwards past the vertical plane of the structure wall;

FIG. 8A shows a front elevational view of a bin and mounting bracket according to an exemplary embodiment;

FIG. 8B shows a rear/left/top perspective view of the bin and mounting bracket of FIG. 8A;

FIG. 9 shows various views of a mounting bracket according to an exemplary embodiment;

FIG. 29 illustrates a cross-sectional view of the recess and cavity of a bin according to an exemplary embodiment;

FIGS. 30A-30C illustrate rear elevational and top and right-side cross-sectional views of a bin and mounting bracket according to an exemplary embodiment;

FIG. 34 shows a left side sectional view of a bin and mounting bracket according to an exemplary embodiment secured to a structure wall taken through one of the fastener openings;

FIG. 35 shows a front/right/top perspective view of a shelf and two mounting brackets according to an exemplary embodiment;

FIG. 36 shows a front/right/top perspective view of a shelf and two mounting brackets according to another exemplary embodiment;

FIGS. 37A-37C illustrate rear elevational and top and right-side cross-sectional views of a shelf and mounting bracket according to an exemplary embodiment;

FIG. 38 shows various views of a mounting bracket according to an exemplary embodiment;

FIG. 39A shows a front/right/top perspective view of the mounting bracket of FIG. 34;

FIG. 39B shows a rear/left/top perspective view of the mounting bracket of FIG. 34;

FIG. 42 is a front/right/top perspective view of a hook according to an exemplary embodiment;

FIG. 43 is a rear/bottom/left perspective view of the hook of FIG. 42;

FIG. 44 is a left side cross-sectional view of the hook of FIG. 42;

FIG. 45 is a front/left/top perspective view of the hook of FIG. 42 affixed to a structure wall;

DESCRIPTION OF THE FIGURES

With reference to the figures, improved systems and methods are provided for stacking bins and removably attaching bins to a wall, such as a garage wall, laundry room wall, or playroom wall. Some of the bins, bins with lids, dividers and organizers, are previously disclosed and described in application Ser. No. 29/812,282, filed Oct. 20, 2021, including the appendix thereto, Application Ser. No. 63/315,781, filed Mar. 2, 2022, Application Ser. No. 29/837,209, filed May 3, 2022, and Application Ser. No. 29/850,948, filed Aug. 24, 2022, which are all hereby incorporated by reference in their entireties.

This detailed description merely describes exemplary embodiments of the invention and is not intended to limit the scope of the invention in any way. Indeed, the contemplated invention is broader than the exemplary embodiments. The terms used in any future claims have their full ordinary meaning unless an express definition is provided herein.

Figure 1:
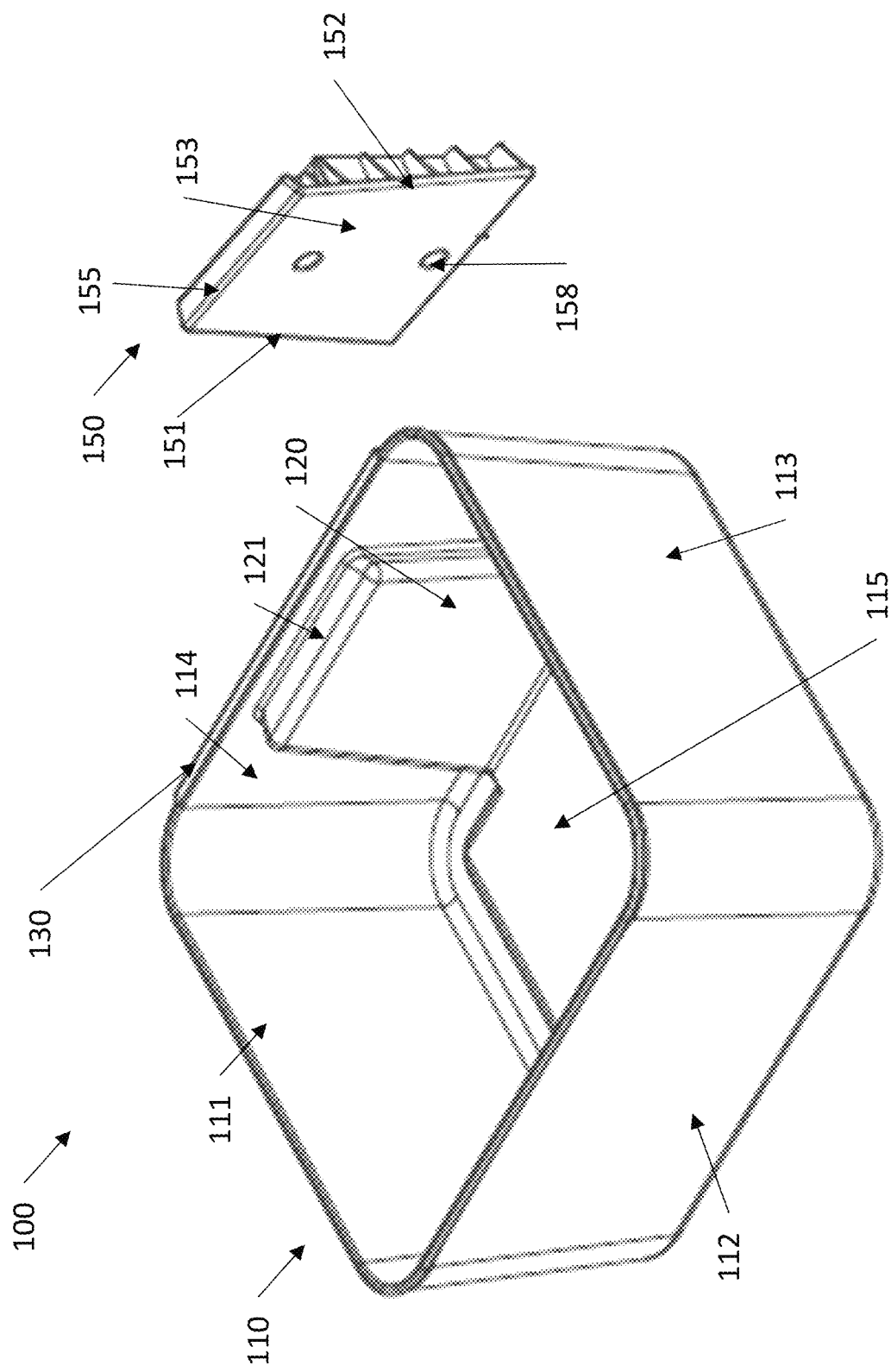
FIG. 1 illustrates a bin and mounting bracket according to an exemplary embodiment.

In FIGS. 1-5, an exemplary embodiment of a bin mounting system, including a bin 110 and mounting bracket 150, is shown (the bin in FIG. 4A is taller and does not have the reinforcement edge 130 but is otherwise the same as the bins shown in FIGS. 1-3 and 5). FIG. 1 illustrates an exemplary bin mounting system 100 comprising bin 110 and mounting bracket 150. The bin 110 may be of any shape and configuration, including circular, ovular, stadium-shaped, and open-faced. In exemplary embodiments, the bin 110 is substantially rectangular in shape, as shown herein. In exemplary embodiments, the corners of the bin 110 are curved. As shown in FIG. 1, the bin 110 comprises a front wall 112, a rear wall 114, a left side wall 111, a right side wall 113, and a bottom wall 115. The bin 110 has a recess 120 on the outside of its rear wall 114 to accept a mounting bracket 150. In exemplary embodiments, the recess 120 includes a downward-facing cavity 121 at a top portion of the recess 120. In exemplary embodiments, the recess 120 has side edges that are beveled. In exemplary embodiments, the recess 120 is shaped like a truncated wedge, such that the width of the top portion of the recess 120 is shorter than the width of the bottom portion of the recess 120, and the edges of the recess 120 taper outwards towards the bottom wall 115 of the bin 110. In some exemplary embodiments, the recess extends all the way to the edge of the bottom wall 150 of the bin 110. In exemplary embodiments, the bin 110 further includes a reinforcement edge 130 along a top edge of the rear wall 114 (perhaps shown best in FIG. 29). In exemplary embodiments, the recess 120 is integrally molded into the rear wall 114 of the bin 110. In exemplary embodiments of the bins shown herein, the entire bin structure shown, including the recess 120 and the reinforcement edge 130 are integrally molded as a unitary piece.

The exemplary mounting bracket 150 comprises at least a top portion 155, a left side edge 151, a right side edge 152, a bottom portion 156, a front face 153, and a back face (not shown in FIG. 1). In exemplary embodiments, the mounting bracket 150 may further include at least one orifice 158, and preferably at least two orifices 158, through which a fastener (e.g., threaded fasteners driven into wall studs or into dry wall using wall anchors) may be inserted in order to secure the mounting bracket 150, and therein the bin 110, to a support surface, such as a structure wall.

Figure 2:
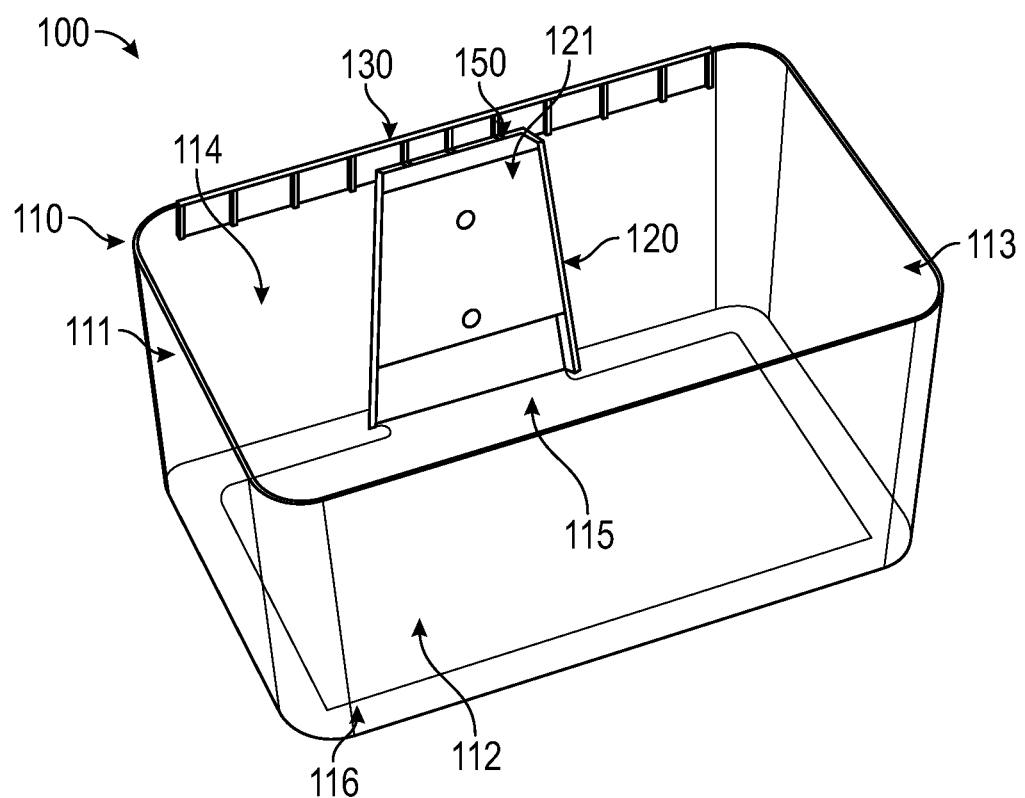
FIG. 2 shows a front/left/top perspective view of a bin and mounting bracket according to an exemplary embodiment.
Figure 3:
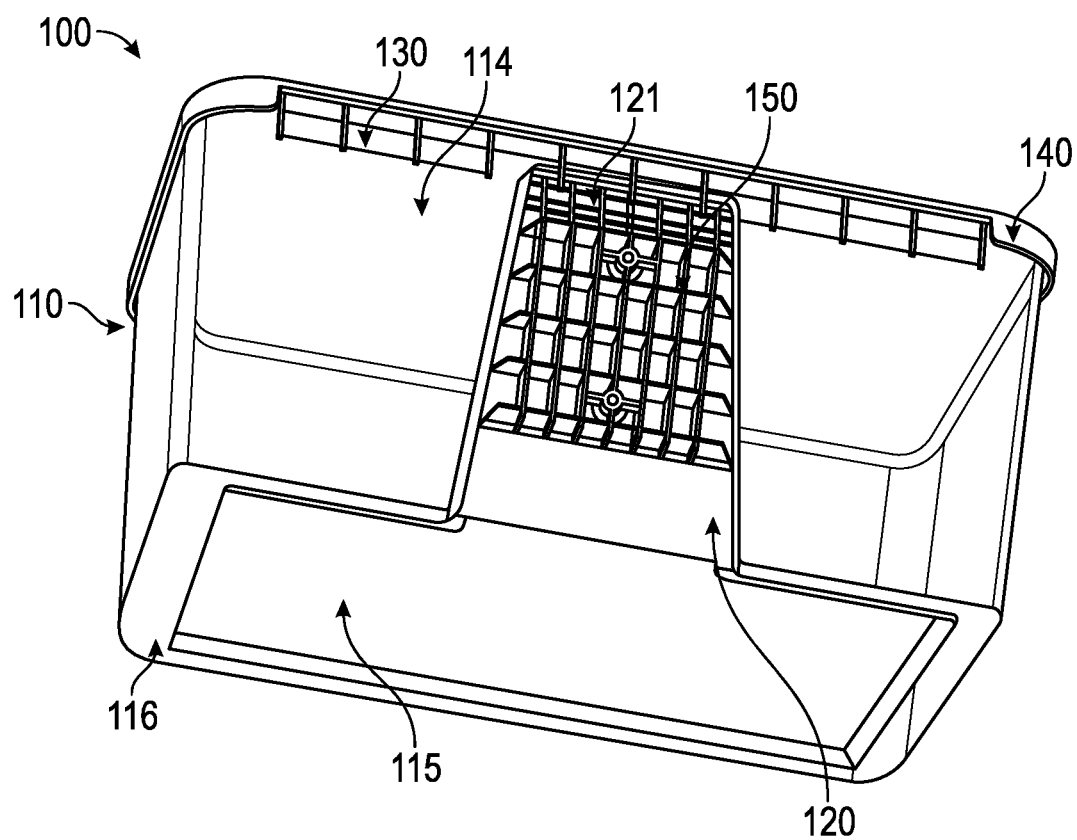
FIG. 3 shows a rear/right/bottom perspective view of the bin and mounting bracket of FIG. 2.
Figure 5:
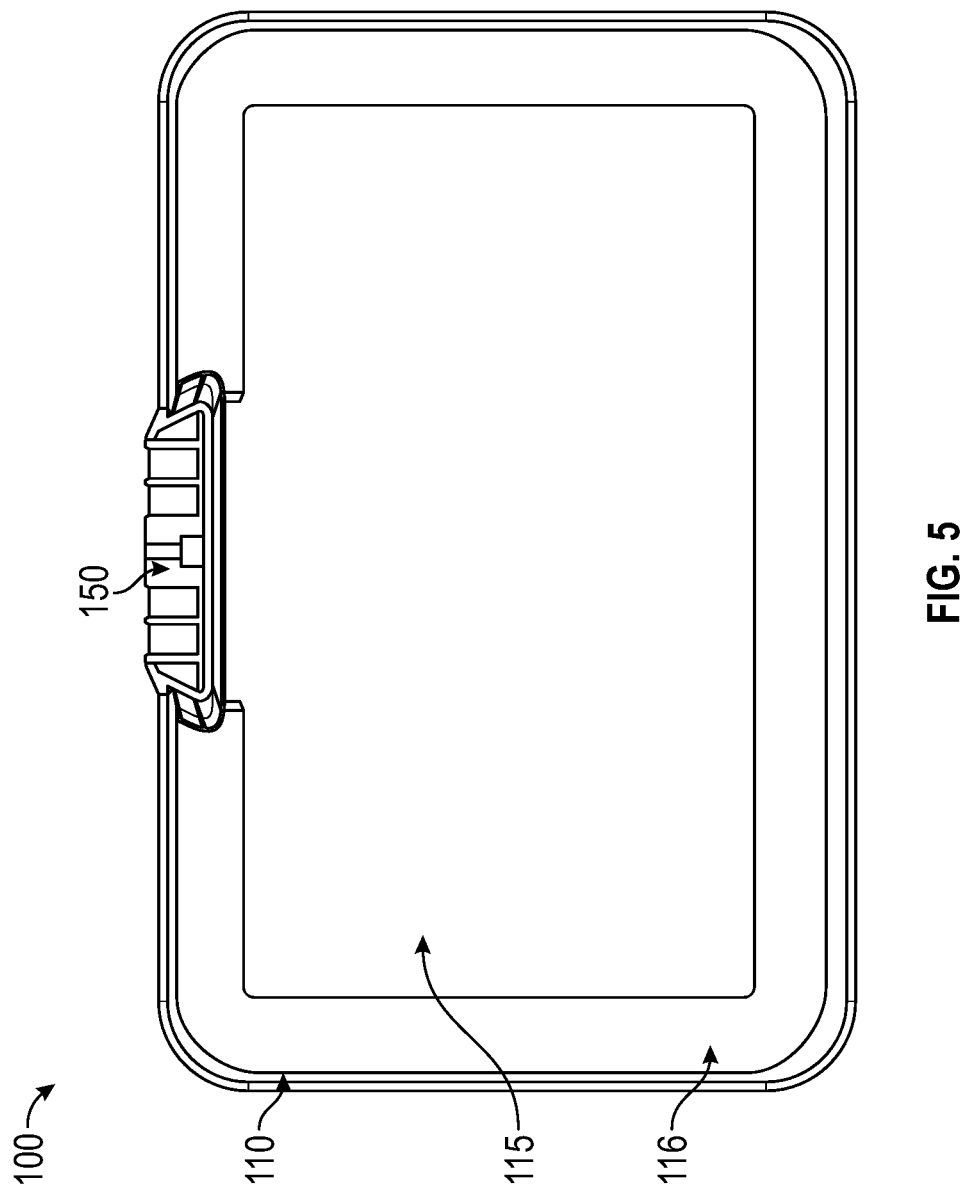
FIG. 5 shows a top cross sectional view of the bin and mounting bracket of FIG. 2 taken through one of the fastener openings.

As shown in FIGS. 2-3, the recess 120 is configured to slidably engage the mounting bracket 150, such that the shape of the recess 120 is complimentary to that of the mounting bracket 150. The mounting bracket 150 may be of circular, rectangular, linear, or any other shape. The shape of the recess 120 preferably at least partially mimics the shape of the mounting bracket 150. In exemplary embodiments, the mounting bracket 150 has a truncated wedge shape. In further exemplary embodiments, the recess 120 has a truncated wedge shape. In still further exemplary embodiments, the sides of the mounting bracket 150 and the recess 120 are beveled. In exemplary embodiments, the recess 120 is integrally molded into the rear wall 114, wherein the narrow, top portion of the truncated-shaped recess 120 is towards the top of the rear wall 114, and the recess 120 extends downward to the bottom wall 115, wherein the width of the recess 120 is greatest where the recess 120 meets the bottom wall 115. A top portion 153 of the mounting bracket 120 extends into the downward-facing cavity 121 and optionally contacts a distal end of the downward-facing cavity 121, wherein the top portion 153 of the mounting bracket 150 is covered by the portion of the bin (e.g., back wall portion 123 covering the recess) forming the downward-facing cavity 121, such that when the mounting bracket 120 is engaged with the recess 120 the bin 110 is secured to the mounting bracket 150 and prevented from being pulled forward from said mounting bracket 150. In exemplary embodiments, the mounting bracket 150 and the recess 120 form a dove-tail, or reverse dove-tail connection. The dove-tail or reverse dove-tail connection serves to further secure the bin 110 to the mounting bracket 150 and prevent movement of the bin 110 away from the mounting bracket 150 in the left, right or forward directions when the bin 110 is secured to the mounting bracket 150. In some exemplary embodiments, the bottom surface 115 of the bin 110 further comprises a channel 116 along an outer edge of the bottom surface 115, such that the center portion of the bottom surface 115 is raised vertically in comparison to the depth of the channel 116.

The bins 110 and mounting brackets 150 may be made of any suitable material, including plastic, wood, metal, or metal-wire. In exemplary embodiments, the bin 110 and mounting bracket 150, and other pieces are injection molded using traditional injection molding techniques. In exemplary embodiments, the bins 110 are integrally molded from polyethylene terephthalate (PET), e.g., recycled PET or a blend of recycled and virgin PET. In exemplary embodiments, the mounting brackets 150 are integrally molded from polypropylene (PP).

In some exemplary embodiments, at least one of the internal surfaces of the recess 120 and the surface of the mounting bracket 150 contain features which increase the friction between said surfaces, e.g., ribbing, rubber or elastomeric materials, to inhibit lateral motion of the mounting bracket 150 within the recess 120.

FIG. 4A shows a left side elevational view of the bin and mounting bracket of FIG. 2 (except that the bin in FIG. 4A is taller and does not have the reinforcement edge 130 but is otherwise the same as the bin shown in FIGS. 1-3 and 5) affixed to a structure wall. The mounting bracket 150 may be secured to the structure wall via any means, including adhesives, threaded fasteners, and the like. In some exemplary embodiments, the mounting bracket 150 is secured to the structure wall using threaded fasteners (with optional wall anchors) and/or adhesive inserted through the at least one orifice 158 in the mounting bracket 150.

FIG. 4B shows a left side elevational view of the bin 100 and mounting bracket 117 of FIG. 4A, affixed to a structure wall, wherein the bin is flexed, i.e., displaced at a distance Δ rearwards past the vertical plan of the support wall to which it is affixed. The flex of the bin 110 can be quantified by measuring the displacement distance Δ of the rear bottom edge 117 of the bin 110 towards a structure wall when contents are placed in the bin 110. Utilizing an exemplary embodiment of the bin mounting system 100, the mounting bracket 150 was secured to the structure wall. The structure wall below the mounting bracket 150 was removed so the lower back edge of the bin 117 could extend rearwards past the vertical plane of the support wall to which the mounting bracket 117 was secured as the bin 110 is flexed by a load. The bin 110 was secured on the mounting bracket 150. When the bin 110 was secured on the mounting bracket 150 without a load or contents therein, the lower back edge 117 of the bin 110 aligned with the vertical plane of the support wall to which the mounting bracket 150 was secured, as though it was just touching the structure wall (even though there was no structure wall there). The bin 110 was loaded with 35 pounds, which was relatively uniformly distributed within the bin 110. The bin 110, with contents therein, flexed downwards and the lower back edge 117 of the bin 110 displaced at a distance Δ rearwards past the vertical plane of the support wall to which the mounting bracket 150 was secured. The displacement distance Δ of the rear bottom edge 117 of the bin 110 was measured between 0.030"-0.050" with an applied load of 35 pounds. If the structure wall had been proximate the lower back edge 117 of the bin 110 when it was loaded with contents, there would have been increased force against the structure wall applied by the flexing bin 110. In exemplary embodiments, the displacement distance is about 0.030" to about 0.5". In other exemplary embodiments, the displacement distance is about 0.010" to about 0.5".

In some exemplary embodiments, the left and right side walls 111, 113 of the bin 110 have a draft angle (angle between the side wall and vertical) of about 0.5-6 degrees, e.g., 0.75-2 degrees. In exemplary embodiments where the bins 110 do not need to nest with one another, the angle would be about 1°. In exemplary embodiments where the bins 110 do need to nest with one another, e.g., for shipping, the angle would be 3-5°, depending on the height of the bin. Exemplary embodiments would be 4°-5°. Exemplary embodiments would be about 3°. Accordingly, in some exemplary embodiments, although the top of the bin 110 contacts the structure wall when placed over the mounting bracket 150, there would be a gap between the bottom of the back of the bin 110 and the structure wall.

In exemplary embodiments, the rear wall 114 is sized and angled such that a portion of the bin 110 distal from the recess 120 touches a structure wall when the mounting bracket 150 is secured to a structure wall and the bin 110 is secured to the mounting bracket 150. In some embodiments, the rear wall 114 is sized and angled such that a portion of the bin 110 proximate the bottom of the bin 110 touches the structure wall when the mounting bracket 150 is secured to the structure wall and the bin 110 is secured to the mounting bracket 150. In some exemplary embodiments, the rear wall 114 is sized and angled such that a rear bottom edge of the bin 110 touches the structure wall when the mounting bracket 150 is secured to the structure wall and the bin 110 is secured to the mounting bracket 150. In still further exemplary embodiments, the rear wall 114 is sized and angled such that a portion of the bin 110 proximate the recess 120 touches the structure wall when the mounting bracket is secured to the structure wall and the bin 110 is secured to the mounting bracket 150. In exemplary embodiments, at least a portion of the reinforcement edge 130 along the rear wall 114 of the bin 110 touches the structure wall when the mounting bracket 150 is secured to the structure wall and the bin 110 is secured to the mounting bracket 150. In still further exemplary embodiments, the entire reinforcement edge 130 along the rear wall 114 of the bin 110 touches the structure wall when the mounting bracket 150 is secured to the structure wall and the bin 110 is secured to the mounting bracket 150. In exemplary embodiments, the bin 110 has at least two points of contact with the structure wall, such as at least a portion of the reinforcement edge 130 and at least a portion of the rear wall 114, when the mounting bracket is secured to the structure wall and the bin 110 is secured to the mounting bracket 150.

In exemplary embodiments, the lower, bottom rear edge 117 of the bin 110 is sized, positioned, and configured to cooperate with the reinforcement edge 130, the mounting bracket 150, and the bin recess 120 to touch the structure wall and apply tension in the bin structure as the bin 110 is lowered onto the mounting bracket 150. In exemplary embodiments, the lower, bottom rear edge 117 is sized, position, and configured to just touch the structure wall when the bin 110 is empty. In some exemplary embodiments, the lower, bottom rear edge 117 is sized, position, and configured to touch the structure wall when the bin 110 is empty. In exemplary embodiments, the lower, bottom rear edge 117 is sized, position, and configured to just touch the structure wall when the bin 110 is empty. In some exemplary embodiments, the lower, bottom rear edge 117 is sized, position, and configured to touch the structure wall when the bin 110 is empty and is configured to extend at a displacement distance Δ, e.g., 0.01-1 inches, rearwards past the vertical plane of a structure wall when there are contents within the bin 110 to apply tension in the bin structure against wall to help keep the bin 110 in place. In other exemplary embodiments, the lower, bottom rear edge 117 is sized, positioned, and configured to extend normally at displacement distance Δ, e.g., 0.01-2 inches, rearwards past the vertical plane of a structure wall when the bin 110 is empty, such that the bin 110 flexes a little and the lower, bottom rear edge 117 of the bin 110 touches and slides a little down the structure wall as the bin 110 is lowered onto the mounting bracket 150 (e.g., FIG. 4A and FIG. 4B) to apply tension in the bin structure against the structure wall to help keep the bin 110 in place. In other exemplary embodiments, the lower, bottom rear edge 117 is sized, positioned, and configured to extend normally at a displacement distance Δ, e.g., 0.05-2 inches, rearwards past the vertical plane of a structure wall when there are contents in the bin 110, such that the bin 110 flexes further than when the bin is empty and the lower, bottom rear edge 117 of the bin 110 touches and slides a little down the structure wall as the bin 110 is lowered onto the mounting bracket 150 (e.g., FIG. 4A and FIG. 4B) to apply additional tension in the bin structure against the structure wall to help keep the bin 110 in place. In some exemplary embodiments, the reinforcement edge 130 is sized, positioned, and configured to extend a little bit (e.g., 0.01-2 inches, and preferably 0.1-0.8 inches) rearwards past the vertical plane of a structure wall normally so the reinforcement edge 130 and perhaps the bin 110 flexes a little and the reinforcement edge 130 touches and slides a little down the structure wall as the bin 110 is lowered onto the mounting bracket 150 (e.g., FIGS. 4A-4B). In some exemplary embodiments, the lower, bottom rear edge of the bin 117 touches the structure wall about 0.01-2 inches above its final location as the bin 110 is lowered onto the mounting bracket 150. In some exemplary embodiments, the tension is caused by both the lower, bottom rear edge 117 of the bin 110 and/or the reinforcement edge 130 touching the structure wall and being in tension in the final resting place with the bin 110 mounted to the mounting bracket 150.

FIGS. 5-10B illustrate various exemplary embodiments of mounting bracket 150 and recess 120 configurations. FIGS. 5 and 6A, and 8A-8B, show a top perspective view of the bin 110 and mounting bracket 150 of FIG. 2. In some exemplary embodiments, the mounting bracket 150 has a first piece, e.g., a housing, and a second piece, e.g., a cover. In some exemplary embodiments, the housing is proximate to the support wall (not shown) and the cover is proximate to the surface of the rear wall 114 of the bin 120, such as within the recess 120, when the bin 110 is secured to the mounting bracket 150. In exemplary embodiments, the cover and the housing are secured to one another via a snap fit or by sliding into one another.

Figure 6A:
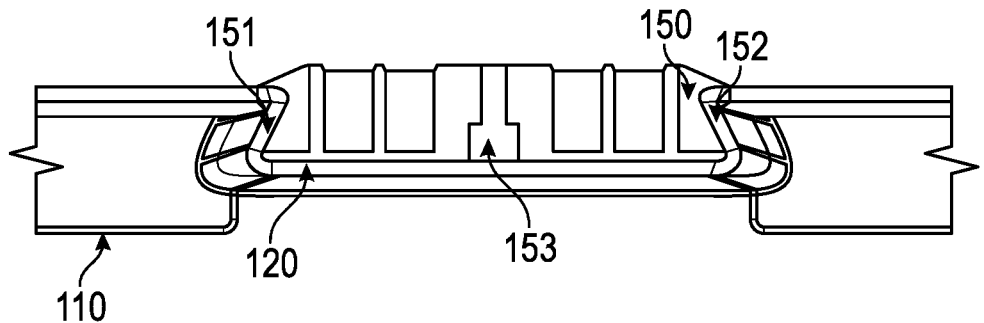
FIGS. 6A-6C are top cross sectional views illustrating various exemplary embodiments of mounting bracket and recess configurations taken through one of the fastener openings.
Figure 6B:
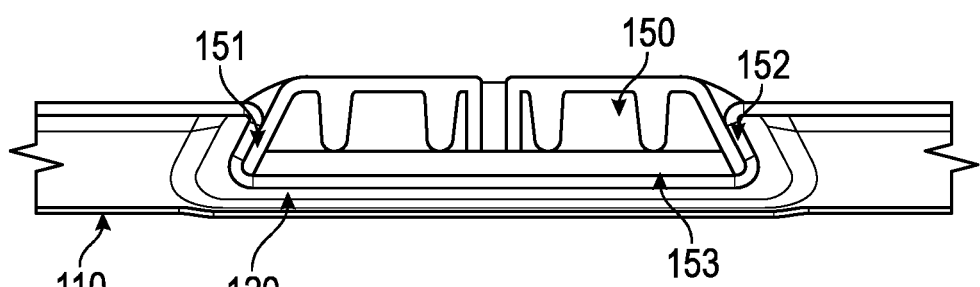
Figure 6C:
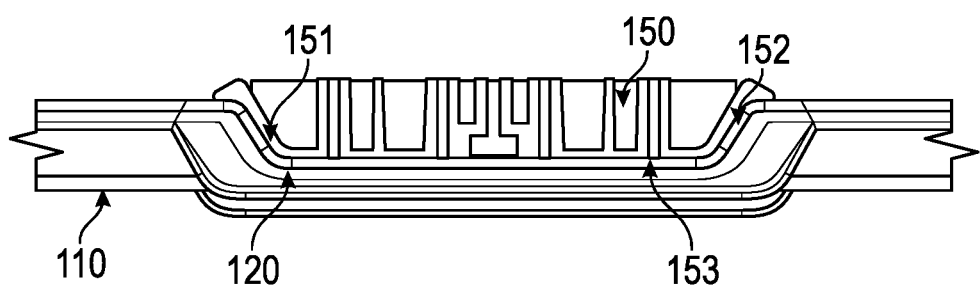
Figure 7B:
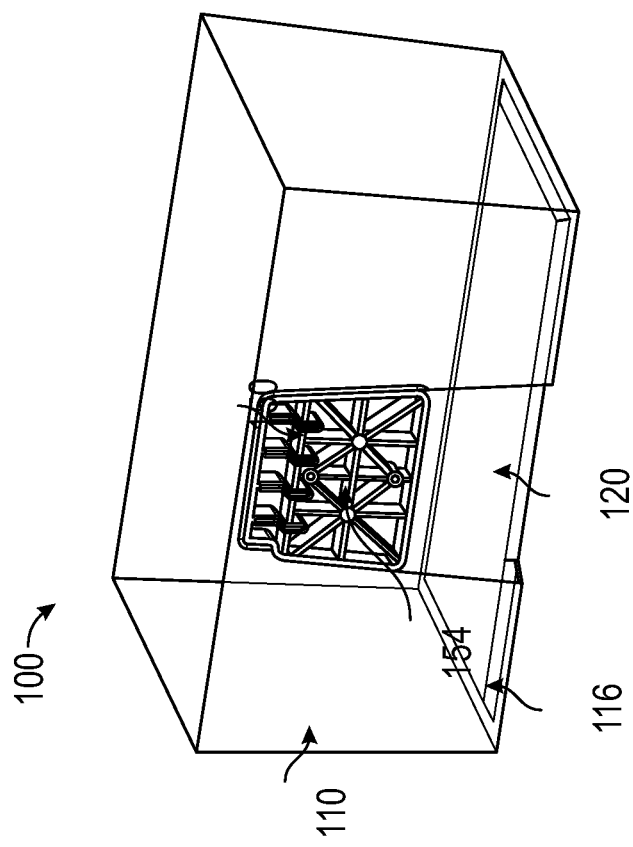
FIG. 7B shows a rear/left/top perspective view of the bin and mounting bracket of FIG. 7A.
Figure 7A:
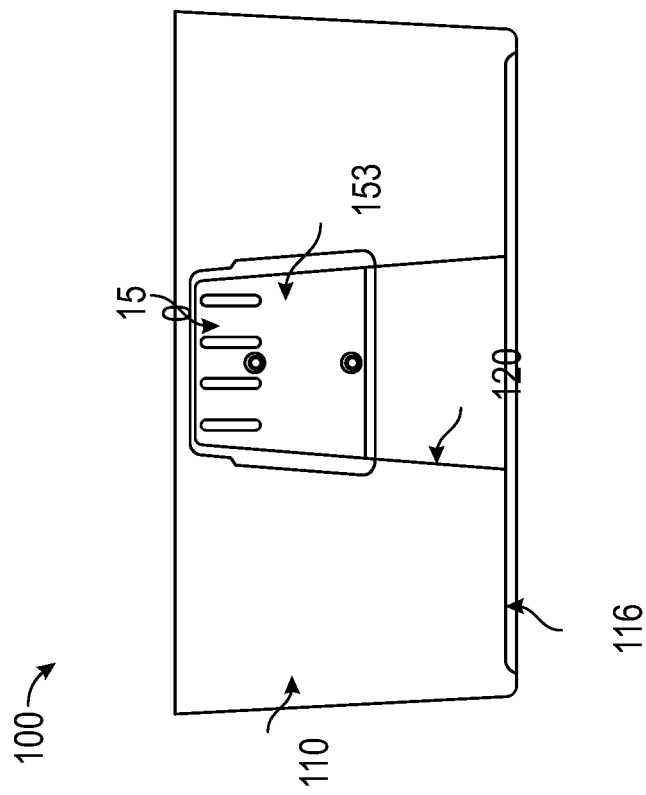
FIG. 7A shows a front elevational view of a bin and mounting bracket according to an exemplary embodiment.

As shown in FIG. 6C, in some exemplary embodiments, the mounting bracket 150 is shaped like a truncated wedge with beveled edges, and the bin 110 recess 120 is shaped like a truncated wedge with beveled edges, such that the bin 110 can be slid down onto the mounting bracket 150, and whereby the beveled edges 151, 152 on either side of the mounting bracket 150 are in contact with the beveled edges of the bin 110 recess 120. In exemplary embodiments, the front face 153 of the mounting bracket 150 touches at least a portion of the rear wall 114 within the recess 120 of the bin 110.

As shown in FIGS. 6A & 6B and FIGS. 8A & 8B, in some exemplary embodiments, the mounting bracket 150 is shaped like a truncated wedge with beveled edges and the recess 120 is a truncated wedge-shape with inverted beveled edges, such that the beveled edges of the mounting bracket 150 can be received by the inverted beveled edges of the recess 120 when the bin 110 is lowered down onto the secured mounting bracket 150, wherein the edges 151, 152 of the mounting bracket 150 and the edges of the recess 120 form a dove tail connection with one another. In exemplary embodiments, the front face 153 of the mounting bracket 150 touches at least a portion of the rear wall 114 within the recess 120 of the bin 110. In some exemplary embodiments, the beveled edges 151, 152 of the mounting bracket 150 contact the beveled side edges of the recess 120 over at least half the length of the side walls of the mounting bracket 150. In some exemplary embodiments, the beveled edges 151, 152 of the mounting bracket 150 contact the beveled side edges of the recess 120 over substantially the entire length of the side walls of the mounting bracket 150. In some exemplary embodiments, the bottom wall 115 of the bin 110 has a channel 116 around the perimeter of the bottom wall 115 slightly from the outer edge thereof. In some exemplary embodiments, the entirety of bottom wall 115 is recessed vertically except for an edge portion around the perimeter of the bottom wall 115.

Figure 10B:
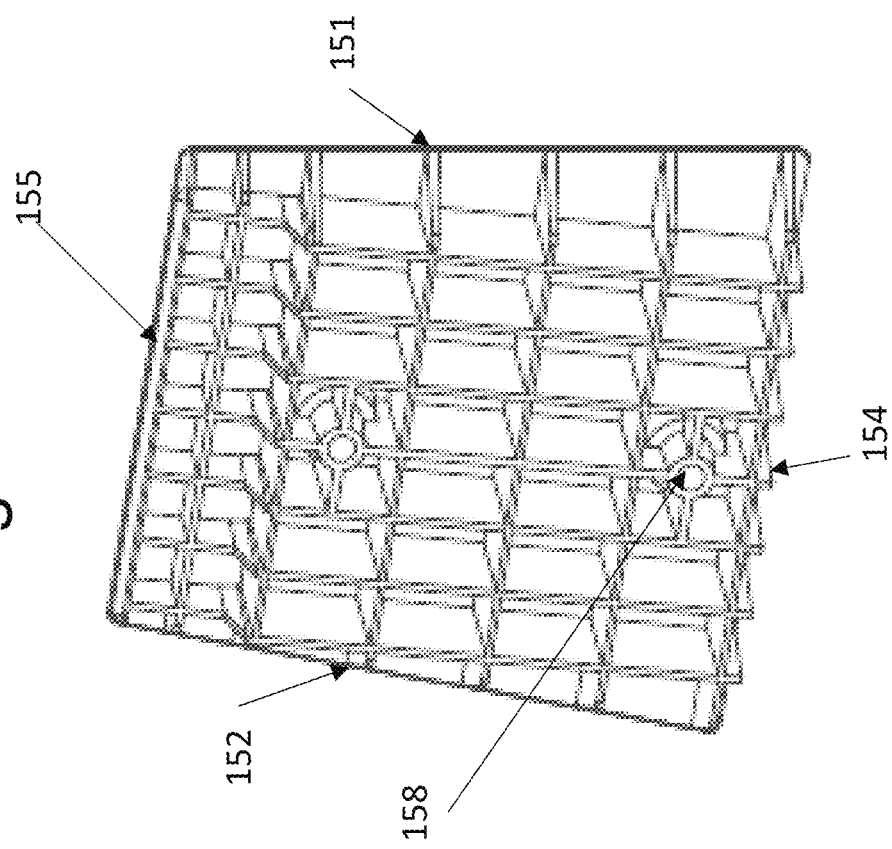
FIG. 10B shows a rear/left/top perspective view of the mounting bracket of FIG. 9.
Figure 10A:
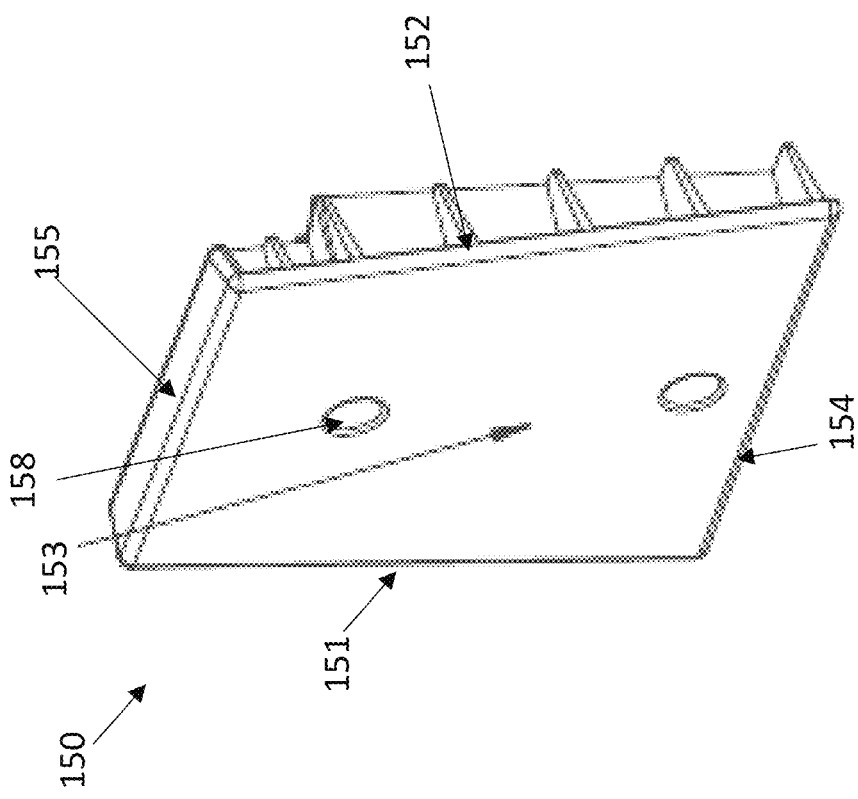
FIG. 10A shows a front/right/top perspective view of the mounting bracket of FIG. 9.

FIGS. 9-10B show various views of an exemplary embodiment of a mounting bracket 150. The mounting bracket 150 comprises a top portion 155, a left side edge 151, a right side edge 152, a bottom portion 156, a front face 153, and a back face 154. In exemplary embodiments, the mounting bracket 150 may further include at least one orifice 158, and preferably at least two orifices 158, through which a fastener may be inserted in order to secure the mounting bracket 150, and therein the bin 110, to a support surface, such as a structure wall. In exemplary embodiments, the top portion 155 may be of a smaller width than the remainder of the mounting bracket 150. This allows for a portion of the bin 110, such as the top edge of the rear wall 114 and/or the reinforcement edge 130, to be proximate to a support surface, such as a structure wall, in between the mounting bracket 150 and the structure wall when the bin 110 is secured to the mounting bracket 150. In exemplary embodiments, the mounting bracket 150 is beveled such that the width of the back face 154 is less than the width of the front face 153 of the mounting bracket 150.

Figure 11:
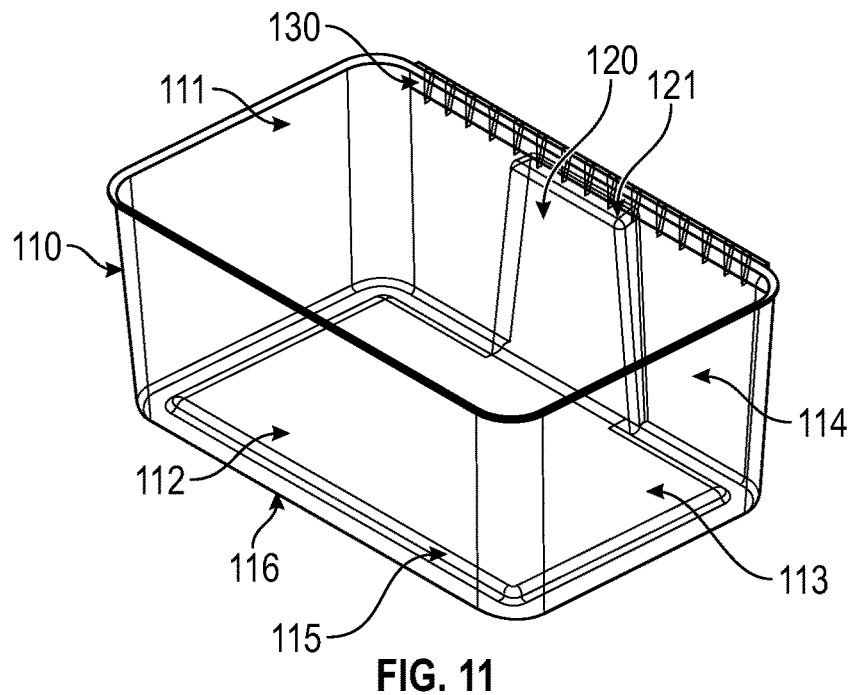
FIG. 11 shows a front right/top perspective view of a bin and mounting bracket according to an exemplary embodiment.
Figure 12:
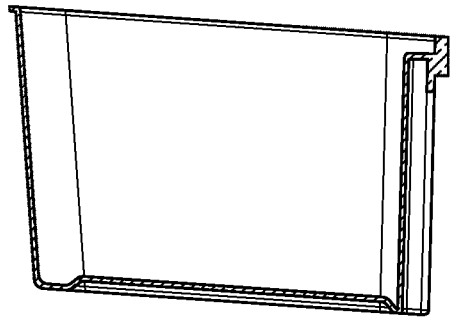
FIG. 12 shows a right side elevational view of the bin of FIG. 11.
Figure 13:
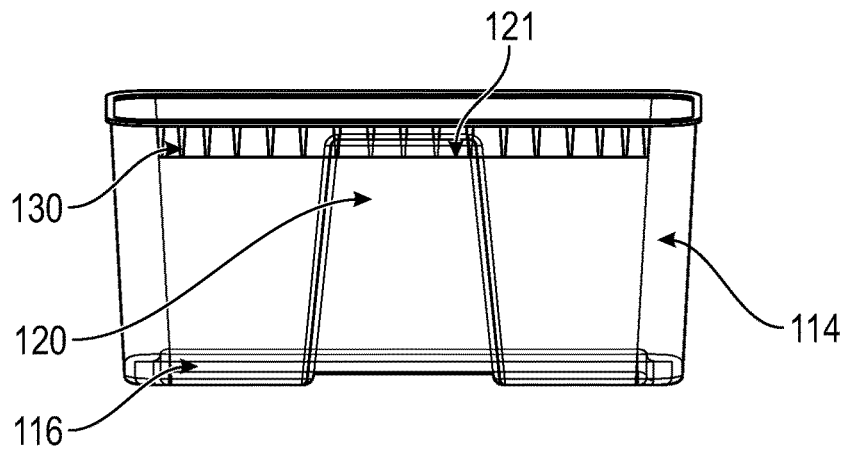
FIG. 13 shows a rear elevational view of the bin of FIG. 11.
Figure 14:
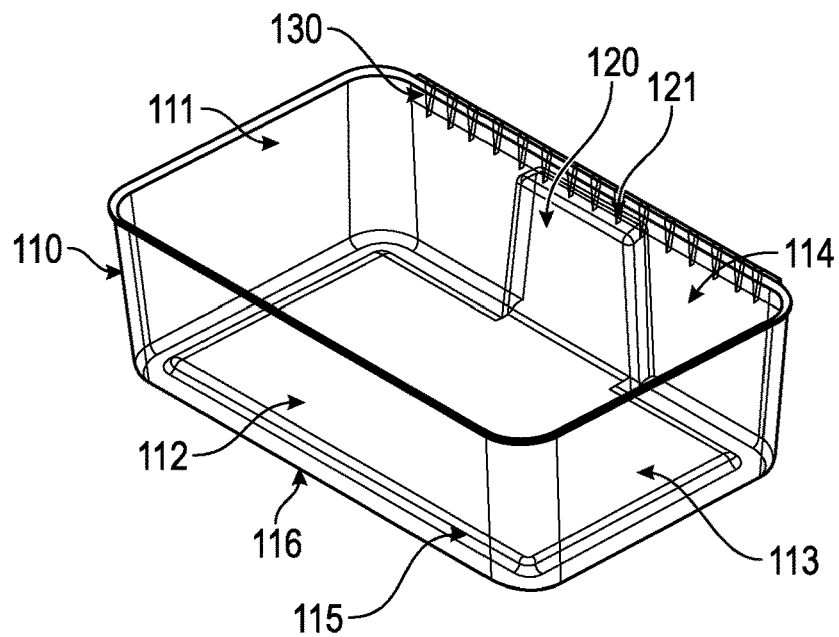
FIG. 14 shows a front right/top perspective view of a bin and mounting bracket according to an exemplary embodiment.
Figure 15:
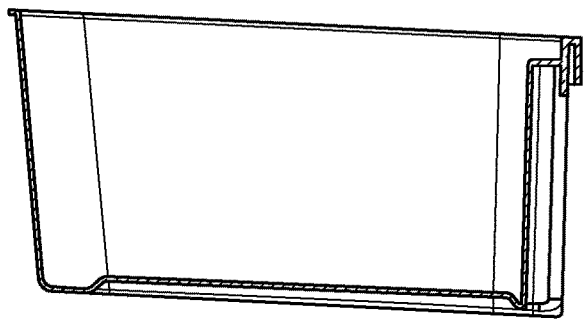
FIG. 15 shows a right side elevational view of the bin of FIG. 14.
Figure 16:
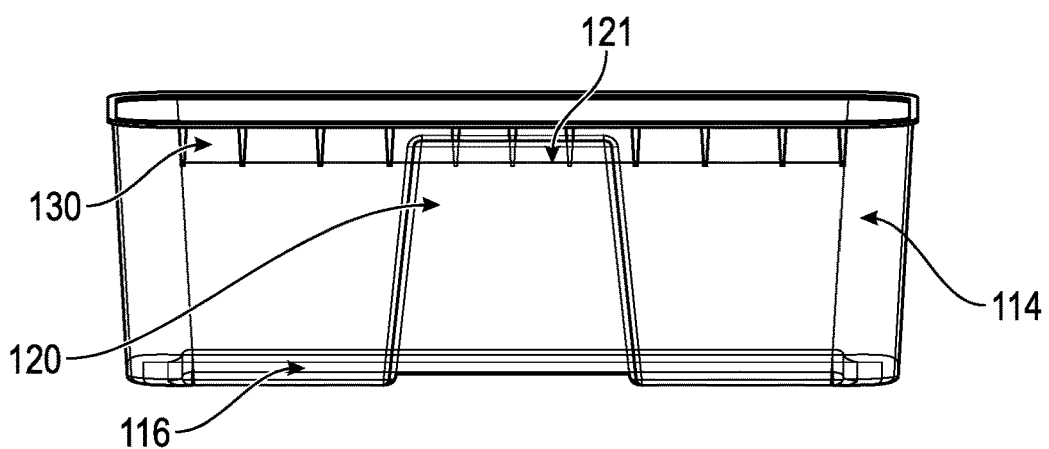
FIG. 16 shows a rear elevational view of the bin of FIG. 14.
Figure 17:
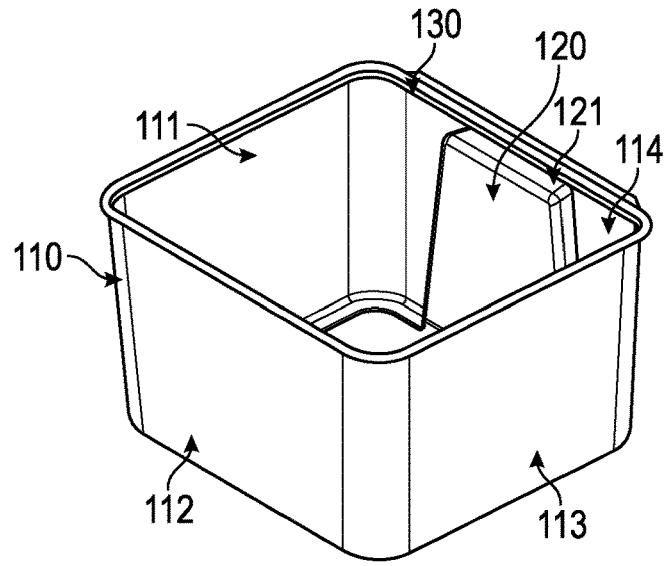
FIG. 17 shows a front right/top perspective view of a bin according to an exemplary embodiment.
Figure 18:
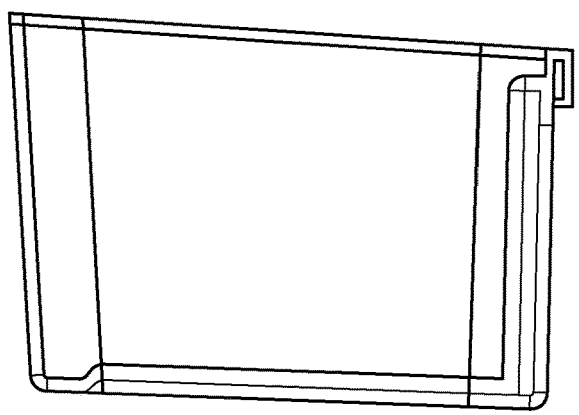
FIG. 18 shows a right side elevational view of the bin of FIG. 17.
Figure 19:
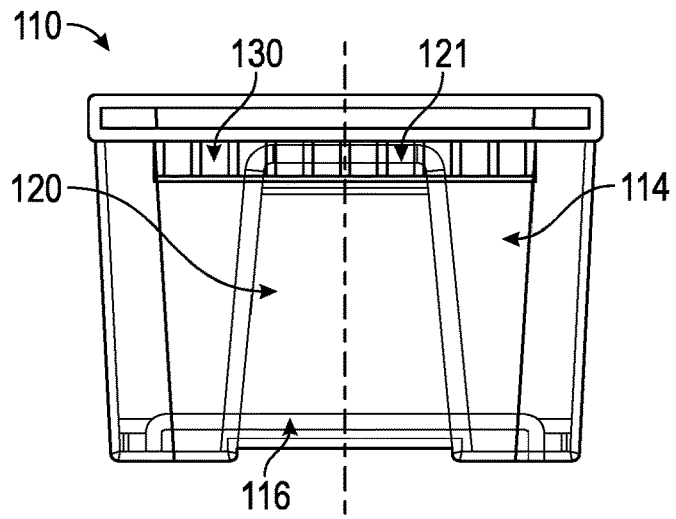
FIG. 19 shows a rear elevational view of the bin of FIG. 17.
Figure 22:
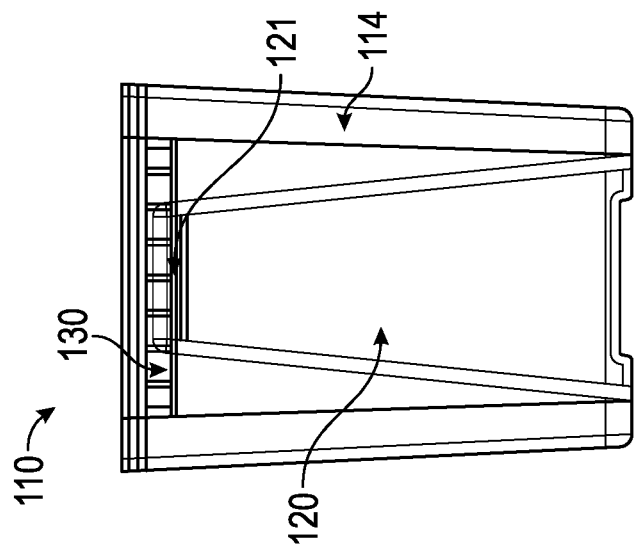
FIG. 22 shows a rear elevational view of the bin of FIG. 20.
Figure 21:
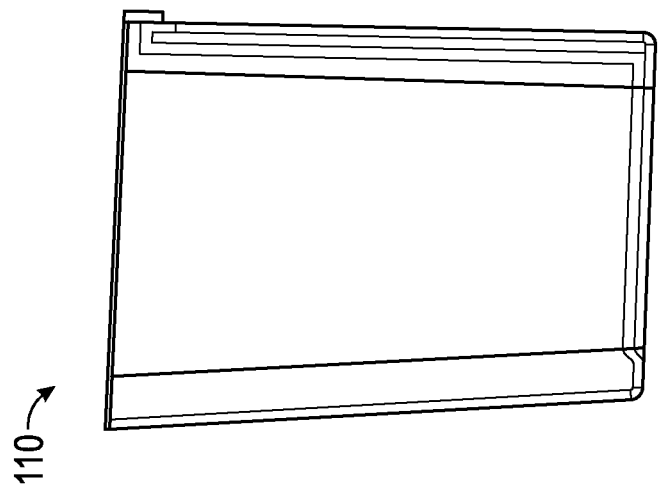
FIG. 21 shows a right side elevational view of the bin of FIG. 20.
Figure 20:
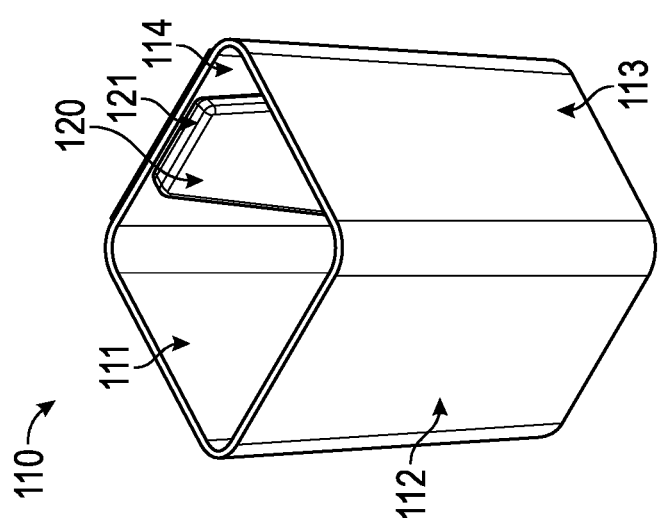
FIG. 20 shows a front right/top perspective view of a bin according to an exemplary embodiment.
Figure 23:
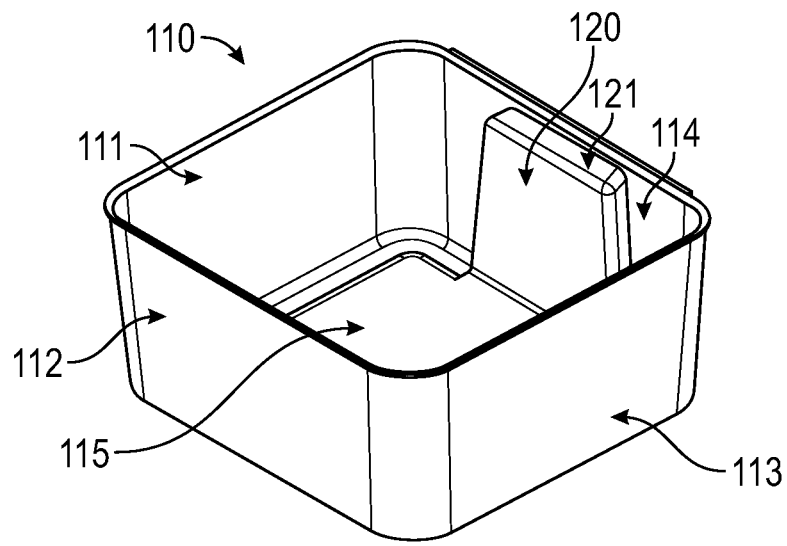
FIG. 23 shows a front right/top perspective view of a bin according to an exemplary embodiment.
Figure 24:
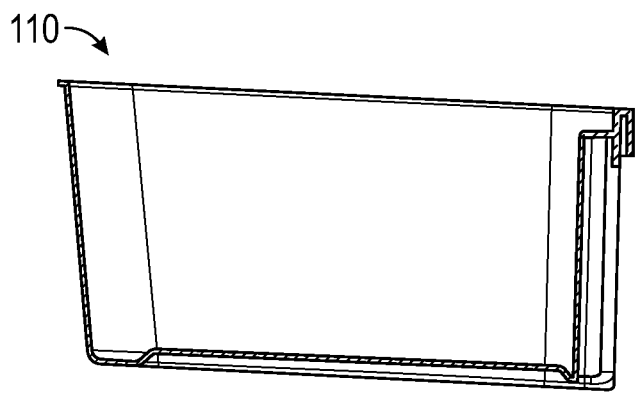
FIG. 24 shows a right side elevational view of the bin of FIG. 23.
Figure 25:
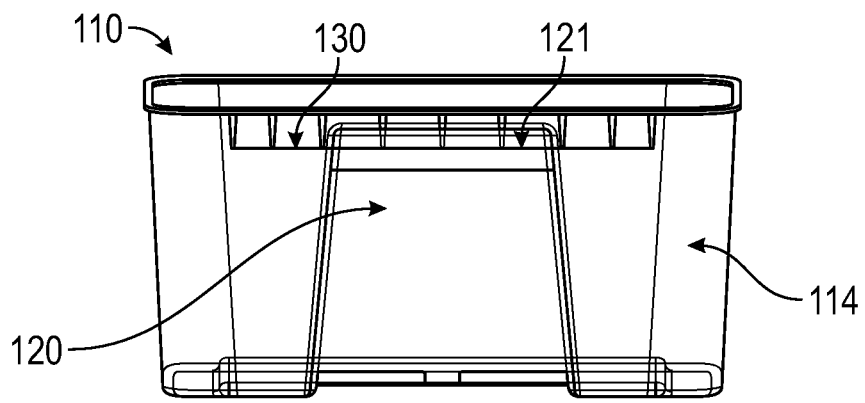
FIG. 25 shows a rear elevational view of the bin of FIG. 23.
Figure 26:
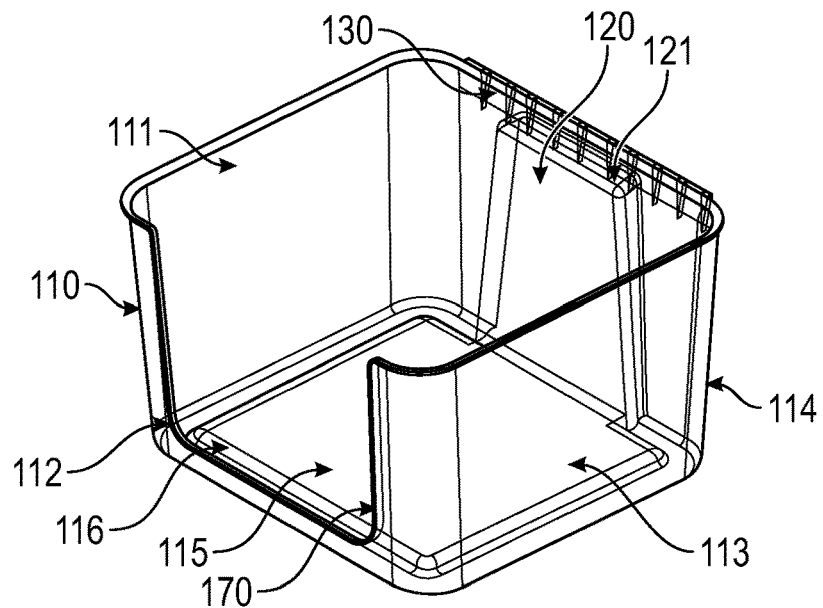
FIG. 26 shows a front right/top perspective view of a notched bin according to an exemplary embodiment.
Figure 27:
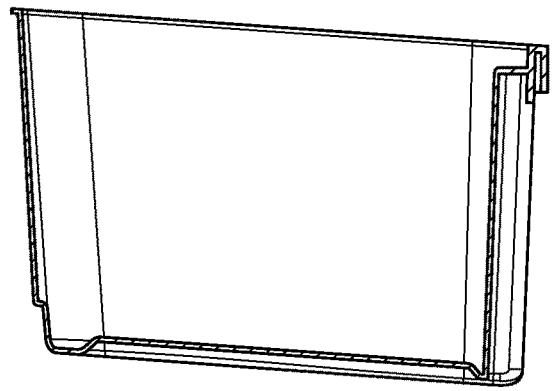
FIG. 27 shows a right side elevational view of the notched bin of FIG. 26.
Figure 28:
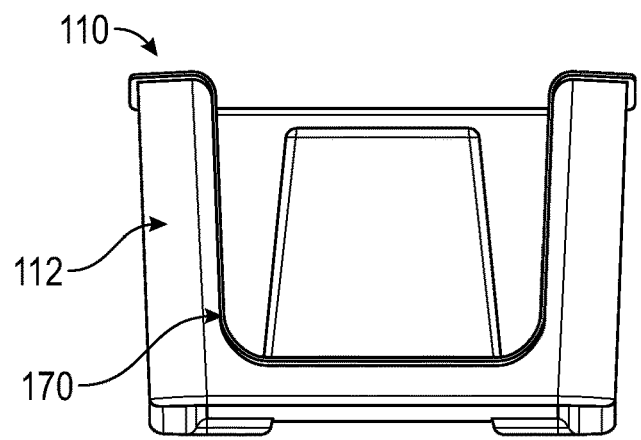
FIG. 28 shows a rear elevational view of the notched bin of FIG. 26.
Figure 31:
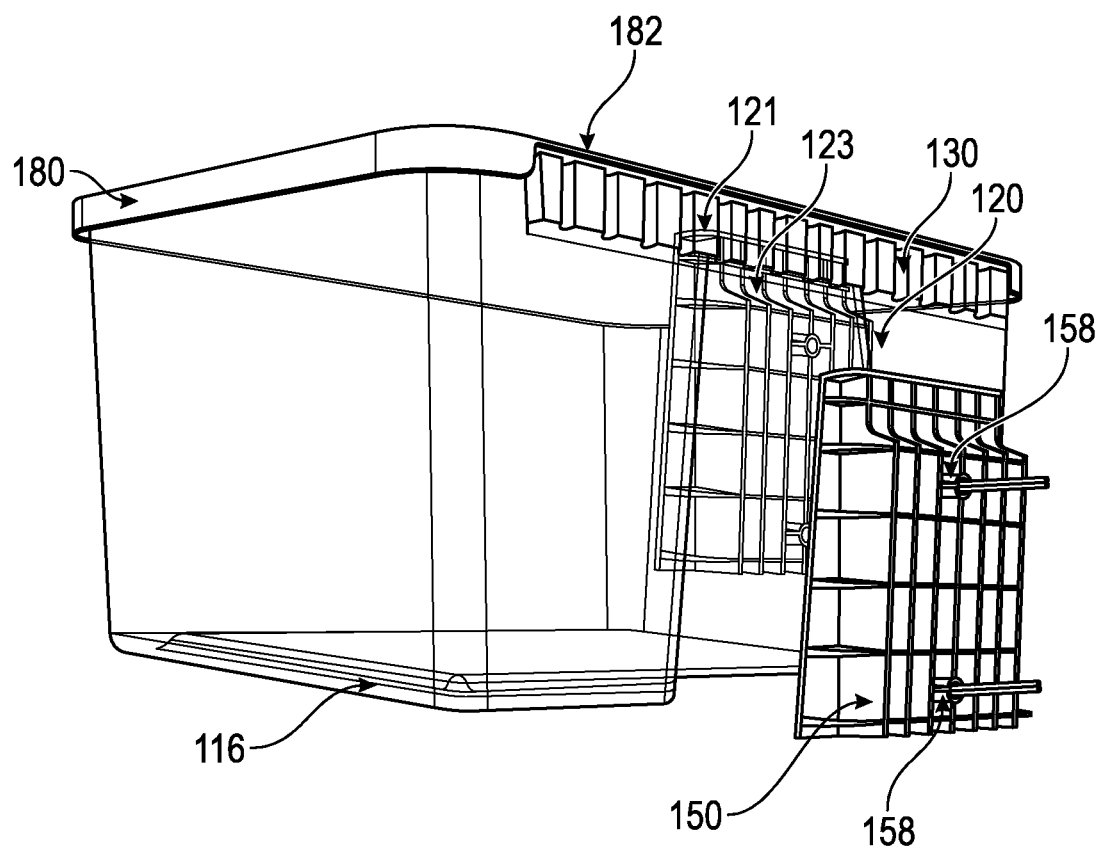
FIG. 31 shows a rear/right perspective view of a mounting bracket, bin, and lid according to an exemplary embodiment, depicting the insertion of the mounting bracket into the recess of the bin.

FIGS. 11-28 show front right/top perspective views, right side and rear elevational views of bins 110 of various size configurations and mounting brackets 150 according to exemplary embodiments. In exemplary embodiments, the bin has dimensions of length (L), a width (W), and a height (H), wherein the ratio of L:W is 1:1-8:1, e.g., 1:1-5:1, or 1.5:1. In exemplary embodiments, the ratio of W:H may be 1:5-5:1, e.g., 1:3-3:1, or 1.5:1. In exemplary embodiments, the ratio of H:L may be 3:1-1:4, e.g., 1:3 or 2:1. As shown in FIG. 11, the ratio of L:W may be approximately 1.5:1, W:H may be approximately 1.25:1, and H:L may be approximately 1:2. As shown in FIG. 14, the ratio of L:W may be approximately 1.5:1, W:H may be approximately 2:1, and H:L may be approximately 1:3. As shown in FIG. 17, the ratio of L:W may be approximately 1:1, W:H may be approximately 1.25:1, and H:L may be approximately 1:1:25. As shown in FIG. 20, the ratio of L:W may be approximately 1:1, W:H may be approximately 1.75:1, and H:L may be approximately 1.75:1. As shown in FIG. 23, the ratio of L:W may be approximately 1:1, W:H may be approximately 21, and H:L may be approximately 1:2. As shown in FIG. 26, the ratio of L:W may be approximately 1:1, W:H may be approximately 1.25:1, and H:L may be approximately 1:1.25. An exemplary kit comprises a bin 110, a mounting bracket 150, and an instruction sheet instructing a user to perform one of the methods herein to affix the mounting bracket 150 to a support surface, such as a structure wall, and lower the bin 110 over the mounting bracket 150, sliding the mounting bracket 150 into the bin 110 recess 120 to secure the bin 110 to the structure wall via the mounting bracket 150. The bin shown in FIGS. 26-28 has a notch 170 formed in the front wall 112.

FIG. 29 illustrates a cross-sectional view of the recess 120 and downward-facing cavity 121 of a bin 110 according to an exemplary embodiment. In some exemplary embodiments, the recess 120 includes a closed downward-facing cavity 121 at the top of the recess 120, whereby the top portion 153 of the mounting bracket 150 contacts the distal end 122 of the closed downward-facing cavity 121 at the top of the recess 120 (adjacent the back top wall 114 of the bin 110) to help support the bin 110. In some exemplary embodiments, the cavity 121 is formed by a portion 123 of the rear wall 114 of the bin 110 that extends over the recess 120. In some exemplary embodiments, at least one of the internal surfaces of the cavity 121 and the surface of the mounting bracket 150 contain features which increase the friction between said surfaces, e.g., ribbing, rubber or elastomeric materials, to inhibit lateral motion of the mounting bracket 150 within the bin cavity 121. In some exemplary embodiments, the mounting bracket 150 is secured to a support surface, such as a structure wall, using threaded fasteners (with optional wall anchors) and/or adhesive. In some exemplary embodiments the bin 110 has a reinforcement edge 130 extending longitudinally along the top of the rear wall 114 that creates a separation between the remainder of the rear wall 114 of the bin 110 and the structure wall to which the mounting bracket 150 is secured to allow for the bin 110 to be in contact with the structure wall when the bin 110 is secured to the mounting bracket 150. Although the recess 120, cavity 121, and distal end 122 are shown in FIG. 29 the context of a bin having a reinforcement edge 130, other bins without a reinforcement edge 130 can have a recess 120, cavity 121, and distal end 122 as shown and described without a reinforcement edge 130.

FIGS. 30A-30C, 31, and 34 illustrate a mounting bracket 150, bin 110, and a lid 180 according to an exemplary embodiment, depicting the insertion of the mounting bracket 150 into the recess 120 of the bin 110, and the securement of the mounting bracket 150 to a structure wall (SW). An exemplary method of inserting the bin 110 on the mounting bracket 150 and securing the mounting bracket 150 to a support surface, such as a structure wall includes, providing first the mounting bracket 150 and securing the mounting bracket 150 to the structure wall. In some exemplary embodiments, the mounting bracket 150 is secured to the structure wall using threaded fasteners (with optional wall anchors) and/or adhesive, wherein the threaded fasteners are inserted through at least one, and preferably two, orifices 158 in the mounting bracket. Next, a bin 110 is provided having a recess 120 proximate its rear wall 114. The bin 110 is positioned proximate the structure wall over the secured mounting bracket 150 with the recess 120 aligned over the secured mounting bracket 150. The bin 110 is then lowered down on to the secured mounting bracket 150 with the top portion 155 of the mounting bracket 150 inside the downward-facing cavity 121 and the mounting bracket 150, thereby securing the bin 110 to the structure wall. In exemplary embodiments, the entirety of the front face 153 of the mounting bracket 150 contacts the rear wall 114 of the bin 110 within the recess 120 and contacts the distal end 122, as shown in FIGS. 30B and 34.

Figure 32:
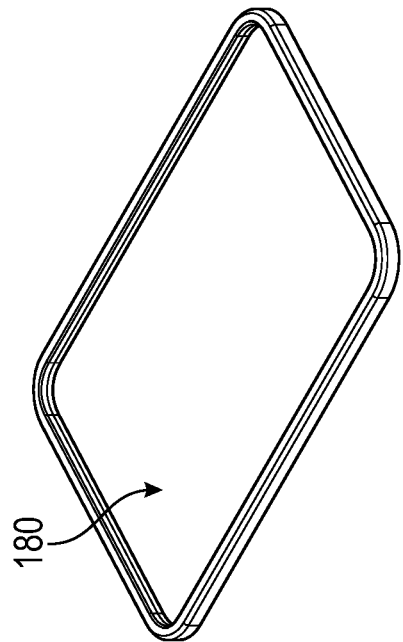
FIG. 32 is a front/right/top perspective view of a lid according to an exemplary embodiment.
Figure 33:
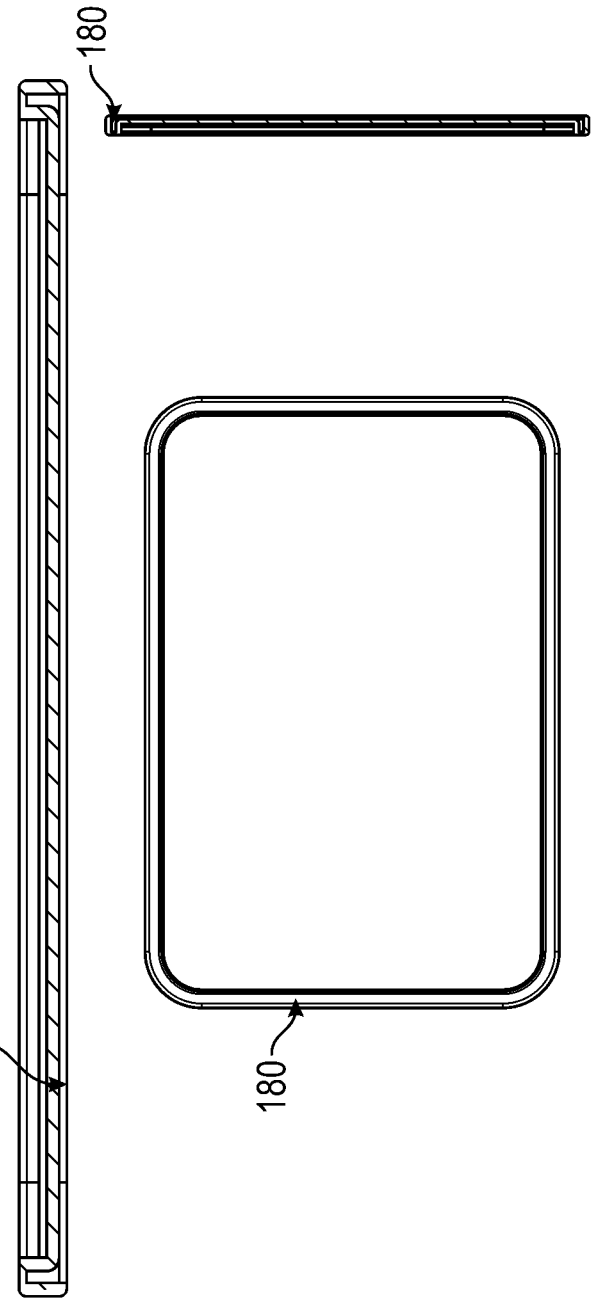
FIG. 33 illustrates top plan and right-side cross sectional views of the lid of FIG. 37.

FIGS. 32-33 show various views of a lid 180 according to an exemplary embodiment. In exemplary embodiments, the bin 120 has a lid 180. In exemplary embodiments, the lid 180 is removable. In some exemplary embodiments, the lid 180 is hinged to the top of one wall of the bin 110, such as the top of the rear wall 114. In some exemplary embodiments, lid 180 has an elongated lip (not shown) that extends downward from a front edge of the lid 180. In some exemplary embodiments, the top of the front wall 112 of the bin 110 has an elongated cutout (not shown) to receive the lip of the lid 180, such that when the lid 180 is closed on the bin 110 the lip of the lid 180 and the front wall 112 of the bin 110 are flush with one another.

In exemplary embodiments, the mounting bracket 150 may be mounted to a support surface, i.e., a structure wall, using any reasonable method, including using at least one fastener, such as a threaded fastener. In exemplary embodiments, a user may first drill a pilot hole directly into the structure wall at the preferred mounting location. In some exemplary embodiments, a wall anchor may be inserted into the pilot hole and the threaded fastener may be secured therethrough. In exemplary embodiments, at least one threaded fastener may be inserted into at least one orifice 158 in the mounting bracket 150. Then, using a means of rotating the threaded fastener(s), such as a drill or screwdriver, the user may secure the threaded fastener(s) in the pilot hole, or the wall anchor, thereby securing the mounting bracket 150 to the structure wall. In exemplary embodiments, the mounting bracket 150 comprises two orifices 158, and two fasteners are used to secure the mounting bracket 150 to the structure wall.

An exemplary kit comprises a bin 110 (any of the bins shown and/or described herein and/or incorporated by reference), a mounting bracket 150 (any of the mounting brackets shown and/or described herein and/or incorporated by reference), and an instruction sheet instructing a user to perform one of the methods herein to affix the mounting bracket 150 to a structure wall and lower the bin 110 over the mounting bracket 150, inserting the mounting bracket 150 into the recess 120 to secure the bin 110 on the mounting bracket 150 to thereby secure the bin 110 to the support wall.

FIGS. 35-37C, and 54 show various views of an exemplary shelf mounting system 200, including a shelf 210 and two mounting brackets 250A, 250B, according to exemplary embodiments. The shelf mounting system includes a first mounting bracket 250A, a second mounting bracket 250B, and a shelf 210. In exemplary embodiments, the first and second mounting brackets 250A, 250B are shaped like a truncated wedge and have beveled side edges. The shelf includes a front wall 212, a rear wall 214, a left side wall 211, a right side wall 213, a bottom wall 215, a first recess 220A on an outside of the rear wall 214, a second recess 220B on an outside of the rear wall 214, and a reinforcement edge 230 along a top edge of the rear wall 214. In general, all of the discussion above with respect to the bins 110 and mounting brackets 150, including the recess 120, cavity 121, and distal end 122, apply to the shelves 210 and mounting brackets 250A, 250B, except that in exemplary embodiments, the shelves 210 and mounting brackets 250A, 250B, are physically smaller. In exemplary embodiments, the mounting brackets 250A,250B each contact the rear wall 214 of the shelf 210 within their respective recesses 220A, 220B and each contact the distal ends 222A (222B not shown) therein, as shown in FIG. 37B. In exemplary embodiments of the shelves shown herein, the entire shelf structure shown, including the recesses 220A,220B and the reinforcement edge 30 are integrally molded as a unitary piece. Although the recesses 220A,220B, cavities 221A, 221B, and distal ends 222A,222B are shown in FIGS. 35-37C the context of a shelf having a reinforcement edge 230, other shelves without a reinforcement edge 230 can have recesses 220A,220B, cavities 221A,221B, and distal ends 222A,222B without a reinforcement edge 230.

In exemplary embodiments, the reinforcement edge 230 is a reinforcement edge extending longitudinally. In exemplary embodiments, the reinforcement edge 230 extends at least half the length of the shelf 210, e.g., the entire length of the shelf 210. In exemplary embodiments, the left and right side walls 211, 213 have a draft angle of about 0.5-6 degrees, e.g., 3 degrees.

In exemplary embodiments, the first and second recesses each have a downward-facing cavity 221A,221B at a top portion of their respective recesses 220A, 220B. In exemplary embodiments the side edges of the recesses 220A, 220B are beveled and the recesses 220A, 220B are a truncated wedge shape complimentary to the mounting brackets 250A, 250B. In exemplary embodiments, the first and second recesses 220A, 220B are configured to slidably engage the first and second mounting brackets 250A, 250B, respectively. In exemplary embodiments, the top portion of each of the first and second mounting brackets 250A, 250B extends into the first and second downward-facing cavities 221A, 221B, and optionally contacts a distal end of each of the first and second downward-facing cavities 221A, 221B, respectively. In exemplary embodiments, the top portions of the first and second mounting brackets 250A, 250B are covered by the portions of the shelf (e.g., a portion of the back wall extending over the recesses) forming the first and second downward-facing cavities 221A, 221B, respectively, such that when the first and second mounting brackets 250A, 250B are engaged with the first and second recesses 220A, 220B the shelf 210 is secured to the first and second mounting brackets 250A, 250B and prevented from being pulled forward from said first and second mounting brackets 250A, 250B.

In exemplary embodiments the beveled edges of the first and second mounting brackets 250A, 250B contact the beveled side edges of the first and second recesses 220A, 220B, respectively over at least half the length of the side walls of the first and second mounting brackets 250A, 250B, e.g., over substantially the entire length of the side walls of the first and second mounting brackets 250A, 250B. In exemplary embodiments, the shelf 210 further includes a vertical reinforcement edge 218 extending downwards from the front wall 212. As shown in FIG. 36, in exemplary embodiments, the vertical reinforcement edge 218 includes at least one hanging slot 219A, 219B, 2119C. The hanging slots 219A, 219B, 2119C allow for the hanging of items thereon. In exemplary embodiments the vertical reinforcement edge is 0.25-1×the height of the rear wall 214 of the shelf 210. In exemplary embodiments, the rear wall 214 is sized and angled such that a portion of the shelf 210 distal from the recesses 220A, 220B touches a structure wall when the mounting brackets 250A, 250B are secured to a structure wall and the shelf is secured to the mounting bracket. In exemplary embodiments, the rear wall 214 is sized and angled such that a portion of the shelf 210 proximate the bottom of the shelf 210 touches the structure wall when the mounting brackets 250A,250B are secured to the structure wall and the shelf 210 is secured to the mounting brackets 250A, 250B. In exemplary embodiments, the rear wall 214 is sized and angled such that a portion of the shelf 210 proximate the recesses 220A, 220B touches the structure wall when the mounting brackets 250A, 250B are secured to the structure wall and the shelf 210 is secured to the mounting brackets 250A, 250B. As shown in FIG. 37B, the side walls 211, 213 may be tapered such that the height of the side walls 211 proximate to the rear wall 214 of the shelf 210 is much taller than the height of the wall proximate the front wall 212 of the shelf 210, in some cases 2-10 times taller, e.g., 5 times taller. In exemplary embodiments, the shelf further comprises at least one support brace 219A, 219B extending the width of the bin 210 underneath the bottom wall 215 of the bin 210, perpendicular to the side walls 211, 213 of the shelf 210.

In exemplary embodiments, the lower, bottom rear edge 217 of the shelf 210 is sized, positioned, and configured to cooperate with the reinforcement edge 230, the mounting brackets 250A, 250B, and the bin recesses 220A, 220B to touch the structure wall and apply tension in the shelf structure as the shelf 210 is lowered onto the mounting brackets 250A,250B. In some exemplary embodiments, the lower, bottom rear edge 217 is sized, positioned, and configured to extend normally at a displacement distance Δ, e.g., 0.01-2 inches, rearwards past the vertical plane of a structure wall so the shelf 210 flexes a little and the lower, bottom rear edge 217 of the shelf 210 touches and slides a little down the structure wall as the shelf 210 is lowered onto the mounting brackets 250A, 250B. In some exemplary embodiments, the lower, bottom rear edge 217 is sized, position, and configured to touch the structure wall when the shelf 210 is empty. In some exemplary embodiments, the lower, bottom rear edge 217 is sized, position, and configured to touch the structure wall when the shelf 210 is empty and is configured to extend at a displacement distance Δ, e.g., 0.01-1 inches, rearwards past the vertical plane of a structure wall when there are contents on the shelf 210 to apply tension in the shelf structure against the structure wall to help keep the shelf 210 in place. In other exemplary embodiments, the lower, bottom rear edge 217 is sized, positioned, and configured to extend normally at displacement distance Δ, e.g., 0.01-2 inches, rearwards past the vertical plane of a structure wall when the shelf 210 is empty, such that the shelf 210 flexes a little and the lower, bottom rear edge 217 of the shelf 210 touches and slides a little down the structure wall as the shelf 210 is lowered onto the mounting brackets 250A, 250B to apply tension in the shelf structure against the structure wall to help keep the shelf 210 in place. In other exemplary embodiments, the lower, bottom rear edge 217 is sized, positioned, and configured to extend normally at a displacement distance Δ, e.g., 0.05-2 inches, rearwards past the vertical plane of a structure wall when there are contents on the shelf 210, such that the shelf 210 flexes further than when the shelf is empty and the lower, bottom rear edge 217 of the shelf 210 touches and slides a little down the structure wall as the shelf 210 is lowered onto the mounting brackets 250A, 250B to apply additional tension in the shelf structure against the structure wall to help keep the shelf 210 in place. In some exemplary embodiments, the reinforcement edge 230 is sized, positioned, and configured to extend a little bit (e.g., 0.01-2 inches) rearwards past the vertical plane of a structure wall normally so the reinforcement edge 230 and perhaps the shelf 210 flexes a little and the reinforcement edge 230 touches and slides a little down the structure wall as the shelf 210 is lowered onto the mounting brackets 250A,250B. In some exemplary embodiments, the lower, bottom rear edge 217 of the shelf touches the structure wall about 0.01-1.5 inches above its final location as the shelf 210 is lowered onto the mounting brackets 250A, 250B. In some exemplary embodiments, the tension is caused by both the lower, bottom rear edge 217 of the shelf 210 and the reinforcement edge 230 touching the structure wall and being in tension in the final resting place with the shelf 210 mounted to the mounting brackets 250A, 250B.

An exemplary method for removably attaching a shelf 210 to a structure wall includes providing at least a first mounting bracket 250A and a shelf 210, each according to any of the embodiments herein, securing the first mounting bracket 250A to a structure wall, and slidably lowering the shelf 210 down onto the first mounting bracket 250A. In exemplary embodiments, a portion of the first mounting bracket 250A is within a first recess 220A of the shelf 210, and a top portion of the first mounting bracket 250A extends into the first recess 220A and optionally contacts a distal end of the first recess 220A. In exemplary embodiments, the method further includes providing a second mounting bracket 250B, wherein the shelf 210 further comprises a second recess 220B, securing the second mounting bracket 250B to a structure wall, and slidably lowering the shelf 210 down onto the second mounting bracket 250B. In exemplary embodiments, a portion of the second mounting bracket 250B is within a second recess 220B of the shelf 210, and a top portion of the second mounting bracket 250B extends into the second recess 220B and optionally contacts a distal end of the second recess 220B. The method may further include providing a fastener (e.g., threaded fasteners driven into wall studs or into dry wall using wall anchors) and inserting said fastener or fasteners through at least one of the first and second mounting brackets 250A, 250B, and securing the at least one mounting bracket 250A, 250B to a structure wall using the fastener or fasteners.

FIG. 38-39B show various views of a mounting bracket according to an exemplary embodiment. The mounting bracket 250 comprises a top portion 255, a left side edge 251, a right side edge 252, a bottom portion 256, a front face 253, and a back face 254. In exemplary embodiments, the mounting bracket 250 may further include at least one orifice 258, and preferably at least two orifices 258, through which a fastener may be inserted in order to secure the mounting bracket 250, and therein the shelf 210, to a support surface, such as a structure wall. In exemplary embodiments, the top portion 255 may be of a smaller width than the remainder of the mounting bracket 250. This allows for a portion of the shelf 210, such as the top edge of the rear wall 214 and/or the reinforcement edge 230, to be proximate to a support surface, such as a structure wall, in between the mounting bracket 250 and the structure wall when the shelf 210 is secured to the mounting bracket 250. In exemplary embodiments, the mounting bracket 250 is beveled such that the width of the back face 254 is less than the width of the front face 253 of the mounting bracket 250.

A shelf 210 and the mounting brackets 250A, 250B may be made of any suitable material, including plastic, wood, metal, or metal-wire. In exemplary embodiments, the shelf 210 and mounting brackets 250A, 250B, and other pieces are injection molded using traditional injection molding techniques. In exemplary embodiments, the shelf 210 may be integrally molded from polyethylene terephthalate (PET), e.g., recycled PET or a blend of recycled and virgin PET. In exemplary embodiments, the mounting brackets 250A,250B are integrally molded from polypropylene (PP).

Figure 54:
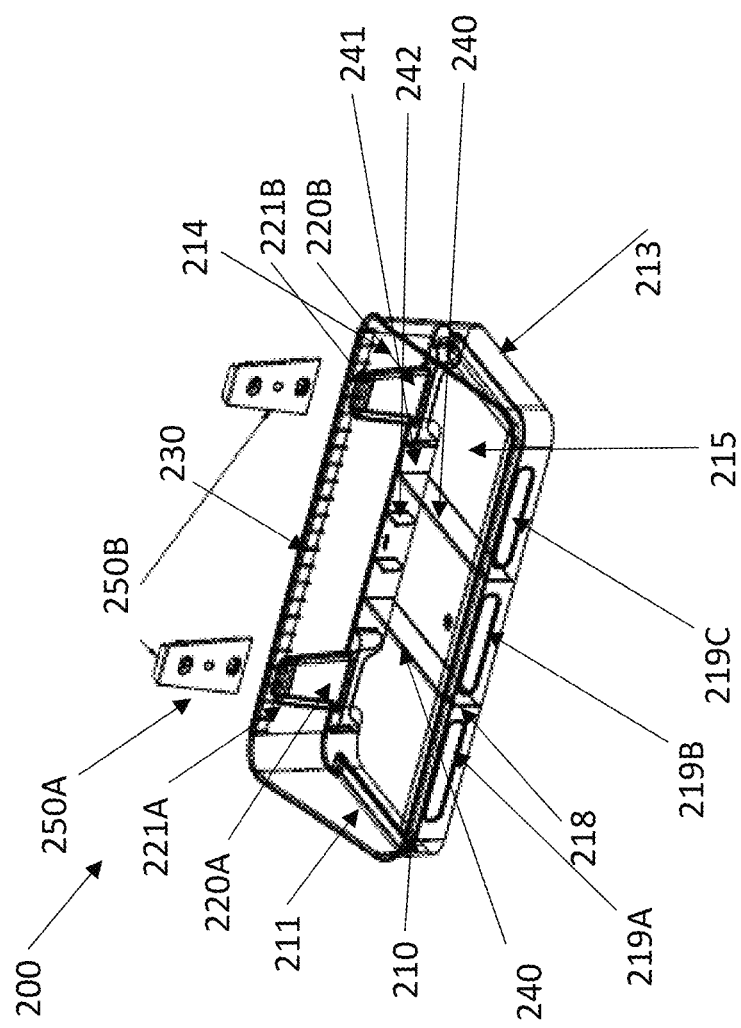
FIG. 54 shows a front/right/top perspective view of a shelf mounting system. Appendix A shows various views of the shelf of the shelf mounting system of FIG. 54.

As shown in FIG. 54, in exemplary embodiments the shelf 210 may further comprise at least one supporting element, including bottom support element(s) 240, a rear support element 241, and rear support element extensions 242. In exemplary embodiments, the bottom support element(s) 240 are walls, or partial walls, that extend downward from the bottom surface of the bottom wall 215 of the shelf 210. In exemplary embodiments, the bottom support element(s) may run perpendicular to the rear wall 214 of the shelf 210, or diagonally from one corner of the bottom surface of the shelf 210 to diagonally opposite corner thereof. The bottom support elements(s) 240 may extend the entire length of the bottom wall 215, or a portion thereof. In exemplary embodiments, the bottom support element(s) 240 extend from the vertical reinforcement edge 218 to the rear wall 214, or to a rear support element 241. In exemplary embodiments, the shelf 210 comprises two bottom support elements 240. In exemplary embodiments, the bottom support elements 240 are at least 0.25-1×the depth of the vertical reinforcement edge 218 and/or the rear support element 241. In exemplary embodiments, the shelf 210 comprises a rear support element 241 which extends downward from the rear wall 214 of the shelf 210. In exemplary embodiments, the rear support element 241 may extend the length of the rear wall 214, or may terminate at the edges of each of the recesses 221A, 221B. In exemplary embodiments, the rear support element 241 may be 0.25-2×the depth of the vertical reinforcement edge 218. In exemplary embodiments, the shelf 210 may further comprise at least one, and preferably two, rear support element extensions 242 disposed perpendicularly to the rear support element 241. The rear support element extensions 242 are proximate to the rear support element 241 and the bottom surface of the bottom wall 215, further providing support to the bottom wall 215 and preventing torque at the connection of the bottom wall 215 and the rear support element 241. The Appendix A, which is incorporated by reference herein, shows various views of the shelf 210 of the shelf mounting system 200 of FIG. 54.

Figure 40:
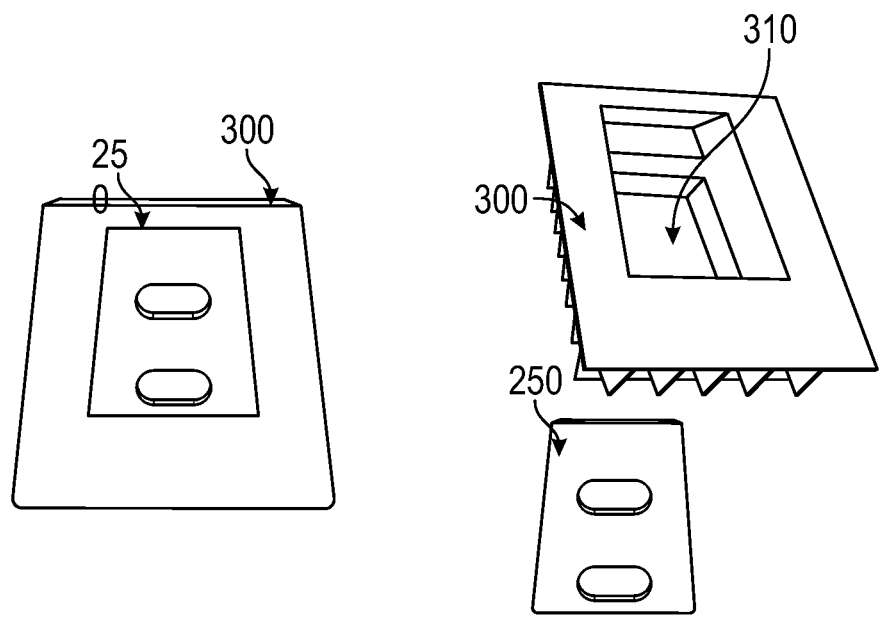
FIG. 40 illustrates a mounting bracket and an adapter according to an exemplary embodiment.
Figure 41:
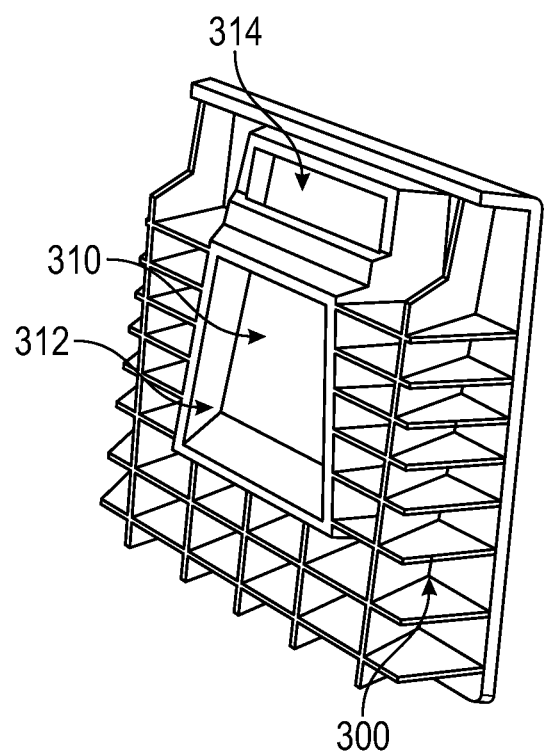
FIG. 41 shows a rear/left/top perspective view of the adapter of FIG. 40.
Figure 46:
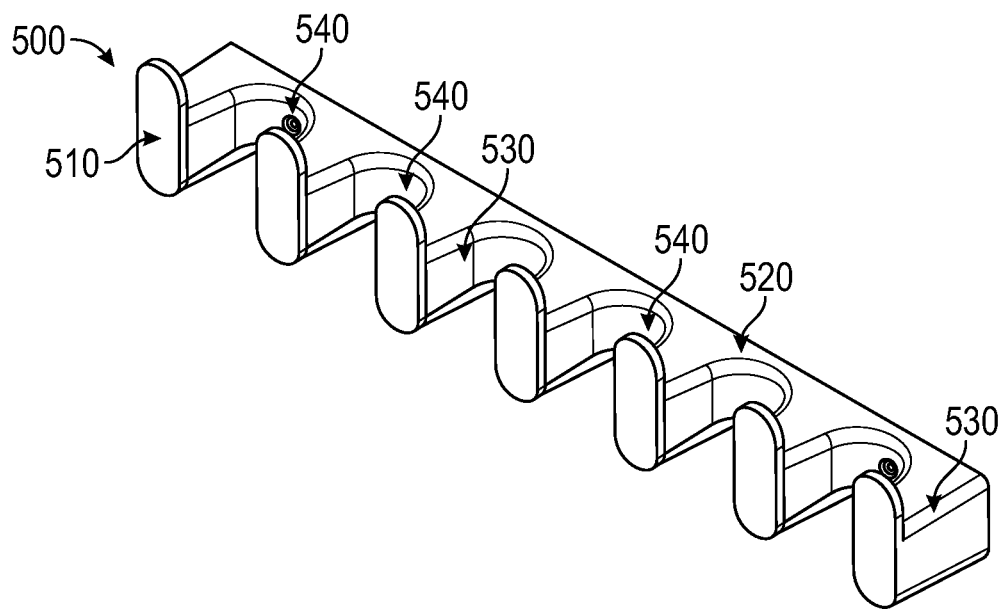
FIG. 46 is a front/right/top perspective view of a multi-hook according to an exemplary embodiment.
Figure 47:
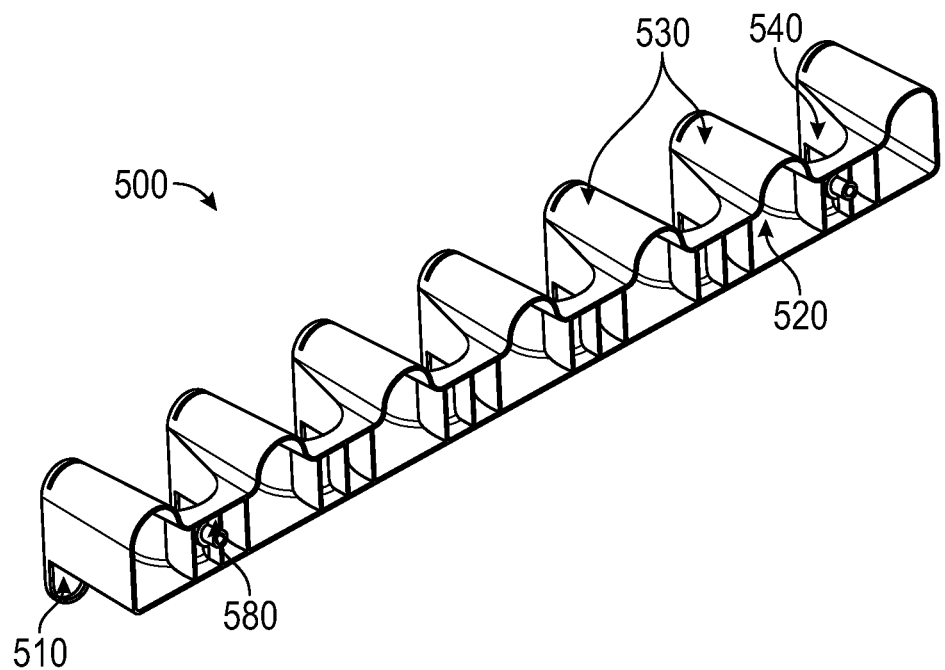
FIG. 47 is a rear/bottom/left perspective view of the multi-hook of FIG. 46.
Figure 48:
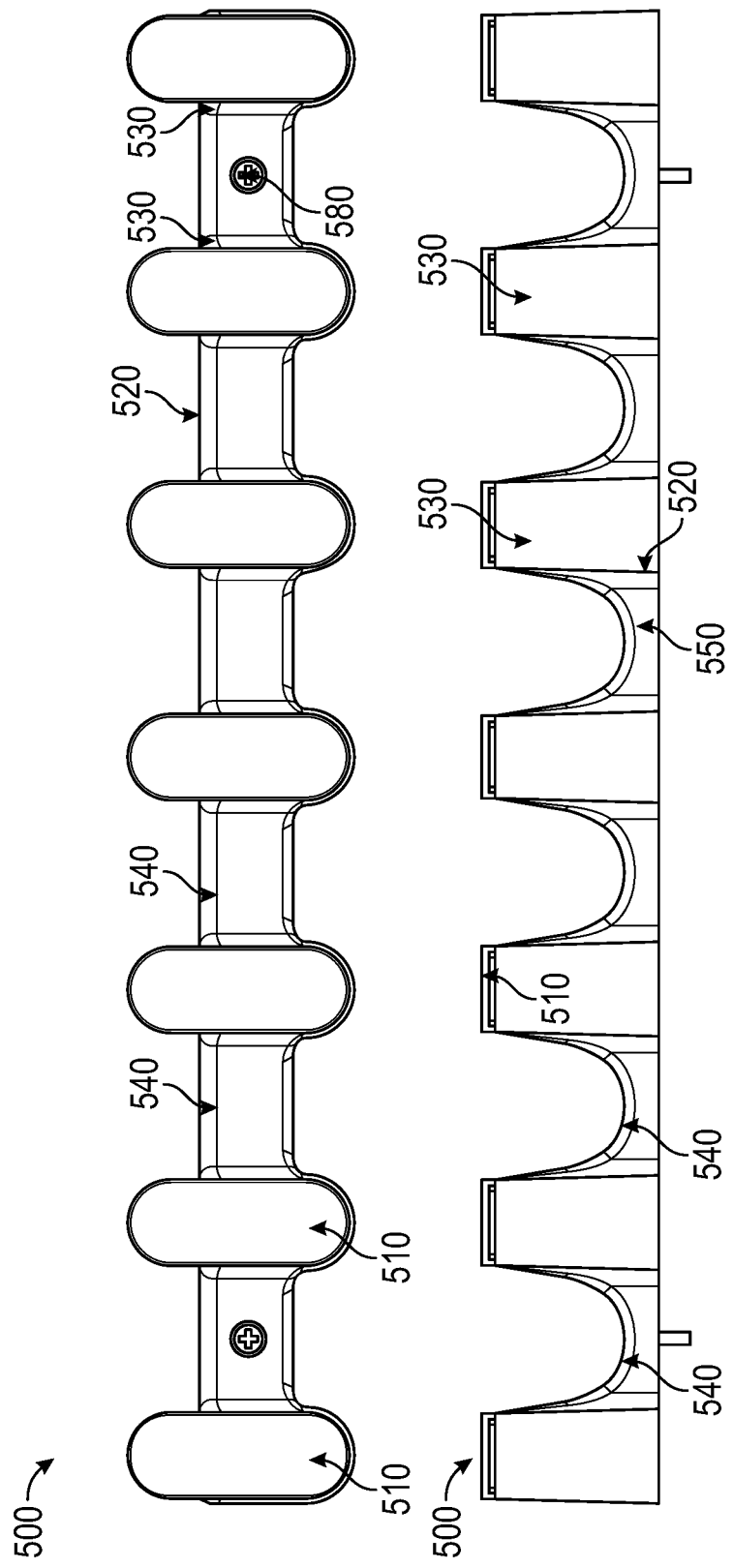
FIG. 48 shows a front elevational view and top perspective view of the multi-hook of FIG. 46.

FIGS. 40-41 illustrate a mounting bracket 250 and an adapter 300 according to an exemplary embodiment. Exemplary embodiments of a mounting bracket size adapter 300 are provided herein. In general, the adapter 300 has an outer periphery like mounting bracket 150 and an inner opening accepting mounting bracket 250. This permits a single mounting bracket 250 to be made and sold along with both bins 100 and shelves 200 and adapters 300 made and sold with bins 100. An exemplary mounting bracket size adapter 300 comprises a body having an overall beveled shape when viewed from above (i.e., horizontal cross section) according to any of the mounting brackets 150, 250 herein, and a receiving space 310, wherein a mounting bracket 150, 250 may be inserted. The receiving space 310 may comprise a first opening 312 and a second opening 314, wherein the body of a mounting bracket 150, 250 may be first inserted into the first opening 312 and then secured therein by inserting a top portion of the mounting bracket 250 into the second opening 314. Any of the systems or methods herein where a mounting bracket 150, 250 is used can use a mounting bracket size adapter 300, with the mounting bracket 150, 250 secured to a structure wall, the mounting bracket size adapter 300 coupled to the mounting bracket 150, 250, and the bin 110 or shelf 210 coupled to the mounting bracket size adapter 300.

FIGS. 42-45 show various views of a hook 400. FIG. 42 is a front/right/top perspective view of a hook 400 according to an exemplary embodiment. FIG. 43 is a rear/bottom/left perspective view of the hook 400 of FIG. 42. FIG. 44 is a right side cross-sectional view of the hook 400 of FIG. 42. FIG. 45 is a front/left/top perspective view of the hook 400 of FIG. 42 affixed to a support surface, such as a structure wall. An exemplary embodiment of a hook 400 comprises a vertical face 420, a horizontal support 410, and a securing portion 430 set within the horizontal support 410. A fastener 450, such as a threaded fastener, may be inserted through the securing portion 430 within the horizontal support 410 to secure the hook 400 to a structure wall. In exemplary embodiments, the hook 400 is a single piece of integrally molded polypropylene (PP).

FIGS. 46-53 show various views of a multi-hook system 500 according to an exemplary embodiment. An exemplary multi-hook system 500 includes a mounting bracket 520 and a plurality of face plates 510. The mounting bracket 520 further may comprise a linear support surface 550, a plurality of reinforcement edges 530 extending forward from the linear support surface 550, and a plurality of grooves 530. In exemplary embodiments, the reinforcement edges 530 and grooves 540 alternate 1:1 along the linear support surface 550. In exemplary embodiments, the multi-hook system 500 comprises 2-15 reinforcement edges 530 and 2-15 face plates 510, e.g., 5-10 reinforcement edges 530 and 5-10 face plates 510, or 7 reinforcement edges 530 and 7 face plates 510. In exemplary embodiments, the multi-hook system 500 comprises 1-14 grooves 540, e.g., 4-9 grooves 540, or 6 grooves 540. In exemplary embodiments, the grooves 540 are substantially parabolic or sinusoidal-shaped.

Figure 51:
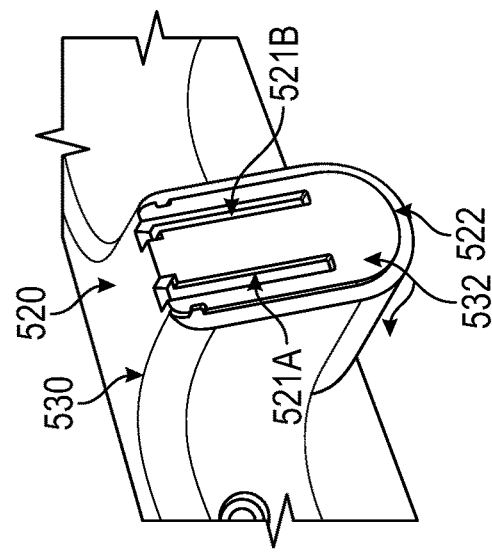
FIG. 51 shows a partial front/left/top perspective view of a front face of the multi-hook of FIG. 46.
Figure 50:
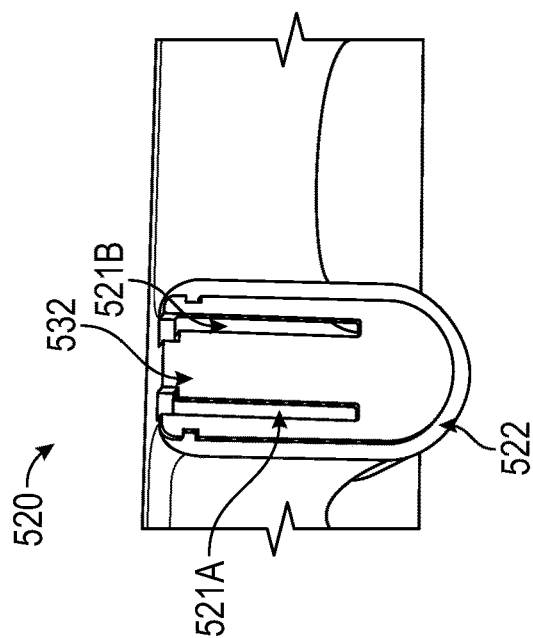
FIG. 50 shows a partial front/left/top perspective view of a front face of the multi-hook of FIG. 46.
Figure 49:
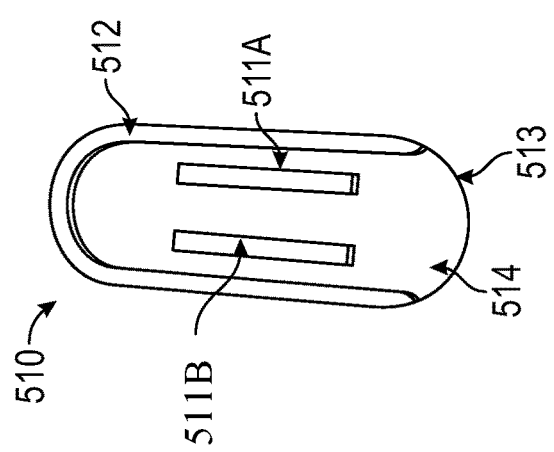
FIG. 49 shows a rear perspective view of a face plate according to an exemplary embodiment.
Figure 52:
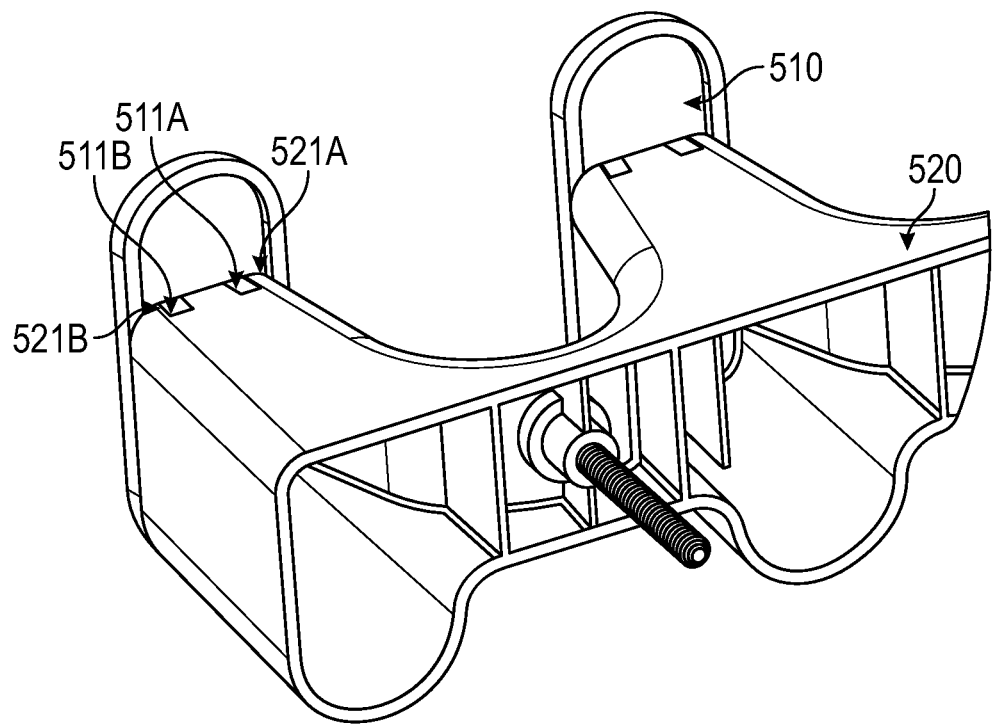
FIG. 52 is a rear/right/top perspective view of the multi-hook of FIG. 46.
Figure 53:
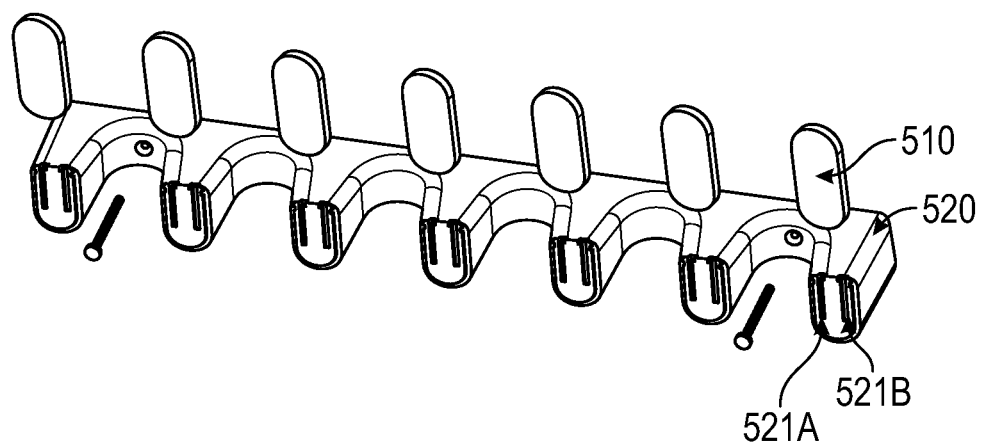
FIG. 53 is a front/right/top exploded perspective view of the multi-hook of FIG. 46.

In exemplary embodiments, as shown in FIGS. 50-51, the reinforcement edges 530 may each comprise a front face 532 having at least one slot or rail 521A, 521B. In exemplary embodiments, the front face 532 may further comprise an indentation 522 along the edge of the front face 532. In exemplary embodiments, the reinforcement edge 532 has a height (PH) and width (PW).

The face plates 510 may further comprise a rear side 514, and at least one of a rail or slot 511A, 511B, wherein each of the face plates 510 has a height (FH) and a width (FW). In exemplary embodiments, the face plates 510 further comprise a lip 512 along the edge of the rear side 514 of the face plate 510 corresponding with the size, e.g., width, length, and depth, of the indentation 522 along the edge of the front face 532 of the reinforcement edge 530. In exemplary embodiments, the rear side 514 of the face plate 510 further comprises a lower edge 513. In exemplary embodiments, the face plate 510 is stadium-shaped.

In exemplary embodiments, each of the plurality of face plates 510 is slidably attached to one of the plurality of reinforcement edges 530 by inserting the at least one rail 521A,521B into the at least one slot 511A, 511B, and sliding the face plate 510 onto the reinforcement edge 530. In exemplary embodiments, the lip 512 of the face plate seats within the indentation 522 of the reinforcement edge 530, such that the edges of each of the reinforcement edge 530 and the face plate 510 are smooth and flush with one another. In exemplary embodiments, FW is the same as PW, but the ratio of FH:PH is 1.25:1-2.5:1, e.g., 1.4:1. In exemplary embodiments, the face plate(s) 510 comprise(s) two rails 511A,511B and the front face 532 of the reinforcement edge 530 comprises two slots 521A, 522B. In some exemplary embodiments, the multi-hook system 500 is secured to a support surface, such as a structure wall, using threaded fasteners (with optional wall anchors) and/or adhesive inserted through at least one orifice 580 in the mounting bracket 520 of the multi-hook system 500. The configurations shown in FIGS. 49-51 allow each face plate 510 to snap and lock in place onto a respective reinforcement edge 530.

Examples

1. A bin mounting system comprising:
    a mounting bracket having a truncated wedge shape and beveled side edges; and
    a bin comprising:
        a front wall, a rear wall, a left side wall, a right side wall, a bottom wall, a recess (i.e., at least one recess) on an outside of the rear wall, and a reinforcement edge along a top edge of the rear wall,
        the recess having (i) a downward-facing cavity at a top portion of the recess, (ii) side edges that are beveled and (iii) a truncated wedge shape complimentary to the mounting bracket,
    wherein the recess is configured to slidably engage the mounting bracket and wherein a top portion of the mounting bracket extends into the cavity and optionally contacts a distal end of the cavity, wherein the top portion of the mounting bracket is covered by the bin, such that when the mounting bracket is engaged with the recess the bin is secured to the mounting bracket and prevented from being pulled forward from said mounting bracket.
2. A bin mounting system comprising:
    a mounting bracket having a truncated wedge shape and beveled side edges; and
    a bin comprising:
        a front wall, a rear wall, a left side wall, a right side wall, a bottom wall, and a recess on an outside of the rear wall,
        the recess having (i) a downward-facing cavity at a top portion of the recess, (ii) side edges that are beveled and (iii) a truncated wedge shape complimentary to the mounting bracket,
    wherein the recess is configured to slidably engage the mounting bracket and wherein a top portion of the mounting bracket extends into the cavity, wherein the top portion of the mounting bracket is covered by the bin, such that when the mounting bracket is engaged with the recess the bin is secured to the mounting bracket and prevented from being pulled forward from said mounting bracket.
3. A bin mounting system comprising:
    a mounting bracket; and
    a bin comprising:
        a front wall, a rear wall, a left side wall, a right side wall, a bottom wall, and a recess on an outside of the rear wall,
    wherein the recess is configured to slidably engage the mounting bracket and wherein a top portion of the mounting bracket extends into the cavity and optionally contacts a distal end of the cavity, such that when the mounting bracket is engaged with the recess the bin is secured to the mounting bracket and prevented from being pulled forward from said mounting bracket
4. A holder mounting system comprising:
    a mounting bracket having a truncated wedge shape and beveled side edges; and
    a holder comprising:
        a rear wall, a recess on an outside of the rear wall, and a reinforcement edge along a top edge of the rear wall,
        the recess having (i) a downward-facing cavity at a top portion of the recess, (ii) side edges that are beveled and (iii) a truncated wedge shape complimentary to the mounting bracket,
    wherein the recess is configured to slidably engage the mounting bracket and wherein a top portion of the mounting bracket extends into the cavity, and wherein the top portion of the mounting bracket is covered by the bin, such that when the mounting bracket is engaged with the recess the holder is secured to the mounting bracket and prevented from being pulled forward from said mounting bracket.
5. The holder mounting system of example 4, wherein the holder comprises a bin having one recess or a plurality of recesses in accordance with example 4, and wherein the mounting system further comprises one mounting bracket or a plurality of black plates in accordance with example 4.
6. The holder mounting system of example 4, wherein the holder comprises a shelf comprising a plurality of recesses in accordance with example 4, wherein the mounting system further comprises a corresponding plurality of black plates in accordance with example 4.
7. The bin mounting system according to any one of the foregoing examples, wherein the top portion of the mounting bracket is covered by the recess.
8. The bin mounting system according to any one of the foregoing examples, wherein the recess and the mounting bracket form a dove tail connection.
9. The bin mounting system according to any one of the foregoing examples, wherein the rear wall is sized and angled such that a portion of the bin distal from the recess touches a structure wall when the mounting bracket is secured to a structure wall and the bin is secured to the mounting bracket.
10. The bin mounting system according to any one of the foregoing examples, wherein the rear wall is sized and angled such that a portion of the bin proximate the bottom of the bin touches the structure wall when the mounting bracket is secured to the structure wall and the bin is secured to the mounting bracket.
11. The bin mounting system according to any one of the foregoing examples, wherein the rear wall is sized and angled such that a rear bottom edge of the bin touches the structure wall when the mounting bracket is secured to the structure wall and the bin is secured to the mounting bracket.
12. The bin mounting system according to any one of the foregoing examples, wherein the rear wall is sized and angled such that a portion of the bin proximate the recess touches the structure wall when the mounting bracket is secured to the structure wall and the bin is secured to the mounting bracket.
13. The bin mounting system according to any one of the foregoing examples, wherein the beveled edges of the mounting bracket contact the beveled side edges of the recess over at least half the length of the side walls of the mounting bracket.

14. The bin mounting system according to any one of the foregoing examples, wherein the beveled edges of the mounting bracket contact the beveled side edges of the recess over substantially all of the length of the side walls of the mounting bracket.
15. The bin mounting system according to any one of the foregoing examples, wherein the reinforcement edge is a linear reinforcement edge.
16. The bin mounting system according to any one of the foregoing examples, wherein the reinforcement edge extends at least half the length of the rear wall of the bin.
17. The bin mounting system according to any one of the foregoing examples, wherein the reinforcement edge extends the entire length of the rear wall of the bin.
18. The bin mounting system according to any one of the foregoing examples, wherein the bin further comprises a removable lid.
19. The bin mounting system according to any one of the foregoing examples, wherein the left and right side walls have a draft angle of about 0.5-6 degrees.
20. The bin mounting system according to any one of the foregoing examples, wherein the left and right side walls have a draft angle of about 3 degrees.
21. The bin mounting system according to any one of the foregoing examples, wherein a lower, bottom rear edge of the bin is sized, positioned, and configured to extend 0.01-2 inches past a structure wall, wherein the bin is capable of flexing and the lower, bottom rear edge of the bin touches and slides down the structure wall as the bin is lowered onto the mounting bracket.
22. The bin mounting system according to any one of the foregoing examples, wherein the reinforcement edge is sized, positioned, and configured to extend 0.01-2 inches past a structure wall so the reinforcement edge, and optionally the bin, flexes and the reinforcement edge touches and slides down the structure wall as the bin is lowered onto the mounting bracket.
23. The bin mounting system according to any one of the foregoing examples, wherein the rear wall is sized and angled such that a rear bottom edge of the bin touches the structure wall when the mounting bracket is secured to the structure wall, the bin is secured to the mounting bracket, and the bin is empty.
24. The bin mounting system according to any one of the foregoing examples, wherein the rear wall is sized and angled such that a rear bottom edge of the bin touches the structure wall when the mounting bracket is secured to the structure wall, the bin is secured to the mounting bracket, and the bin is empty, and wherein the bin is sized, positioned, and configured to extend 0.01-1 inches past the wall when there are contents in the bin.
25. The bin mounting system according to any one of the foregoing examples, wherein the rear wall is sized and angled such that a rear bottom edge of the bin touches the structure wall when the mounting bracket is secured to the structure wall, the bin is secured to the mounting bracket, and the bin is empty, and wherein the bin is sized, positioned, and configured to extend 0.01-1 inches past the wall when there are contents in the bin to apply tension in the bin structure against the wall to help keep the bin in place.
26. The bin mounting system according to any one of the foregoing examples, wherein the rear wall is sized, positioned, and configured such that a rear bottom edge of the bin extends 0.1-1 inches past the structure wall when the bin is empty, and wherein the bin is sized, positioned, and configured to extend 0.05-2 inches past the wall when there are contents in the bin.
27. The bin mounting system according to any one of the foregoing examples, wherein the rear wall is sized, positioned, and configured such that a rear bottom edge of the bin extends 0.1-1 inches past the structure wall when the bin is empty, and wherein the bin is sized, positioned, and configured to extend 0.05-2 inches past the wall when there are contents in the bin to apply tension in the bin structure against the wall to help keep the bin in place
28. The bin mounting system according to any one of the foregoing examples, wherein a lower, bottom rear edge of the bin touches a structure wall about 0.01-2 inches above a final resting location of the lower, bottom rear edge as the bin is lowered onto the mounting bracket.
29. A method for removably attaching a bin to a wall comprising:
  providing a mounting bracket, the mounting bracket having a truncated wedge shape and beveled side edges;
  securing the mounting bracket to the wall; providing the bin, the bin comprising:
    a front wall, a rear wall, a left side wall, a right side wall, a bottom wall, a recess on an outside of the rear wall, and a reinforcement edge along a top edge of the rear wall,
    the recess having (i) a downward-facing cavity at a top portion of the recess, (ii) side edges that are beveled and (iii) a truncated wedge shape complimentary to the mounting bracket,
  positioning the bin proximate the wall over the secured mounting bracket with the recess aligned over the secured mounting bracket; and
  slidably lowering the bin down onto the secured mounting bracket wherein at least a portion of the secured mounting bracket is within the recess, and wherein a top portion of the mounting bracket extends into the recess and optionally contacts a distal end of the recess.
30. The method according to any one of the foregoing examples, further comprising:
  providing at least one fastener;
    inserting said fastener or fasteners through the mounting bracket; and
    securing the mounting bracket to a wall using the fastener or fasteners.
31. The method according to any one of the foregoing examples, wherein the recess and the mounting bracket form a dove tail connection.
32. The method according to any one of the foregoing examples, wherein the reinforcement edge is a linear reinforcement edge.
33. The method according to any one of the foregoing examples, wherein the bin further comprises a removable lid.
34. The method according to any one of the foregoing examples, wherein the left and right side walls have a draft angle of about 0.5-6 degrees.
35. The method according to any one of the foregoing examples, wherein the left and right side walls have a draft angle of about 3 degrees.
36. The method according to any one of the foregoing examples, wherein the beveled edges of the mounting bracket contact the beveled side edges of the recess over at least half the length of the side walls of the mounting bracket.

37. The method according to any one of the foregoing examples, wherein the beveled edges of the mounting bracket contact the beveled side edges of the recess over substantially all of the length of the side walls of the mounting bracket.
38. The method according to any one of the foregoing examples, wherein the reinforcement edge extends at least half the length of the rear wall of the bin.
39. The method according to any one of the foregoing examples, wherein the reinforcement edge extends the entire length of the rear wall of the bin.
40. The method according to any one of the foregoing examples, wherein a lower, bottom rear edge of the bin is sized, positioned, and configured to extend 0.01-2 inches past a structure wall, wherein the bin is capable of flexing and the lower, bottom rear edge of the bin touches and slides down the structure wall as the bin is lowered onto the mounting bracket.
41. The method according to any one of the foregoing examples, wherein the reinforcement edge is sized, positioned, and configured to extend 0.01-2 inches past a structure wall so the reinforcement edge, and optionally the bin, flexes and the reinforcement edge touches and slides down the structure wall as the bin is lowered onto the mounting bracket.
42. The method according to any one of the foregoing examples, wherein a lower, bottom rear edge of the bin touches a structure wall about 0.01-2 inches above a final resting location of the lower, bottom rear edge as the bin is lowered onto the mounting bracket.
43. A method for removably attaching a shelf to a wall comprising:
providing a first mounting bracket, the first mounting bracket having a truncated wedge shape and beveled side edges;
securing the first mounting bracket to the wall; providing the shelf, the shelf comprising:
a front wall, a rear wall, a left side wall, a right side wall, a bottom wall, a first recess on an outside of the rear wall, and a reinforcement edge along a top edge of the rear wall, the first recess having (i) a first downward-facing cavity at a top portion of the first recess, (ii) side edges that are beveled and (iii) a truncated wedge shape complimentary to the first mounting bracket,
positioning the shelf proximate the wall over the first secured mounting bracket with the first recess aligned over the first secured mounting bracket; and
slidably lowering the shelf down onto the first secured mounting bracket wherein at least a portion of the first secured mounting bracket is within the first recess, and wherein a top portion of the first mounting bracket extends into the first recess and optionally contacts a distal end of the first recess.
44. The method according to any one of the foregoing examples, further providing:
a second mounting bracket,
wherein the shelf further comprises a second recess;
securing the second mounting bracket to a wall at a distance from the first secured mounting bracket equidistant to the distance between the first and second recesses on the shelf;
positioning the shelf proximate the wall over the first and second secured mounting brackets with the first and second recesses aligned over the first and second secured mounting brackets, respectively; and
lowering the shelf down onto the first and second secured mounting brackets wherein at least a portion of the first and second secured mounting brackets is within the first and second recesses, respectively.
45. The method according to any one of the foregoing examples, further comprising:
providing at least one fastener;
inserting said fastener or fasteners through the at least one mounting bracket; and
securing the at least one mounting bracket to a wall using the fastener or fasteners.
46. The method according to any one of the foregoing examples, further comprising:
providing at least a second fastener;
inserting said second fastener or fasteners through the second mounting bracket; and
securing the second mounting bracket to a wall using the fastener or fasteners.
47. The method according to any one of the foregoing examples, wherein the reinforcement edge is a linear reinforcement edge.
48. The method according to any one of the foregoing examples, wherein the left and right side walls have a draft angle of about 0.5-6 degrees.
49. The method according to any one of the foregoing examples, wherein the left and right side walls have a draft angle of about 3 degrees.
50. The method according to any one of the foregoing examples, wherein the beveled edges of at least one of the mounting brackets contact the beveled side edges of at least one of the recesses over at least half the length of the side walls of the at least one mounting bracket.
51. The method according to any one of the foregoing examples, wherein the beveled edges of at least one of the mounting brackets contact the beveled side edges of at least one of the recesses over substantially all of the length of the side walls of at least one of the mounting brackets.
52. The method according to any one of the foregoing examples, wherein the reinforcement edge extends at least half the length of the rear wall of the shelf.
53. The method according to any one of the foregoing examples, wherein the reinforcement edge extends the entire length of the rear wall of the shelf.
54. The method according to any one of the foregoing examples, wherein the shelf further comprises a vertical reinforcement edge extending downwards from the front wall.
55. The method according to any one of the foregoing examples, wherein the vertical reinforcement edge comprises at least one orifice.
56. The method according to any one of the foregoing examples, wherein the rear wall is sized and angled such that a portion of the bin distal from the recess touches a structure wall when the mounting bracket is secured to a structure wall and the bin is secured to the mounting bracket.
57. The method according to any one of the foregoing examples, wherein the rear wall is sized and angled such that a portion of the bin proximate the bottom of the bin touches the structure wall when the mounting bracket is secured to the structure wall and the bin is secured to the mounting bracket.
58. The method according to any one of the foregoing examples, wherein the rear wall is sized and angled such that a rear bottom edge of the bin touches the structure wall when the mounting bracket is secured to the structure wall and the bin is secured to the mounting bracket.

59. The method according to any one of the foregoing examples, wherein the rear wall is sized and angled such that a portion of the bin proximate the recess touches the structure wall when the mounting bracket is secured to the structure wall and the bin is secured to the mounting bracket.

60. The method according to any one of the foregoing examples, wherein a lower, bottom rear edge of the shelf is sized, positioned, and configured to extend 0.01-2 inches past a structure wall, wherein the shelf is capable of flexing and the lower, bottom rear edge of the shelf touches and slides down the structure wall as the shelf is lowered onto the mounting brackets.

61. The method according to any one of the foregoing examples, wherein the reinforcement edge is sized, positioned, and configured to extend 0.01-2 inches past a structure wall so the reinforcement edge, and optionally the shelf, flexes and the reinforcement edge touches and slides down the structure wall as the shelf is lowered onto the mounting brackets.

62. The method according to any one of the foregoing examples, wherein a lower, bottom rear edge of the shelf touches a structure wall about 0.01-2 inches above a final resting location of the lower, bottom rear edge as the shelf is lowered onto the mounting brackets.

63. A shelf mounting system comprising:
   a first mounting bracket, the first mounting bracket having a truncated wedge shape and beveled side edges;
   a second mounting bracket, the first mounting bracket having a truncated wedge shape and beveled side edges; and
   a shelf comprising:
      a front wall, a rear wall, a left side wall, a right side wall, a bottom wall, a first recess on an outside of the rear wall, a second recess on an outside of the rear wall, and a reinforcement edge along a top edge of the rear wall, the first recess having (i) a first downward-facing cavity at a top portion of the first recess, (ii) side edges that are beveled and (iii) a truncated wedge shape complimentary to the first mounting bracket, and the second recess having (i) a second downward-facing cavity at a top portion of the second recess, (ii) side edges that are beveled and (iii) a truncated wedge shape complimentary to the second mounting bracket,
   wherein the first and second recesses are configured to slidably engage the first and second mounting brackets, respectively, and wherein a top portion of each of the first and second mounting brackets extends into the first and second downward-facing cavities and optionally contacts a distal end of each of the first and second downward-facing cavities, respectively, wherein the top portions of the first and second mounting brackets are covered by the first and second downward-facing cavities, respectively, such that when the first and second mounting brackets are engaged with the first and second recesses the shelf is secured to the first and second mounting brackets and prevented from being pulled forward from said first and second mounting brackets.

64. A shelf mounting system comprising:
   a mounting bracket; and
   a shelf comprising:
      a front wall, a rear wall, a left side wall, a right side wall, a bottom wall, and a recess on an outside of the rear wall,
   wherein the recess is configured to slidably engage the mounting bracket and wherein a top portion of the mounting bracket extends into the recess and optionally contacts a distal end of the recess, such that when the mounting bracket is engaged with the recess the shelf is secured to the mounting bracket and prevented from being pulled forward from said mounting bracket.

65. The bin mounting system according to example 60, wherein the top portion of the mounting bracket is covered by the recess.

66. The shelf mounting system according to any of the foregoing examples, wherein the reinforcement edge is a linear reinforcement edge.

67. The shelf mounting system according to any one of the foregoing examples, wherein the left and right side walls have a draft angle of about 0.5-6 degrees.

68. The shelf mounting system according to any one of the foregoing examples, wherein the left and right side walls have a draft angle of about 3 degrees.

69. The shelf mounting system according to any one of the foregoing examples, wherein the beveled edges of the first and second mounting brackets contact the beveled side edges of the first and second recesses, respectively over at least half the length of the side walls of the first and second mounting brackets.

70. The shelf mounting system according to any one of the foregoing examples, wherein the beveled edges of the first and second mounting brackets contact the beveled side edges of the first and second recesses, respectively over substantially the entire length of the side walls of the first and second mounting brackets.

71. The shelf mounting system according to any one of the foregoing examples, wherein the reinforcement edge extends at least half the length of the rear wall of the shelf.

72. The shelf mounting system according to any one of the foregoing examples, wherein the reinforcement edge extends the entire length of the rear wall of the shelf.

73. The shelf mounting system according to any one of the foregoing examples, wherein the shelf further comprises a vertical extension extending downwards from the front wall.

74. The shelf mounting system according to any one of the foregoing examples, wherein the vertical reinforcement edge comprises at least one hanging slot.

75. The shelf mounting system according to any one of the foregoing examples, wherein the rear wall is sized and angled such that a portion of the shelf distal from the recesses touches a structure wall when the mounting brackets are secured to a structure wall and the shelf is secured to the mounting brackets.

76. The shelf mounting system according to any one of the foregoing examples, wherein the rear wall is sized and angled such that a portion of the shelf proximate the bottom of the shelf touches the structure wall when the mounting brackets are secured to the structure wall and the shelf is secured to the mounting brackets.

77. The shelf mounting system according to any one of the foregoing examples, wherein the rear wall is sized and angled such that a rear bottom edge of the shelf touches the structure wall when the mounting brackets are secured to the structure wall and the shelf is secured to the mounting brackets.
78. The shelf mounting system according to any one of the foregoing examples, wherein the rear wall is sized and angled such that a portion of the shelf proximate the recesses touches the structure wall when the mounting brackets are secured to the structure wall and the shelf is secured to the mounting brackets.
79. The shelf mounting system according to any one of the foregoing examples, wherein the rear wall is sized and angled such that a rear bottom edge of the shelf touches the structure wall when the mounting brackets are secured to the structure wall, the shelf is secured to the mounting brackets, and the shelf is empty.
80. The shelf mounting system according to any one of the foregoing examples, wherein the rear wall is sized and angled such that a rear bottom edge of the shelf touches the structure wall when the mounting brackets are secured to the structure wall, the shelf is secured to the mounting brackets, and the shelf is empty, and wherein the shelf is sized, positioned, and configured to extend 0.01-1 inches past the wall when there are contents on the shelf
81. The shelf mounting system according to any one of the foregoing examples, wherein the rear wall is sized and angled such that a rear bottom edge of the shelf touches the structure wall when the mounting brackets are secured to the structure wall, the shelf is secured to the mounting brackets, and the shelf is empty, and wherein the shelf is sized, positioned, and configured to extend 0.01-1 inches past the wall when there are contents on the shelf to apply tension in the shelf structure against the wall to help keep the shelf in place.
82. The shelf mounting system according to any one of the foregoing examples, wherein the rear wall is sized, positioned, and configured such that a rear bottom edge of the shelf extends 0.1-1 inches past the structure wall when the shelf is empty, and wherein the shelf is sized, positioned, and configured to extend 0.05-2 inches past the wall when there are contents on the shelf
83. The shelf mounting system according to any one of the foregoing examples, wherein the rear wall is sized, positioned, and configured such that a rear bottom edge of the shelf extends 0.1-1 inches past the structure wall when the shelf is empty, and wherein the shelf is sized, positioned, and configured to extend 0.05-2 inches past the wall when there are contents on the shelf to apply tension in the shelf structure against the wall to help keep the shelf in place.
84. The shelf mounting system according to any one of the foregoing examples, wherein a lower, bottom rear edge of the shelf is sized, positioned, and configured to extend 0.01-2 inches past a structure wall, wherein the shelf is capable of flexing and the lower, bottom rear edge of the shelf touches and slides down the structure wall as the shelf is lowered onto the mounting brackets.
85. The shelf mounting system according to any one of the foregoing examples, wherein the reinforcement edge is sized, positioned, and configured to extend 0.01-2 inches past a structure wall so the reinforcement edge, and optionally the shelf, flexes and the reinforcement edge touches and slides down the structure wall as the shelf is lowered onto the mounting brackets.
86. The shelf mounting system according to any one of the foregoing examples, wherein a lower, bottom rear edge of the shelf touches a structure wall about 0.01-2 inches above a final resting location of the lower, bottom rear edge as the shelf is lowered onto the mounting brackets.
87. A multi-hook system, comprising:
a mounting bracket comprising:
a linear support surface;
a plurality of reinforcement edges extending forward from the linear support surface; and
a plurality of grooves,
wherein the reinforcement edges and grooves alternate along the linear support surface,
wherein the reinforcement edges each comprise a front face having at least of one slot or a rail,
wherein the reinforcement edge has a height (PH) and width (PW);
a plurality of face plates, comprising a front side and a rear side;
wherein the rear side comprises at least one of a rail or a slot;
wherein each of the plurality of face plates has a height (FH) and a width (FW);
wherein each of the plurality of face plates is slidably attached to one of the plurality of reinforcement edges by inserting the at least one rail into the at least one slot, and sliding the face plate onto the reinforcement edge; and
wherein FW is the same as PW, but the ratio of FH:PH is 1.25:1-2.5:1.
88. The multi-hook system according to any one of the foregoing examples, wherein the system comprises 2-15 reinforcement edges.
89. The multi-hook system according to any one of the foregoing examples, wherein the system comprises 5-10 reinforcement edges.
90. The multi-hook system according to any one of the foregoing examples, wherein the system comprises 7 reinforcement edges.
91. The multi-hook system according to any one of the foregoing examples, wherein the system comprises 1-14 grooves.
92. The multi-hook system according to any one of the foregoing examples, wherein the system comprises 4-9 grooves.
93. The multi-hook system according to any one of the foregoing examples, wherein the system comprises 6 grooves.
94. The multi-hook system according to any one of the foregoing examples, wherein the face plate is stadium-shaped.
95. The multi-hook system according to any one of the foregoing examples, wherein the face plate comprises two rails and the front face of the reinforcement edge comprises two slots.
96. The multi-hook system according to any one of the foregoing examples, wherein the grooves are substantially parabolic or sinusoidal-shaped.
97. The multi-hook system according to any one of the foregoing examples, wherein the plurality of grooves and reinforcement edges alternative every other one of each along the linear support surface.
98. A bin mounting system comprising:
a mounting bracket having a truncated wedge shape and beveled side edges; and
a bin comprising:
a front wall, a rear wall, a left side wall, a right side wall, a bottom wall, a recess on an outside of the rear wall, and a reinforcement edge along a top edge of the rear wall, the recess having (i) a downward-facing cavity at a top portion of the recess, (ii) side edges that are beveled and (iii) a truncated wedge shape complimentary to the mounting bracket, wherein the recess is configured to slidably engage the mounting bracket and wherein a top portion of the mounting bracket extends into the recess and optionally contacts a distal end of the recess, wherein the top portion of the mounting bracket is covered by the recess, such that when the mounting bracket is engaged with the recess the bin is secured to the mounting bracket and prevented from being pulled forward from said mounting bracket.

99. The bin mounting system according to any of the foregoing examples, wherein the cavity is formed by a portion of the rear wall that extends over the recess.

100. The bin mounting system according to any one of the foregoing examples, wherein the recess and the mounting bracket form a dove tail connection.

101. The bin mounting system according to any one of the foregoing examples, wherein the beveled edges of the mounting bracket contact the beveled side edges of the recess over at least half the length of the side walls of the mounting bracket.

102. The bin mounting system according to any one of the foregoing examples, wherein the bin is configured such that a rear bottom edge of the bin touches a structure wall when the mounting bracket is secured to the structure wall, the bin is secured to the mounting bracket, and the bin is empty.

103. The bin mounting system according to any one of the foregoing examples, wherein the bin is configured such that a rear bottom edge of the bin touches a structure wall when the mounting bracket is secured to the structure wall, the bin is secured to the mounting bracket, and the bin is empty, and further wherein the bin is configured such that the rear bottom edge of the bin applies force to the structure wall when the mounting bracket is secured to the structure wall, the bin is secured to the mounting bracket, and the bin is loaded by contents in the bin.

104. The bin mounting system according to any one of the foregoing examples, wherein the bin is configured such, when the mounting bracket is secured to a structure wall, the bin is secured to the mounting bracket, and bin is loaded by contents in the bin, and when a portion of the structure wall around where a rear bottom edge of the bin would touch the structure wall has been removed for testing, the bin flexes permitting the rear bottom edge of the bin to extend about 0.030"-0.050" or about 0.01-0.5 inches past a virtual plane extending down from a plane of the structure wall to which the mounting bracket is secured.

105. The bin mounting system according to any one of the foregoing examples, wherein a portion of the mounting bracket contacts a distal end of the cavity.

106. The bin mounting system according to any one of the foregoing examples, wherein the bin further comprises a reinforcement edge along a top edge of the rear wall of the bin.

107. The bin mounting system according to any one of the foregoing examples, wherein the bin reinforcement edge extends longitudinally at least half the length of the rear wall of the bin.

108. The bin mounting system according to any one of the foregoing examples, wherein the bin reinforcement edge is sized and angled such that the reinforcement edge touches the structure wall when the mounting bracket is secured to the structure wall, the bin is secured to the mounting bracket, and the bin is empty.

109. The bin mounting system according to any one of the foregoing examples, wherein the bin reinforcement edge is sized and angled such that a distal end of the reinforcement edge touches the structure wall when the mounting bracket is secured to the structure wall and the bin is secured to the mounting bracket, both when the bin is empty and when the bin is loaded by contents in the bin.

110. A method for removably attaching a bin to a structure wall comprising:
providing a mounting bracket, the mounting bracket having a truncated wedge shape and beveled side edges;
securing the mounting bracket to the structure wall;
providing the bin, the bin comprising:
a front wall, a rear wall, a left side wall, a right side wall, a bottom wall, and a recess on an outside of the rear wall,
the recess having (i) a downward-facing cavity at a top portion of the recess, (ii) side edges that are beveled and (iii) a truncated wedge shape complimentary to the mounting bracket,
positioning the bin proximate the structure wall over the secured mounting bracket with the recess aligned over the secured mounting bracket; and
slidably lowering the bin down onto the secured mounting bracket wherein at least a portion of the secured mounting bracket is within the recess, and wherein a top portion of the mounting bracket extends into the recess.

111. The method according to any one of the foregoing examples, wherein the mounting bracket and bin comprise the bin mounting system according to any one of examples 1 to 12.

112. The method according to any one of the foregoing examples, further comprising:
providing at least one fastener;
inserting said fastener or fasteners through the mounting bracket; and
securing the mounting bracket to the structure wall using the fastener or fasteners.

113. A bin mounting system comprising:
a mounting bracket having a truncated wedge shape and beveled side edges; and
a bin comprising:
a front wall, a rear wall, a left side wall, a right side wall, a bottom wall, and a recess (i.e., at least one recess) on an outside of the rear wall,
the recess having (i) a downward-facing cavity at a top portion of the recess, (ii) side edges that are beveled and (iii) a truncated wedge shape complimentary to the mounting bracket,
wherein the recess is configured to engage the mounting bracket and wherein a top portion of the mounting bracket extends into the cavity, wherein the top portion of the mounting bracket is covered by the bin, such that when the mounting bracket is engaged with the recess the bin is secured to the mounting bracket and prevented from being pulled forward from said mounting bracket.

114. The bin mounting system according to example 113, wherein the cavity is formed by a portion of the rear wall that extends over the recess.

115. The bin mounting system according to example 113, wherein the recess and the mounting bracket form a dove tail connection and the top portion of the mounting bracket extends into the cavity in a tongue-in-groove manner.

116. The bin mounting system according to any one of the foregoing examples, wherein the beveled edges of the mounting bracket contact the beveled side edges of the recess over at least half the length of the side walls of the mounting bracket.

117. The bin mounting system according to any one of the foregoing examples, wherein the bin is configured such that a rear bottom edge of the bin touches a structure wall when the mounting bracket is secured to the structure wall, the bin is secured to the mounting bracket, and the bin is empty.

118. The bin mounting system according to any one of the foregoing examples, wherein the bin is configured such that a rear bottom edge of the bin touches a structure wall when the mounting bracket is secured to the structure wall, the bin is secured to the mounting bracket, and the bin is empty, and further wherein the bin is configured such that the rear bottom edge of the bin applies force to the structure wall when the mounting bracket is secured to the structure wall, the bin is secured to the mounting bracket, and the bin is loaded by contents in the bin.

119. The bin mounting system according to any one of the foregoing examples, wherein the bin is configured such, when the mounting bracket is secured to a structure wall, the bin is secured to the mounting bracket, and bin is loaded by contents in the bin, and when a portion of the structure wall around where a rear bottom edge of the bin would touch the structure wall has been removed for testing, the bin flexes permitting the rear bottom edge of the bin to extend about 0.030"-0.050" or about 0.01-0.5 inches past a virtual plane extending down from a plane of the structure wall to which the mounting bracket is secured.

120. The bin mounting system according to any one of the foregoing examples, wherein a portion of the mounting bracket contacts a distal end of the cavity.

121. The bin mounting system according to any one of the foregoing examples, wherein the bin further comprises a reinforcement edge along a top edge of the rear wall of the bin.

122. The bin mounting system according to example 121, wherein the bin reinforcement edge extends longitudinally at least half the length of the rear wall of the bin.

123. The bin mounting system according to any one of examples 121-122, wherein the bin reinforcement edge is sized and angled such that the reinforcement edge touches the structure wall when the mounting bracket is secured to the structure wall, the bin is secured to the mounting bracket, and the bin is empty.

124. The bin mounting system according to any one of examples 121-123, wherein the bin reinforcement edge is sized and angled such that a distal end of the reinforcement edge touches the structure wall when the mounting bracket is secured to the structure wall and the bin is secured to the mounting bracket, both when the bin is empty and when the bin is loaded by contents in the bin.

125. The bin mounting system according to any one of examples 113-124, wherein the bin is in accordance with any one of the foregoing examples and wherein the mounting bracket is in accordance with any one of the foregoing examples.

126. A method for removably attaching a bin to a structure wall comprising:
providing a mounting bracket, the mounting bracket having a truncated wedge shape and beveled side edges;
securing the mounting bracket to the structure wall;
providing the bin, the bin comprising:
a front wall, a rear wall, a left side wall, a right side wall, a bottom wall, and a recess on an outside of the rear wall,
the recess having (i) a downward-facing cavity at a top portion of the recess, (ii) side edges that are beveled and (iii) a truncated wedge shape complimentary to the mounting bracket,
positioning the bin proximate the structure wall over the secured mounting bracket with the recess aligned over the secured mounting bracket; and
slidably lowering the bin down onto the secured mounting bracket wherein at least a portion of the secured mounting bracket is within the recess, and wherein a top portion of the mounting bracket extends into the recess.

127. The method according to example 126, wherein the mounting bracket and bin comprise the mounting bracket and bin of the bin mounting system according to any one of the foregoing examples.

128. The method according to any one of example 126-127, further comprising:
providing at least one fastener;
inserting said fastener or fasteners through the mounting bracket; and
securing the mounting bracket to the structure wall using the fastener or fasteners.

129. A mounting system for a bin, shelf, or other holder, comprising:
at least one mounting bracket having a truncated wedge shape and beveled side edges; and
a bin, shelf, or other holder comprising:
a front wall, a rear wall, a left side wall, a right side wall, a bottom wall, and at least one recess on an outside of the rear wall,
the at least one recess having (i) a downward-facing cavity at a top portion of the at least one recess, (ii) side edges that are beveled and (iii) a truncated wedge shape complimentary to the at least one mounting bracket,
wherein the at least one recess is configured to engage the at least one mounting bracket and wherein a top portion of the at least one mounting bracket extends into the cavity, wherein the top portion of the at least one mounting bracket is covered by the bin, shelf, or other holder, such that when the at least one mounting bracket is engaged with the at least one recess the bin, shelf, or other holder is secured to the at least one mounting bracket and prevented from being pulled forward from said at least one mounting bracket.

130. The mounting system according to example 129, wherein the cavity is formed by a portion of the rear wall that extends over the recess.

131. The mounting system according to example 129, wherein the at least one recess and the at least one mounting bracket form a dove tail connection and the top portion of the at least one mounting bracket extends into the cavity in a tongue-in-groove manner.

132. The mounting system according to any one of the foregoing examples, wherein the beveled edges of the at least one mounting bracket contact the beveled side edges of the at least one recess over at least half the length of the side walls of the at least one mounting bracket.

133. The mounting system according to any one of the foregoing examples, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty.

134. The mounting system according to any one of the foregoing examples, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty, and further wherein the bin, shelf, or other holder is configured such that the rear bottom edge of the bin, shelf, or other holder applies force to the structure wall when the at least one mounting bracket is secured to the structure wall, the bin, shelf, or other holder is secured to the at least one mounting bracket, and the bin, shelf, or other holder is loaded by contents in the bin, shelf, or other holder.

135. The mounting system according to any one of the foregoing examples, wherein the bin, shelf, or other holder is configured such, when the at least one mounting bracket is secured to a structure wall, the bin, shelf, or other holder is secured to the mounting bracket, and bin, shelf, or other holder is loaded by contents in the bin, shelf, or other holder, and when a portion of the structure wall around where a rear bottom edge of the bin, shelf, or other holder would touch the structure wall has been removed for testing, the bin, shelf, or other holder flexes permitting the rear bottom edge of the bin, shelf, or other holder to extend about 0.030"-0.050" or about 0.01-0.5 inches past a virtual plane extending down from a plane of the structure wall to which the at least one mounting bracket is secured.

136. The mounting system according to any one of the foregoing examples, wherein a portion of the at least one mounting bracket contacts a distal end of the cavity.

137. The mounting system according to any one of the foregoing examples, wherein the bin, shelf, or other holder further comprises a reinforcement edge along a top edge of the rear wall of the bin, shelf, or other holder.

138. The mounting system according to example 137, wherein the reinforcement edge extends longitudinally at least half the length of the rear wall of the bin, shelf, or other holder.

139. The mounting system according to any one of examples 137-138, wherein the reinforcement edge is sized and angled such that the reinforcement edge touches the structure wall when the at least one mounting bracket is secured to the structure wall, the bin, shelf, or other holder is secured to the at least one mounting bracket, and the bin, shelf, or other holder is empty.

140. The mounting system according to any one of examples 137-139, wherein the reinforcement edge is sized and angled such that a distal end of the reinforcement edge touches the structure wall when the at least one mounting bracket is secured to the structure wall and the bin, shelf, or other holder is secured to the at least one mounting bracket, both when the bin, shelf, or other holder is empty and when the bin, shelf, or other holder is loaded by contents in the bin, shelf, or other holder.

141. The mounting system according to any one of the foregoing examples, wherein the front wall of the bin, shelf, or other holder has a notch formed therein.

142. The mounting system according to any one of the foregoing examples, wherein the bin, shelf, or other holder further comprises at least one opening to hang items from the bin, shelf, or other holder.

143. The mounting system according to any one of the foregoing examples, wherein the bin, shelf, or other holder comprises a bin having one recess according to any one of the foregoing examples to be secured to one corresponding mounting bracket according to any one of the foregoing examples.

144. The mounting system according to any one of the foregoing examples, wherein the bin, shelf, or other holder comprises a shelf having a plurality of recesses according to any one of the foregoing examples be secured to a corresponding plurality of mounting brackets according to any one of the foregoing examples.

145. The mounting system according to any one of examples 129-144, wherein the at least one bin, shelf, or other holder is in accordance with any one of the foregoing examples and wherein the at least one mounting bracket is in accordance with any one of the foregoing examples.

146. A method for removably attaching a bin, shelf, or other holder to a structure wall comprising:
providing at least one mounting bracket, the at least one mounting bracket having a truncated wedge shape and beveled side edges;
securing the at least one mounting bracket to the structure wall;
providing the bin, shelf, or other holder, the bin, shelf, or other holder comprising: a front wall, a rear wall, a left side wall, a right side wall, a bottom wall, and at least one recess on an outside of the rear wall,
the at least one recess having (i) a downward-facing cavity at a top portion of the at least one recess, (ii) side edges that are beveled and (iii) a truncated wedge shape complimentary to the at least one mounting bracket,
positioning the bin, shelf, or other holder proximate the structure wall over the secured mounting bracket with the at least one recess aligned over the secured at least one mounting bracket; and
lowering the bin, shelf, or other holder down onto the at least one secured mounting bracket wherein at least a portion of the at least one secured mounting bracket is within the at least one recess, and wherein a top portion of the at least one mounting bracket extends into the at least one recess.

147. The method according to example 146, wherein the mounting bracket and the bin, shelf, or other holder comprise the bin or shelf and mounting bracket of the mounting system according to any one of the foregoing examples.

148. The method according to any one of example 146 or 147, further comprising:
  providing at least one fastener;
  inserting said fastener or fasteners through the mounting bracket; and
  securing the mounting bracket to the structure wall using the fastener or fasteners.
149. A mounting system for a bin, shelf, or other holder, comprising:
  at least one mounting bracket having a truncated wedge shape and beveled side edges; and a bin, shelf, or other holder comprising:
    a front wall, a rear wall, a left side wall, a right side wall, a bottom wall, and at least one recess on an outside of the rear wall,
    each at least one recess having (i) a downward-facing cavity at a top portion of the at least one recess, (ii) side edges that are beveled and (iii) a truncated wedge shape complimentary to the at least one mounting bracket,
    wherein the at least one recess is configured to engage the at least one mounting bracket and wherein a top portion of the at least one mounting bracket extends into the cavity, wherein the top portion of the at least one mounting bracket is covered by the bin, shelf, or other holder, such that when the at least one mounting bracket is engaged with the at least one recess the bin, shelf, or other holder is secured to the at least one mounting bracket and prevented from being pulled forward from said at least one mounting bracket.
150. The mounting system according to example 149, wherein either:
  a) the cavity is formed by a portion of the rear wall that extends over the recess, or
  b) the at least one recess and the at least one mounting bracket form a dove tail connection and the top portion of the at least one mounting bracket extends into the cavity in a tongue-in-groove manner.
151. The mounting system according to any one of the foregoing examples, wherein the beveled edges of the at least one mounting bracket contact the beveled side edges of the at least one recess over at least half the length of the side walls of the at least one mounting bracket.
152. The mounting system according to any one of the foregoing examples, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty.
153. The mounting system according to any one of the foregoing examples, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty, and further wherein the bin, shelf, or other holder is configured such that the rear bottom edge of the bin, shelf, or other holder applies force to the structure wall when the at least one mounting bracket is secured to the structure wall, the bin, shelf, or other holder is secured to the at least one mounting bracket, and the bin, shelf, or other holder is loaded by contents in the bin, shelf, or other holder.
154. The mounting system according to any one of the foregoing examples, wherein the bin, shelf, or other holder is configured such, when the at least one mounting bracket is secured to a structure wall, the bin, shelf, or other holder is secured to the mounting bracket, and bin, shelf, or other holder is loaded by contents in the bin, shelf, or other holder, and when a portion of the structure wall around where a rear bottom edge of the bin, shelf, or other holder would touch the structure wall has been removed for testing, the bin, shelf, or other holder flexes permitting the rear bottom edge of the bin, shelf, or other holder to extend about 0.030"-0.050" or about 0.03-0.5 inches past a virtual plane extending down from a plane of the structure wall to which the at least one mounting bracket is secured.
155. The mounting system according to any one of the foregoing examples, wherein a portion of the at least one mounting bracket contacts a distal end of the cavity.
156. The mounting system according to any one of the foregoing examples, wherein the bin, shelf, or other holder further comprises a reinforcement edge along a top edge of the rear wall of the bin, shelf, or other holder, optionally wherein:
  the reinforcement edge extends longitudinally at least half the length of the rear wall of the bin, shelf, or other holder;
  the reinforcement edge is sized and angled such that the reinforcement edge touches the structure wall when the at least one mounting bracket is secured to the structure wall, the bin, shelf, or other holder is secured to the at least one mounting bracket, and the bin, shelf, or other holder is empty; and/or
  the reinforcement edge is sized and angled such that a distal end of the reinforcement edge touches the structure wall when the at least one mounting bracket is secured to the structure wall and the bin, shelf, or other holder is secured to the at least one mounting bracket, both when the bin, shelf, or other holder is empty and when the bin, shelf, or other holder is loaded by contents in the bin, shelf, or other holder.
157. The mounting system according to any one of the foregoing examples, wherein the front wall of the bin, shelf, or other holder has a notch formed therein.
158. The mounting system according to any one of the foregoing examples, wherein the bin, shelf, or other holder further comprises at least one opening to hang items from the bin, shelf, or other holder.
159. The mounting system according to any one of the foregoing examples, wherein the bin, shelf, or other holder comprises a bin having one recess according to any one of the foregoing claims to be secured to one corresponding mounting bracket according to any one of the foregoing claims.
160. The mounting system according to any one of the foregoing examples, wherein the bin, shelf, or other holder comprises a shelf having a plurality of recesses according to any one of the foregoing claims be secured to a corresponding plurality of mounting brackets according to any one of the foregoing claims.
161. A method for removably attaching a bin, shelf, or other holder to a structure wall comprising:
  providing at least one mounting bracket, the at least one mounting bracket having a truncated wedge shape and beveled side edges;

securing the at least one mounting bracket to the structure wall;
providing the bin, shelf, or other holder, the bin, shelf, or other holder comprising:
a front wall, a rear wall, a left side wall, a right side wall, a bottom wall, and at least one recess on an outside of the rear wall,
each at least one recess having (i) a downward-facing cavity at a top portion of the at least one recess, (ii) side edges that are beveled and (iii) a truncated wedge shape complimentary to the at least one mounting bracket,
positioning the bin, shelf, or other holder proximate the structure wall over the secured mounting bracket with the at least one recess aligned over the secured at least one mounting bracket; and
lowering the bin, shelf, or other holder down onto the at least one secured mounting bracket wherein at least a portion of the at least one secured mounting bracket is within the at least one recess, and wherein a top portion of the at least one mounting bracket extends into the cavity.

162. The method according to example 161, wherein the mounting bracket and the bin, shelf, or other holder comprise the mounting system according to any one of examples 149 to 160.

163. The method according to any one of example 161 or 162, further comprising:
providing at least one fastener;
inserting said fastener or fasteners through the mounting bracket; and
securing the mounting bracket to the structure wall using the fastener or fasteners.

164. A mounting system for a bin, shelf, or other holder, comprising:
at least one mounting bracket having a truncated wedge shape and beveled side edges; and
a bin, shelf, or other holder comprising:
a front wall, a rear wall, a left side wall, a right side wall, a bottom wall, at least one recess on an outside of the rear wall, and a reinforcement edge extending longitudinally along at least half the length of a top edge of the rear wall;
each at least one recess having (i) a downward-facing cavity at a top portion of the at least one recess, wherein the cavity is formed by a portion of the rear wall that extends over the at least one recess, (ii) side edges that are beveled and (iii) a truncated wedge shape complimentary to the at least one mounting bracket,
wherein the at least one recess is configured to engage the at least one mounting bracket in a dove tail connection,
wherein the beveled side edges of the at least one mounting bracket contact the beveled side edges of the at least one recess over at least half the length of the side walls of the at least one mounting bracket,
wherein a top portion of the at least one mounting bracket extends into the cavity in a tongue-in-groove manner and contacts a distal end of the cavity,
wherein the reinforcement edge is sized and angled such that a distal end of the reinforcement edge touches the structure wall when the at least one mounting bracket is secured to the structure wall and the bin, shelf, or other holder is secured to the at least one mounting bracket,
wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty, and further wherein the bin, shelf, or other holder is configured such that the rear bottom edge of the bin, shelf, or other holder applies force to the structure wall when the at least one mounting bracket is secured to the structure wall, the bin, shelf, or other holder is secured to the at least one mounting bracket, and the bin, shelf, or other holder is loaded by contents in the bin, shelf, or other holder, and
wherein the top portion of the at least one mounting bracket is covered by the bin, shelf, or other holder, such that when the at least one mounting bracket is engaged with the at least one recess the bin, shelf, or other holder is secured to the at least one mounting bracket and prevented from being pulled forward from said at least one mounting bracket.

As one of ordinary skill in the art would understand, the inventive concept shown in the exemplary embodiments of FIGS. 1-54 are applicable to bins, lids, mounting brackets, shelves, hooks, and multi-hooks of various sizes. As illustrated, bins of various dimensions can be used according to the desired footprint and storage volume. Thus, the invention is not limited to the dimensional relationships illustrated in the exemplary embodiments shown in the accompanying figures.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For examples, exemplary embodiments of the bins described herein can be modified to include openings from which items can be hung (similar to the openings 219 in the exemplary shelf embodiments). As another example, although the bins herein are shown with only one recess, other exemplary bin embodiments have a plurality of recesses as shown and/or described herein. Similarly, although the shelves herein are shown with two recesses, other exemplary shelf embodiments have one recess, or three or more recesses, as shown and/or described herein. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A mounting system for a bin, shelf, or other holder, comprising:
at least one mounting bracket having a truncated wedge shape and beveled side edges; and
a bin, shelf, or other holder comprising:
a front wall, a rear wall, a left side wall, a right side wall, a bottom wall, and at least one recess on an outside of the rear wall,
each at least one recess having (i) a downward-facing bracket cavity at a top portion of the at least one recess formed in part by a portion of the bin at the rear wall, (ii) side edges that are beveled and (iii) a truncated wedge shape complimentary to the at least one mounting bracket, wherein the at least one recess is configured to engage the at least one mounting bracket and wherein a top portion of the at least one mounting bracket extends into the bracket cavity, wherein the top portion of the at least one mounting bracket is covered by the bin, shelf, or other holder, such that when the at least one mounting bracket is engaged with the at least one recess the bin, shelf, or other holder is secured to the at least one mounting bracket and prevented from being pulled forward from said at least one mounting bracket, and a reinforcement edge along a top edge of the rear wall of the bin, shelf, or other holder proximate the bracket cavity, the reinforcement edge spaced from the portion of the bin at the rear wall forming the bracket cavity to thereby form a structure having the bracket cavity, then the portion of the bin at the rear wall forming the bracket cavity, then a space, and then the reinforcement edge.

2. The mounting system according to claim 1, wherein the bracket cavity is formed by a portion of the rear wall that extends over the recess and further wherein the reinforcement edge is spaced from the portion of the rear wall that extends over the recess to thereby form a structure having the bracket cavity, then the portion of the rear wall that extends over the recess to form the bracket cavity, then a space, and then the reinforcement edge.

3. The mounting system according to claim 1, wherein the at least one recess and the at least one mounting bracket form a dove tail connection and the top portion of the at least one mounting bracket extends into the bracket cavity in a tongue-in-groove manner, with the sides of the recess formed by three straight recess walls connected by four straight, angled corners to each other and the back wall, with one portion of the back wall connected to a first recess wall at a first straight, angled corner, the first recess wall connected to a second recess wall at a second straight, angled corner, the second recess wall connected to a third recess wall at a third straight, angled corner, the third recess wall connected to a fourth recess wall at a third straight, angled corner, and the fourth recess wall connected to another portion of the back wall at a fourth straight, angled corner.

4. The mounting system according to claim 1, wherein the beveled edges of the at least one mounting bracket contact the beveled side edges of the at least one recess over at least half the length of the side walls of the at least one mounting bracket.

5. The mounting system according to claim 1, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty.

6. The mounting system according to claim 1, wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty, and further wherein the bin, shelf, or other holder is configured such that the rear bottom edge of the bin, shelf, or other holder applies force to the structure wall when the at least one mounting bracket is secured to the structure wall, the bin, shelf, or other holder is secured to the at least one mounting bracket, and the bin, shelf, or other holder is loaded by contents in the bin, shelf, or other holder.

7. The mounting system according to claim 1, wherein a portion of the at least one mounting bracket contacts a distal end of the bracket cavity.

8. The mounting system according to claim 1, wherein the reinforcement edge along the top edge of the rear wall of the bin, shelf, or other holder cooperates with the portion of the bin at the rear wall forming the bracket cavity to form a downward-opening spacer cavity therebetween.

9. The mounting system according to claim 1, wherein the reinforcement edge extends longitudinally at least half the length of the rear wall of the bin, shelf, or other holder and has a free distal end spaced from and opposite the portion of the bin at the rear wall forming the bracket cavity.

10. The mounting system according to claim 9, wherein the reinforcement edge is sized and angled such that the reinforcement edge touches the structure wall when the at least one mounting bracket is secured to the structure wall, the bin, shelf, or other holder is secured to the at least one mounting bracket, and the bin, shelf, or other holder is empty.

11. The mounting system according to claim 9, wherein the reinforcement edge is sized and angled such that the free distal end of the reinforcement edge touches the structure wall when the at least one mounting bracket is secured to the structure wall and the bin, shelf, or other holder is secured to the at least one mounting bracket, when the bin, shelf, or other holder is empty.

12. The mounting system according to claim 1, wherein the bin, shelf, or other holder comprises a bin having one of the recesses to be secured to one of the corresponding mounting brackets.

13. The mounting system according to claim 1, wherein the bin, shelf, or other holder comprises a shelf having a plurality of the recesses secured to a corresponding plurality of the mounting brackets.

14. A method for removably attaching a bin, shelf, or other holder to a structure wall comprising:
    providing a mounting system comprising at least one mounting bracket, the at least one mounting bracket having a truncated wedge shape and beveled side edges;
    the bin, shelf, or other holder, the bin, shelf, or other holder comprising:
    a front wall, a rear wall, a left side wall, a right side wall, a bottom wall, a reinforcement edge along a top edge of the rear wall of the bin, shelf, or other holder proximate the bracket cavity, and at least one recess formed in part by a portion of the bin at the rear wall,
    each at least one recess having (i) a downward-facing bracket cavity at a top portion of the at least one recess, (ii) side edges that are beveled and (iii) a truncated wedge shape complimentary to the at least one mounting bracket,
    securing the at least one mounting bracket to the structure wall;
    positioning the bin, shelf, or other holder proximate the structure wall over the secured mounting bracket with the at least one recess aligned over the secured at least one mounting bracket; and
    lowering the bin, shelf, or other holder down onto the at least one secured mounting bracket wherein at least a portion of the at least one secured mounting bracket is within the at least one recess, wherein a top portion of the at least one mounting bracket extends into the bracket cavity, and wherein the reinforcement edge spaced from the portion of the bin at the rear wall forming the bracket cavity to thereby form a structure having the bracket cavity, then the portion of the bin at the rear wall forming the bracket cavity, then a space, and then the reinforcement edge.

15. The method according to claim 14, wherein the mounting system is the mounting system according to claim 1.

16. The method according to claim 14, further comprising:
   providing at least one fastener;
   inserting said fastener or fasteners through the mounting bracket; and
   securing the mounting bracket to the structure wall using the fastener or fasteners.

17. A mounting system for a bin, shelf, or other holder, comprising:
   at least one mounting bracket having a truncated wedge shape and beveled side edges; and
   a bin, shelf, or other holder comprising:
      a front wall, a rear wall, a left side wall, a right side wall, a bottom wall, at least one recess on an outside of the rear wall, and a reinforcement edge extending longitudinally along a top edge of the rear wall of the bin, shelf, or other holder proximate the bracket cavity for at least half the length of the top edge of the rear wall;
      each at least one recess having (i) a downward-facing bracket cavity at a top portion of the at least one recess, wherein the bracket cavity is formed by a portion of the rear wall that extends over the at least one recess, (ii) side edges that are beveled and (iii) a truncated wedge shape complimentary to the at least one mounting bracket,
   wherein the at least one recess is configured to engage the at least one mounting bracket in a dove tail connection,
   wherein the beveled side edges of the at least one mounting bracket contact the beveled side edges of the at least one recess over at least half the length of the side walls of the at least one mounting bracket,
   wherein a top portion of the at least one mounting bracket extends into the bracket cavity in a tongue-in-groove manner and contacts a distal end of the bracket cavity, with the sides of the recess formed by three straight recess walls connected by four straight, angled corners to each other and the back wall, with one portion of the back wall connected to a first recess wall at a first straight, angled corner, the first recess wall connected to a second recess wall at a second straight, angled corner, the second recess wall connected to a third recess wall at a third straight, angled corner, the third recess wall connected to a fourth recess wall at a third straight, angled corner, and the fourth recess wall connected to another portion of the back wall at a fourth straight, angled corner,
   wherein the reinforcement edge is sized and angled such that a free distal end of the reinforcement edge touches the structure wall when the at least one mounting bracket is secured to the structure wall and the bin, shelf, or other holder is secured to the at least one mounting bracket,
   wherein the bin, shelf, or other holder is configured such that a rear bottom edge of the bin, shelf, or other holder touches a structure wall when the at least one mounting bracket is secured to the structure wall, the bin, shelf, or other holder is secured to the at least one mounting bracket, and the bin, shelf, or other holder is empty, and
   wherein the top portion of the at least one mounting bracket is covered by the bin, shelf, or other holder, such that when the at least one mounting bracket is engaged with the at least one recess the bin, shelf, or other holder is secured to the at least one mounting bracket and prevented from being pulled forward from said at least one mounting bracket.

18. The mounting system according to claim 1, wherein the mounting bracket comprises:
   a body; and
   at least one orifice extending through the body;
   wherein the body has a front member, a top member, and a plurality of ribs;
   wherein the front member has a front surface, a rear surface, a top edge, a bottom edge, a first side edge, and a second side edge;
   wherein the first side edge and second side edge each extends linearly in an outward direction from the top edge to the bottom edge, such that the bottom edge is longer than the top edge, such that the front surface is a truncated wedge shape;
   wherein the top member extends in a rearward direction from the top edge of the front member;
   wherein the plurality of ribs comprises a horizontal plurality of ribs and a vertical plurality of ribs, each extending rearward from the rear surface of the front member;
   wherein the horizontal plurality of ribs are disposed parallel to the top member, and where the horizontal plurality of ribs further comprises a top portion and a lower portion, wherein the top portion of the horizontal plurality of ribs have a width that is less than a width of the lower portion of the horizontal plurality of ribs; and
   wherein the vertical plurality of ribs are disposed between the first side edge and second side edge, and are perpendicular to the horizontal plurality of ribs.

19. The mounting system according to claim 18, wherein the mounting bracket further comprises a first orifice and a second orifice, wherein the first orifice is disposed proximate the top edge of the front member, and wherein the second orifice is disposed proximate the bottom edge of the front member.

20. The mounting system according to claim 18, wherein the horizontal plurality of ribs each has a first side edge, a second side edge, a front edge and a rear edge, wherein the front edges are proximate the rear surface of the front member, and wherein the rear edges are shorter in length than the front edges, such that the first and second side edges of each of the horizontal plurality of ribs taper inward towards the rear edges, such that each rib of the horizontal plurality of ribs is trapezoidal in shape, and the first and second side edge of the horizontal plurality of ribs form the beveled side edges of the mounting bracket.

* * * * *